United States Patent
Shioda et al.

(10) Patent No.: US 10,609,479 B2
(45) Date of Patent: Mar. 31, 2020

(54) DEVICE AND METHOD FOR DETERMINING A SOUND SOURCE DIRECTION

(71) Applicant: FUJITSU LIMITED, Kawasaki-shi, Kanagawa (JP)

(72) Inventors: Chisato Shioda, Kawasaki (JP); Nobuyuki Washio, Akashi (JP); Masanao Suzuki, Yokohama (JP); Shunsuke Takeuchi, Kawasaki (JP); Yoshiteru Tsuchinaga, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/127,601

(22) Filed: Sep. 11, 2018

(65) Prior Publication Data
US 2019/0082257 A1    Mar. 14, 2019

(30) Foreign Application Priority Data

Sep. 14, 2017 (JP) .................. 2017-177069
Nov. 28, 2017 (JP) .................. 2017-228128
May 10, 2018 (JP) .................. 2018-091212

(51) Int. Cl.
| | |
|---|---|
| *G10L 25/21* | (2013.01) |
| *H04R 3/00* | (2006.01) |
| *G10L 25/18* | (2013.01) |
| *H04R 1/40* | (2006.01) |
| *G01S 3/80* | (2006.01) |

(52) U.S. Cl.
CPC ............ *H04R 3/005* (2013.01); *G01S 3/8006* (2013.01); *G10L 25/18* (2013.01); *G10L 25/21* (2013.01);
(Continued)

(58) Field of Classification Search
CPC ......... G10L 25/18; G10L 25/21; H04R 1/406; H04R 2430/20; H04R 2499/11;
(Continued)

(56) References Cited

U.S. PATENT DOCUMENTS

| | | | | |
|---|---|---|---|---|
| 6,763,110 B1 * | 7/2004 | Sung | ................... | H04M 1/0202 379/433.02 |
| 2012/0328142 A1 * | 12/2012 | Horibe | .................. | H04R 1/406 381/355 |

(Continued)

FOREIGN PATENT DOCUMENTS

| | | |
|---|---|---|
| JP | 2011-186384 | 9/2011 |
| JP | 2018-040982 | 3/2018 |

OTHER PUBLICATIONS

Watanabe Naoki et al., "Basic study on estimating the sound source position using directional microphone" (online), (search on Sep. 11, 2017), Internet <(URL:http://www.cit.nihon-u.ac.jp/kouendata/No. 41/2_denki/2-008.pdf.)>, Sep. 2017 (16 pages).
(Continued)

*Primary Examiner* — Paul Kim
*Assistant Examiner* — Friedrich Fahnert
(74) *Attorney, Agent, or Firm* — Fujitsu Patent Center

(57) ABSTRACT

A device for determining a sound source direction determines a direction in which a source of a reached sound exists, based on at least one of a sound pressure difference between a first sound pressure that is a sound pressure of a first frequency component of a first part of the reached sound acquired by a first microphone and a second sound pressure that is a sound pressure of the first frequency component of a second part of the reached sound acquired by a second microphone, and a phase difference between a first phase that is a phase of a second frequency component of the first part of the reached sound and a second phase that is a phase of the second frequency component of the second part of the reached sound.

18 Claims, 49 Drawing Sheets

(52) U.S. Cl.
CPC ......... *H04R 1/406* (2013.01); *H04R 2430/20* (2013.01); *H04R 2499/11* (2013.01)

(58) Field of Classification Search
CPC ....... H04R 3/005; G01S 3/8006; G01S 3/801; G01S 3/802; G01S 3/8034; G01S 3/8083
USPC .......... 381/26, 56, 92, 307, 355; 379/433.02
See application file for complete search history.

(56) References Cited

U.S. PATENT DOCUMENTS

| | | | |
|---|---|---|---|
| 2013/0272539 A1* | 10/2013 | Kim | G01S 3/8006 381/92 |
| 2015/0125011 A1* | 5/2015 | Sekiya | H04R 3/005 381/307 |
| 2015/0245152 A1* | 8/2015 | Ding | H04R 1/406 381/56 |
| 2016/0080867 A1* | 3/2016 | Nugent | H04R 1/026 381/26 |
| 2016/0219134 A1* | 7/2016 | Cameron | H04R 1/2807 |
| 2018/0068677 A1 | 3/2018 | Suzuki et al. | |

OTHER PUBLICATIONS

Yamamoto Kohei, "Calculation Methods for Noise Screen Effect", Noise Control, Japan, 1997, vol. 21, No. 3, 1997, pp. 143-147 (20 pages).

* cited by examiner

FIG. 5

| AREA [cm²] | SOUND PRESSURE [dBov] | | SOUND PRESSURE DIFFERENCE [dB] |
| --- | --- | --- | --- |
| | FRONT SIDE | UPPER SIDE | |
| 2 | -26 | -29 | 3 |
| 63 | -24 | -30 | 6 |

FIG. 9

| DETERMINATION REFERENCE | DETERMINATION RESULT |
|---|---|
| SOUND PRESSURE DIFFERENCE > FIRST THRESHOLD VALUE | UPPER SIDE |
| SOUND PRESSURE DIFFERENCE < SECOND THRESHOLD VALUE | FRONT SIDE |
| SECOND THRESHOLD VALUE ≤ SOUND PRESSURE DIFFERENCE ≤ FIRST THRESHOLD VALUE | DETERMINATION IS IMPOSSIBLE |

FIG. 19

| KIND OF MICROPHONE | SIZE |
|---|---|
| DIRECTIONAL MICROPHONE | HEIGHT 4.5 mm<br>DIAMETER 8 mm<br>VOLUME 226 mm$^3$ |
| OMNIDIRECTIONAL MICROPHONE | HEIGHT 1.1 mm<br>WIDTH 3.6 mm<br>DEPTH 2.8 mm<br>VOLUME 11 mm$^3$ |

FIG. 21

| POSITION OF SOUND SOURCE | SOUND PRESSURE DIFFERENCE | | |
| --- | --- | --- | --- |
| | RELATED ART | FIRST EMBODIMENT | DIFFERENTIAL |
| UPPER SIDE | 2.9 | 7.2 | 4.3 |
| FRONT SIDE | -2.9 | -4.2 | 1.3 |

DEVICE AND METHOD FOR DETERMINING A SOUND SOURCE DIRECTION

CROSS-REFERENCE TO RELATED APPLICATIONS

This application is based upon and claims the benefit of priority of the prior Japanese Patent Application Nos. 2018-91212, filed on May 10, 2018, 2017-177069, filed on Sep. 14, 2017, and 2017-228128, filed on Nov. 28, 2017, the entire contents of which are incorporated herein by reference.

FIELD

The embodiments discussed herein are related to a device for determining a sound source direction and a method for determining a sound source direction.

BACKGROUND

There is a device for determining a sound source direction, which determines the direction of a sound source by disposing a first directional microphone in such a way to detect a sound propagated along a first direction, and disposing a second directional microphone in such a way to detect a sound propagated along a second direction crossing the first direction. When the size of a sound pressure of the sound detected by the first directional microphone is larger than the size of a sound pressure of the sound detected by the second directional microphone, the device for determining a sound source direction determines that the sound is propagated along the first direction. In the meantime, when the size of the sound pressure of the sound detected by the second directional microphone is larger than the size of the sound pressure of the sound detected by the first directional microphone, the device for determining a sound source direction determines that the sound is propagated along the second direction.

Related techniques are disclosed in, for example, Japanese Laid-Open Patent Publication No. 2018-040982 and Japanese Patent No. 5387459.

Related techniques are disclosed in, for example, Watanabe, et., al. "Basic study on estimating the sound source position using directional microphone" (online), (search on September 11, Heisei 29), Internet (URL: http://www.cit.nihonu.ac.jp/kouendata/No.41/2_denki/2008.pdf) (Non-Patent Document 1) and Kohei Yamamoto, "Calculation Methods for Noise Screen Effect" noise control, Japan, 1997, Vol. 21, No. 3, pages 143 to 147 (Non-Patent Document 2)

SUMMARY

According to an aspect of the invention, a device for determining a sound source direction, the device includes a case in which a first sound path, which has a first opening opened in a first surface at a first end of the first sound path and in which a sound is propagated from the first opening, and a second sound path, which has a second opening opened in a second surface crossing the first surface at a first end of the second sound path and in which a sound is propagated from the second opening, are provided, a first omnidirectional microphone provided at a second end of the first sound path, a second omnidirectional microphone provided at a second end of the second sound path, a memory, and a processor coupled to the memory and the processor configured to determine a direction in which a source of a reached sound exists, based on at least one of a sound pressure difference between a first sound pressure that is a sound pressure of a first frequency component of a first part of the reached sound acquired by the first omnidirectional microphone and a second sound pressure that is a sound pressure of the first frequency component of a second part of the reached sound acquired by the second omnidirectional microphone, and a phase difference between a first phase that is a phase of a second frequency component of the first part of the reached sound and a second phase that is a phase of the second frequency component of the second part of the reached sound.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a table representing an example of a sound pressure difference between a sound pressure of a first microphone and a sound pressure of a second microphone when an area of a flat surface is different;

FIG. 9 is a table exemplifying a sound source direction determination reference according to the first to fourth embodiments;

FIG. 19 is a table illustrating an example of a comparison between a size of a directional microphone and a size of an omnidirectional microphone;

FIG. 21 is a table illustrating an example of a comparison between a pressure sound difference in the related art and a sound pressure difference in the present embodiment;

DESCRIPTION OF EMBODIMENTS

Since a directional microphone is larger in size and higher in price than that of an omnidirectional microphone, a device for determining a sound source direction using a directional microphone becomes large in size and expensive in price, as compared with a device for determining a sound source direction using an omnidirectional microphone.

An embodiment of a technology for improving the accuracy of a sound source direction determination by using an omnidirectional microphone will be described.

First Embodiment

Hereinafter, an example of a first embodiment will be described in detail with reference to the accompanying drawings.

Figure 1:
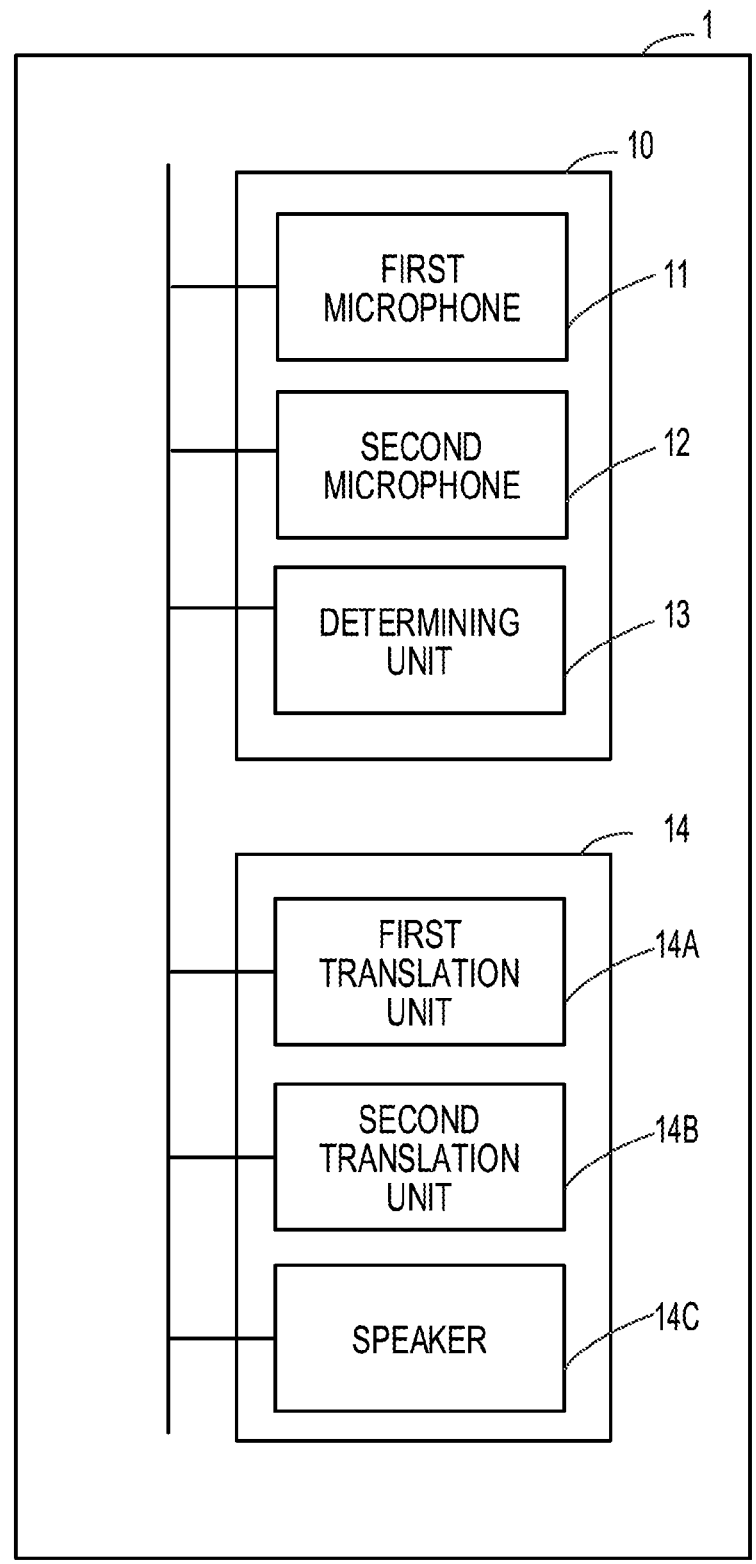
FIG. 1 is a block diagram illustrating an example of an information processing terminal according to first to fifth embodiments.

FIG. 1 illustrates the functions of main parts of an information processing terminal 1. The information processing terminal 1 includes a device for determining a sound source direction 10 and a voice translation device 14.

The device for determining a sound source direction 10 includes a first microphone 11 (hereinafter, also referred to as a "mic"), a second microphone 12, and a determining unit 13. The voice translation device 14 includes a first translation unit 14A, a second translation unit 14B, and a speaker 14C.

Each of the first microphone 11 and the second microphone 12 is an omnidirectional microphone, and obtains a sound in all directions. The determining unit 13 determines a direction in which sound sources of sounds acquired by the first microphone 11 and the second microphone 12 exist. The voice translation device 14 translates a language indicated by a sound signal corresponding to the sound propagated in the sound source direction acquired by the first microphone 11 or the second microphone 12 into a predetermined language based on the sound source direction determined by the determining unit 13.

Specifically, when the determining unit 13 determines that the sound source exists, for example, in a first direction that is an upper side, the first translation unit 14A translates a language indicated by a sound signal corresponding to the acquired sound into a first language (e.g. English). When the determining unit 13 determines that the sound source exists, for example, in a second direction that is a front side, the second translation unit 14B translates a language indicated by a sound signal corresponding to the acquired sound into a second language (e.g., Japanese). The speaker 14C outputs the language translated by the first translation unit 14A or the second translation unit 14B as a sound.

Figure 2A:
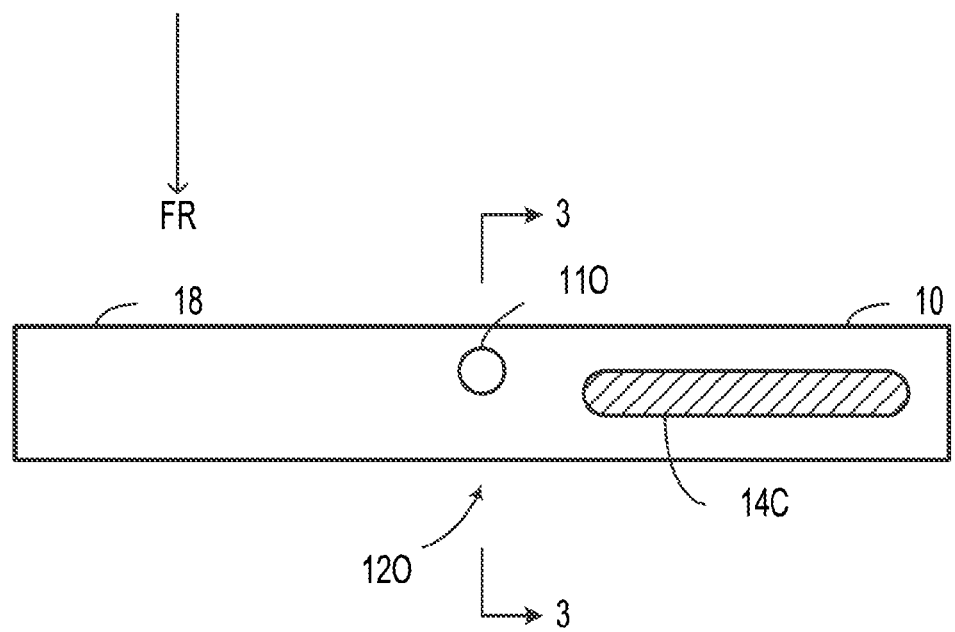
FIG. 2A is a conceptual diagram illustrating an example of an external appearance of a device for determining a sound source direction according to the first, second, fourth, and fifth embodiments.
Figure 2B:
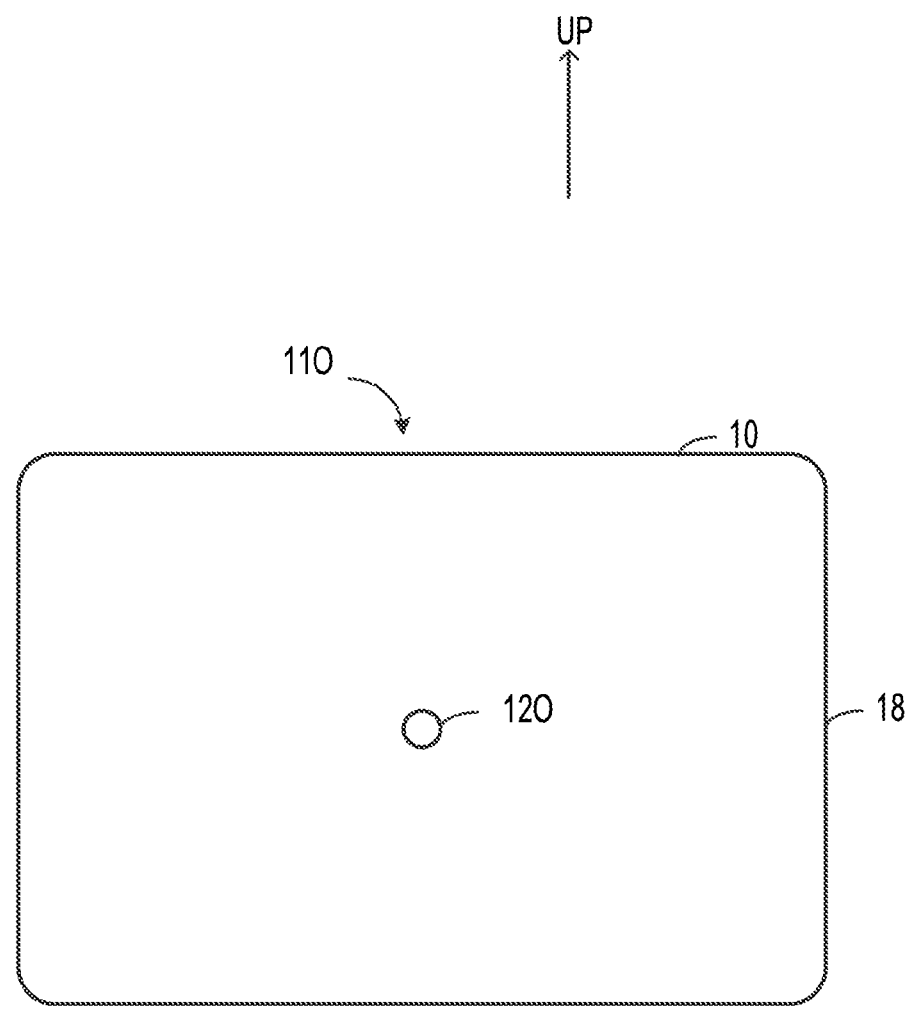
FIG. 2B is a conceptual diagram illustrating an example of an external appearance of a device for determining a sound source direction according to the first, second, fourth, and fifth embodiments.

FIGS. 2A and 2B illustrate the external appearance of the device for determining a sound source direction 10. It is assumed that the device for determining a sound source direction 10 is, for example, a device which is used by putting into a chest pocket of a shirt of a user and fixed to a portion corresponding to the vicinity of the chest of the user in the cloth by using, for example, a clip or a pin, or dropped from the neck of the user by using a strap. FIG. 2A exemplifies an upper surface of a case 18 of the device for determining a sound source direction 10. The case 18 is an example of a microphone installation part. The upper surface of the case 18, which is an example of a first flat surface, is a surface directed toward the upper side, that is, a surface closest to the mouth of the user, when the device for determining a sound source direction 10 is put into a chest pocket.

On the upper surface of the case 18, there is an opening portion 110, which is an example of a first opening portion provided at one end of a first sound path. The first microphone 11 is installed at the other end of the first sound path. Hereinafter, in the drawing, the arrow FR indicates the front side of the device for determining a sound source direction 10. The speaker 14C is also disposed on the upper surface of the case 18. That is, in the example of FIGS. 2A and 2B, the voice translation device 14 is included in the case 18 of the device for determining a sound source direction 10. A length in the front-rear direction of the upper surface of the case 18 is, for example, 1 cm.

FIG. 2B exemplifies the front surface of the case 18 of the device for determining a sound source direction 10. The front surface, which is an example of a second flat surface, is, for example, a surface opposite to a conversation partner with which the user talks, when the device for determining a sound source direction 10 is put into the chest pocket.

On the front surface of the case 18, there is an opening portion 120 provided at one end of a second sound path. The second microphone 12 is installed at the other end of the second sound path. Hereinafter, in the drawing, the arrow UP indicates the upper side of the device for determining a sound source direction 10. The front surface of the case 18 has approximately the same size as a size of a general business card.

The device for determining a sound source direction 10 determines that the sound, of which the sound source is determined to exist at the upper side, is a sound uttered by the user, and transmits a sound signal corresponding to the sound to the first translation unit 14A of the voice translating device 14 such that the sound is translated into the first language and output as a sound from the speaker 14C. Further, the device for determining a sound source direction 10 determines the sound, of which the sound source is determined to exist in the front side, is the sound uttered by the conversation partner. The device for determining a sound source direction 10 transmits a sound signal corresponding to the sound to the second translation unit 14B of the voice translating device 14 such that the sound is translated into the second language and output as a sound from the speaker 14C.

Figure 3:
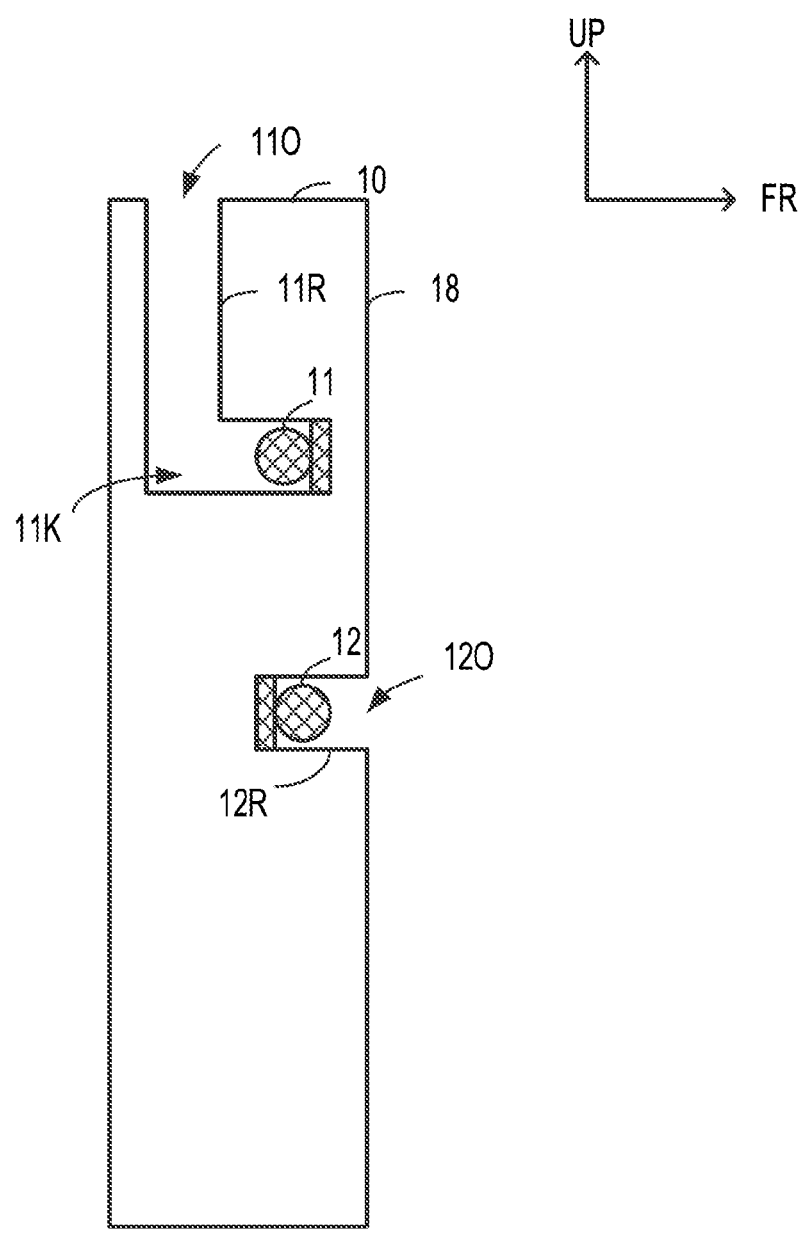
FIG. 3 is a cross-sectional view taken along cutting line 3-3 of FIG. 2A according to the first, fourth, and fifth embodiments.

FIG. 3 is a cross-sectional view taken along cutting line 3-3 of FIG. 2A. One end of the second sound path 12R has an opening portion 120 opened in the front surface of the case 18, and the second microphone 12 is installed at the other end of the second sound path.

One end of the first sound path 11R has an opening portion 110 opened in the upper surface of the case 18, and the first microphone 11 is installed at the other end of the first sound path 11R. The first sound path 11R has a bent portion 11K in the middle thereof. The bent portion 11K is an example of a second diffraction part.

Figure 4A:
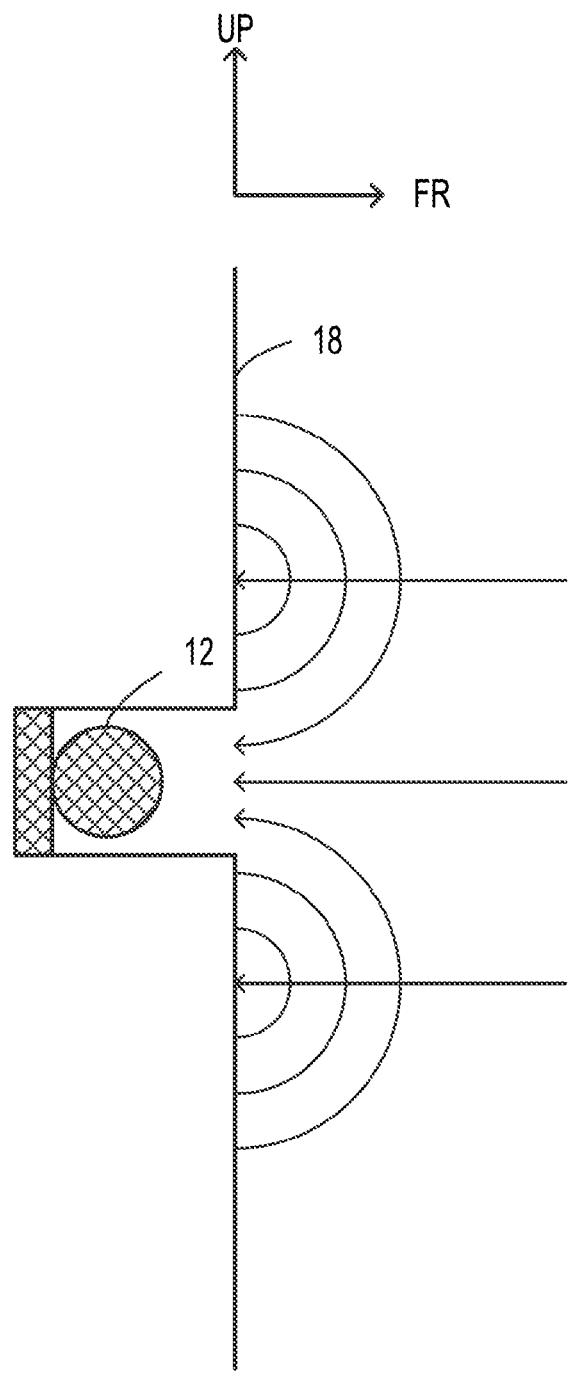
FIG. 4A is a conceptual diagram for describing diffraction of a sound according to the first, third, fourth, and fifth embodiments.

FIG. 4A exemplifies a case where a sound source exists in the front side of the device for determining a sound source direction 10. When the area of the front surface of the case 18 is larger than a predetermined value which is an example of a first predetermined value, the second microphone 12 acquires a sound reflected from the front surface of the case 18 and diffracted in the opening portion 120 which is an example of a third diffraction part, in addition to a directly contacting sound, through the opening portion 120.

Figure 4B:
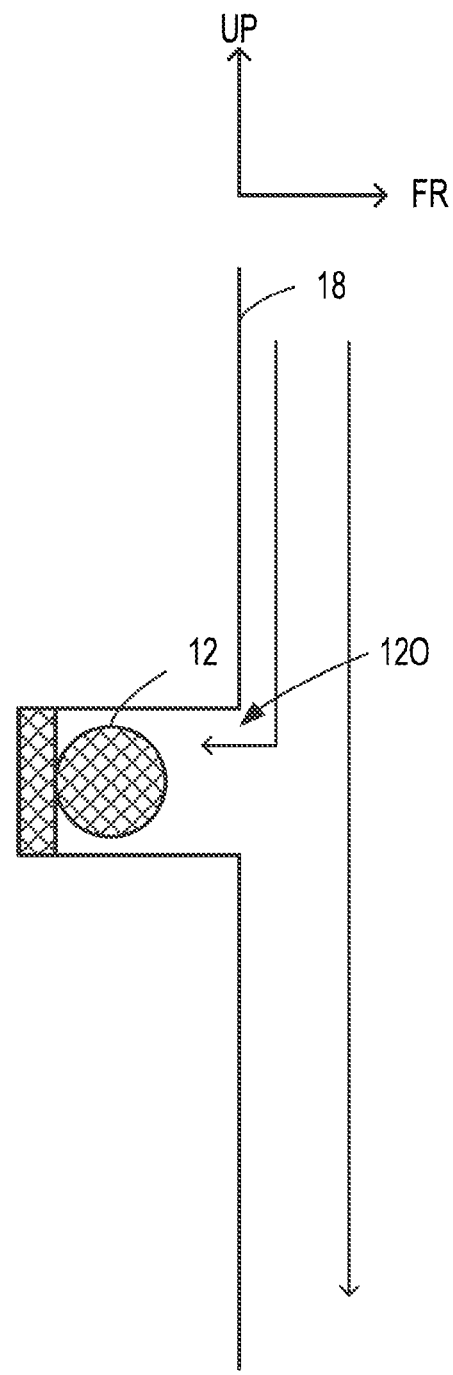
FIG. 4B is a conceptual diagram for describing diffraction of a sound according to the first, third, fourth, and fifth embodiments.

FIG. 4B exemplifies a case where a sound source exists at the upper side of the device for determining a sound source direction 10. A sound is not in direct contact with the second microphone 12, and the second microphone 12 acquires a sound diffracted in the opening portion 120. Accordingly, a sound pressure of the sound acquired by the second microphone 12 is larger in a case where the sound source exists in the front side, than a case where the sound source exists at the upper side.

FIG. 5 exemplifies sound pressures acquired by the second microphone 12 when the sound source exists in the front side of the device for determining a sound source direction 10 and the sound source exists at the upper side of the device for determining a sound source direction 10. When the area of the front surface of the device for determining a sound source direction 10 is 2 cm², which is an example of a size equal to or smaller than a predetermined value, the sound pressure of the sound of which the sound source exists in the front side of the device for determining a sound source direction 10, is −26 dBov. Further, the sound pressure of the sound of which the sound source exists at the upper side of the device for determining a sound source direction 10, is −29 dBov. Accordingly, a sound pressure difference between the sound pressure of the sound from the sound source existing in the front side of the device for determining a sound source direction 10 and the sound pressure of the sound from the sound source existing at the upper side of the device for determining a sound source direction 10 is 3 dB.

In the meantime, when the area of the front surface of the device for determining a sound source direction 10 is 63 cm² which is an example of a size larger than a predetermined value, the sound pressure of the sound which the sound source exists in the front side of the device for determining a sound source direction 10, is −24 dBov. Further, the sound pressure of the sound of which the sound source exists at the upper side of the device for determining a sound source direction 10 is −30 dBov. Accordingly, a sound pressure difference between the sound pressure of the sound from the sound source existing in the front side of the device for determining a sound source direction 10 and the sound pressure of the sound from the sound source existing at the upper side of the device for determining a sound source direction 10 is 6 dB.

That is, in the case where the area of the front surface of the device for determining a sound source direction 10 is 63 cm², the sound pressure difference by the direction of the sound source is large, and it is easy to determine a direction of the sound source, compared to the case where the area of the front surface of the device for determining a sound source direction 10 is 2 cm². The reason is that when the area of the front surface of the device for determining a sound source direction 10 is larger than the predetermined value, the sound source sufficiently reflects the sound existing in the front side of the device for determining a sound source direction 10.

The predetermined value may also be, for example, 1,000 times the cross-section area of the sound path. That is, in a case where a diameter of a mic hole of the second microphone 12 is, for example, 0.5 mm, and the second sound path 12R has a circular cross section having a diameter of 1 mm, which is a length two times the diameter of the mic hole of the second microphone 12, the area of the front surface of the device for determining a sound source direction 10 may be larger than about 785 mm². Further, for example, the second sound path 12R may have the same diameter from one end to the other end thereof, or a diameter of the second sound path 12R may be gradually decreased from one end toward the other end. Further, the second sound path may also have, for example, a rectangular cross section.

The length from one end to the other end of the second sound path 12R may be, for example, 3 mm, but may be larger or shorter than 3 mm. Further, the second sound path 12R may be orthogonal to the front surface of the case 18, and the second sound path 12R and the front surface of the case 18 may cross each other at an angle other than 90°.

Figure 6A:
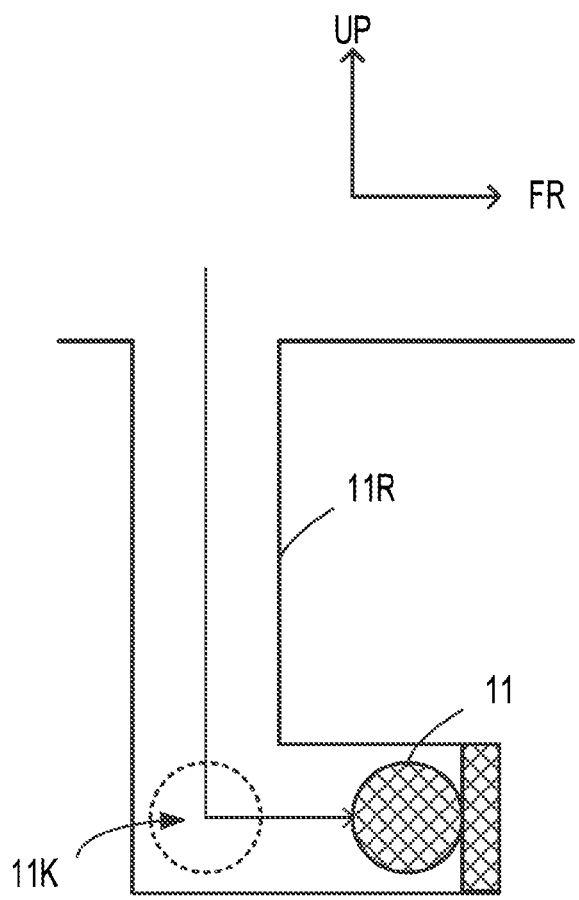
FIG. 6A is a conceptual diagram for describing diffraction of a sound according to the first, second, fourth, and fifth embodiments.
Figure 6B:
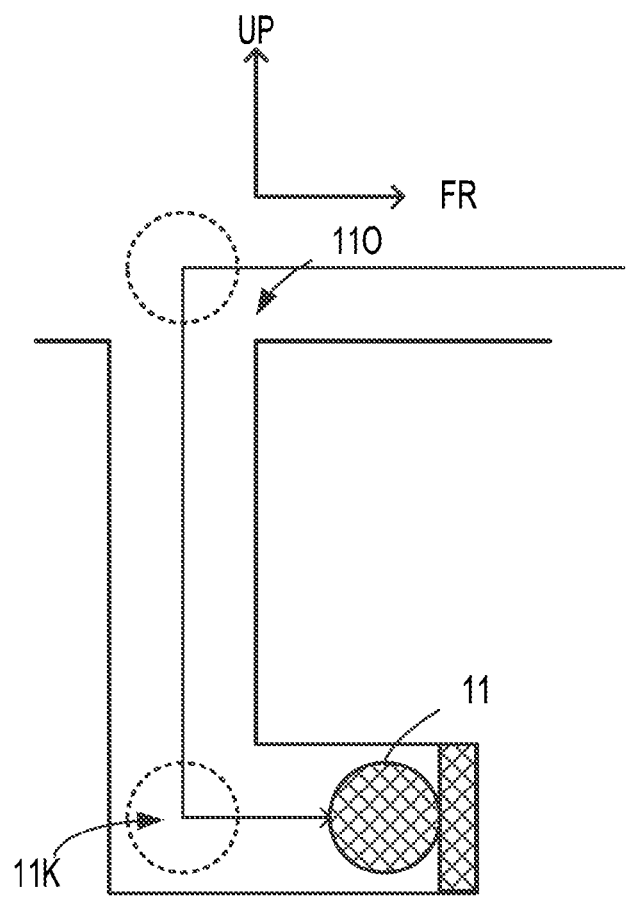
FIG. 6B is a conceptual diagram for describing diffraction of a sound according to the first, second, fourth, and fifth embodiments.

FIGS. 6A and 6B illustrate the sound pressures acquired by the first microphone 11 when the sound source exists at the upper side of the device for determining a sound source direction 10 and the sound source exists in the front side of the device for determining a sound source direction 10. FIG. 6A exemplifies a case where the sound source exists at the upper side of the device for determining a sound source direction 10.

Since the length of the upper surface of the case 18 in the front-rear direction is small, and the area of the upper surface is equal to or smaller than the predetermined value, even when the sound source exists at the upper side of the device for determining a sound source direction 10, it is impossible to expect the acquisition of the sound by the reflection and the diffraction of the sound exemplified in FIG. 4A. Therefore, the bent portion 11K is provided in the first sound path 11R. Since the first sound path 11R has the bent portion 11K, the sound from the upper side is not in direct contact with the first microphone 11, is diffracted in the bent portion 11K of the first sound path 11R, and is acquired by the first microphone 11.

FIG. 6B exemplifies a case where the sound source exists in the front side of the device for determining a sound source direction 10. The sound is diffracted in the opening portion 110 which is the example of the first diffraction part, and is further diffracted in the bent portion 11K to be acquired by the first microphone 11.

Figure 7:
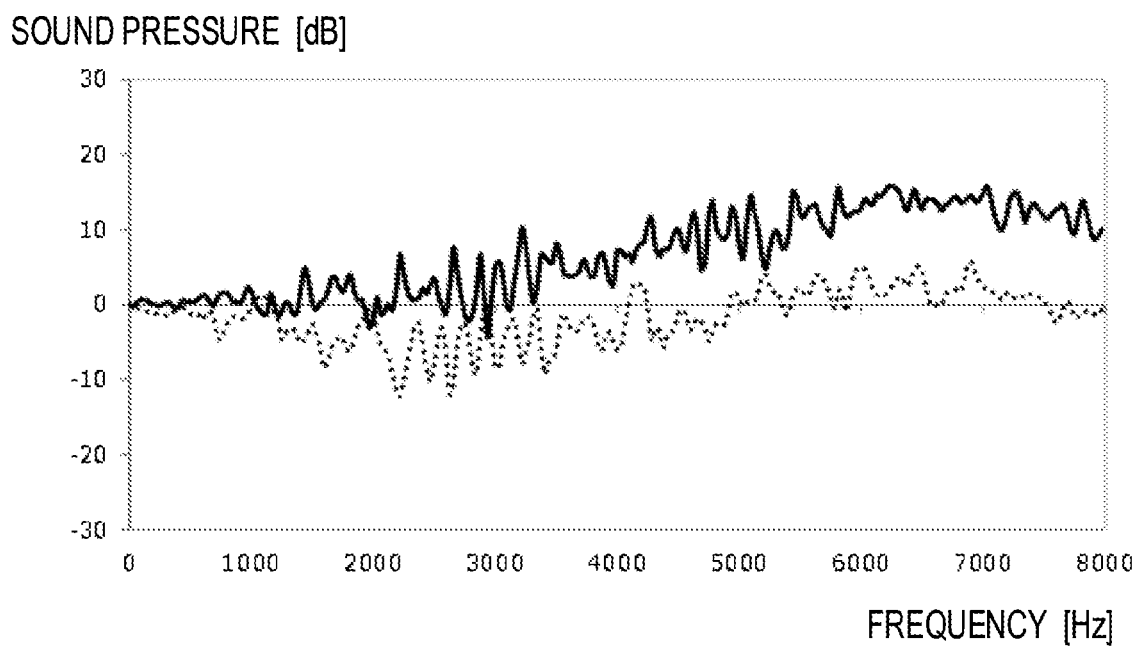
FIG. 7 is a graph for describing a fall of a sound pressure by diffraction according to a frequency axis.

FIG. 7 exemplifies a sound pressure difference between a sound pressure of a sound acquired by the first microphone 11 when the sound source exists at the upper side of the device for determining a sound source direction 10 and a sound pressure of a sound acquired by the first microphone 11 when the sound source exists in the front side of the device for determining a sound source direction 10. A solid line indicates a sound pressure (dB) of a sound acquired by the first microphone 11 when the sound source exists at the upper side of the device for determining a sound source direction 10, and a broken line indicates a sound pressure (dB) of a sound acquired by the first microphone 11 when the sound source exists in the front side of the device for determining a sound source direction 10.

That is, the vertical distance between the solid line and the broken line indicates a sound pressure difference between the sound pressure of the sound acquired by the first microphone 11 when the sound source exists at the upper side of the device for determining a sound source direction 10 and the sound pressure of the sound acquired by the first microphone 11 when the sound source exists in the front side of the device for determining a sound source direction 10. A horizontal axis of a graph of FIG. 7 indicates a frequency (Hz), and the sound pressure difference tends to be small as a frequency is low and tends to be large as a frequency is high. That is, a sound pressure difference between the case where the sound source exists at the upper side of the device for determining a sound source direction 10, in which the number of times of the diffraction is one and the case where the sound source exists in the front side of the device for determining a sound source direction 10, in which the number of times of the diffraction is two, becomes conspicuous as the frequency is high.

A sound reduction volume R (dB) by the diffraction is expressed by, for example, Equation (1).

$$R = \begin{cases} 10\log_{10}N + 13 & \text{for } N \geq 1.0 \\ 5 \pm [8/\sinh^{-1}(1)] \cdot \sinh^{-1}(|N|^{0.485}) & \text{for } -0.324 \leq N < 1.0 \\ 0 & \text{for } N < -0.324 \end{cases} \quad (1)$$

N is a Fresnel number, and is expressed by Equation (2).

$$N = \delta/(\lambda/2) = \delta \cdot f/165 \quad (2)$$

The symbol "δ" indicates a course difference [m] between a diffraction course and a direct course, the symbol "A" is a wavelength [m] of a sound, "f" is a frequency [Hz] of a sound, and a sound speed (=λ×f) is 330 m/sec. That is, as represented in the graph of FIG. 7, the sound reduction volume R by diffraction tends to be large as the frequency "f" is high. Accordingly, in the present embodiment, when the direction of the sound source is determined, a sound pressure difference of a high-range component of the sound is used.

When a diameter of the mic hole of the first microphone 11 is 0.5 mm, the first sound path 11R may have a circular cross section having a diameter of 1 mm, which is a length two times the diameter of the mic hole. Further, for example, the first sound path 11R may have the same diameter from one end to the other end, and a diameter of the first sound path 11R may be gradually decreased from one end toward the other end.

The first sound path 11R may have the diameter gradually decreasing from one end toward the bent portion 11K and have the same diameter from the bent portion 11K to the other end. Further, the first sound path 11R may also have, for example, a rectangular cross section.

A length from one end to the bent portion 11K of the first sound path 11R and a length from the bent portion 11K to the other end of the first sound path 11R may be, for example, 3 mm, but may be larger or shorter than 3 mm. Further, the portion from one end to the bent portion 11K of the first sound path 11R may be orthogonal to the upper surface of the case 18, and the first sound path 11R and the upper surface of the case 18 may cross at an angle other than 90°. Further, the portion from the bent portion 11K to the other end of the first sound path 11R may also be orthogonal to the portion from the one end to the bent portion 11K, and may cross the portion from the one end to the bent portion 11K at an angle other than 90°.

The vicinity of the first microphone 11 is surrounded by a lateral wall, except for a connection portion of the other end of the first sound path 11R and the lateral wall, so that there is no gap between the other end and the lateral wall. Further, the vicinity of the second microphone 12 is surrounded by a lateral wall, except for a connection portion of the other end of the second sound path 12R and the lateral wall, so that there is no gap between the other end and the lateral wall. Further, the upper surface of the case 18 is orthogonal to the front surface of the case 18. However, the present embodiment is not limited to the example in which the upper surface of the case 18 is orthogonal to the front surface of the case 18, and the upper surface and the front surface of the case 18 may cross at an angle other than 90°.

Figure 8:
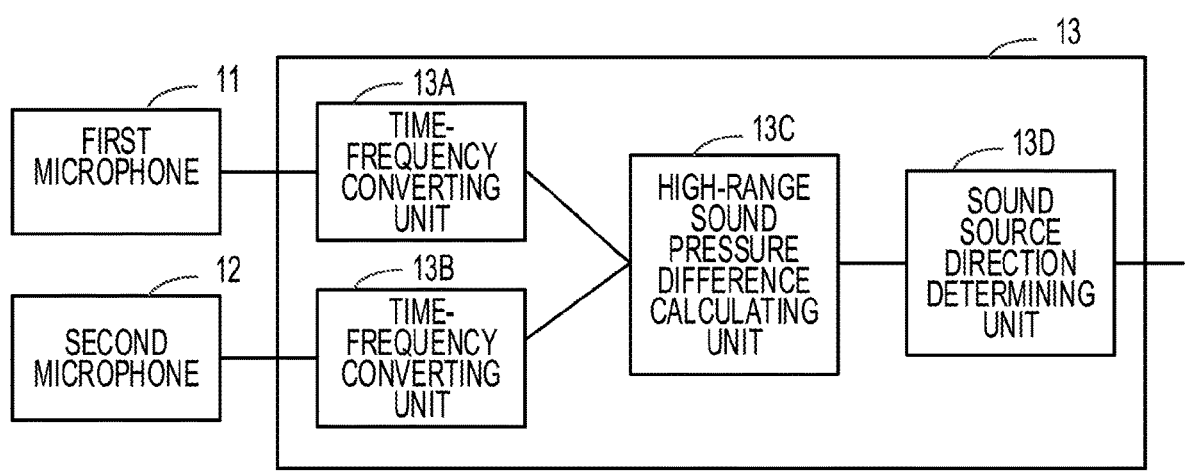
FIG. 8 is a block diagram exemplifying an outline of a sound source direction determination processing according to the first to third embodiments.

An outline of a sound source direction determination processing performed by the determining unit 13 of the first embodiment will be exemplified with reference to FIG. 8. A time-frequency converting unit 13A time-frequency converts a sound signal corresponding to the sound acquired by the first microphone 11 installed as exemplified in FIG. 3. Similarly, a time-frequency converting unit 13B time-frequency converts the sound signal corresponding to the sound acquired by the second microphone 12 installed as exemplified in FIG. 3. The time-frequency conversion uses, for example, fast Fourier transformation (FFT).

As described above, the sound pressure difference between the sound pressure of the sound acquired by the first microphone 11 and the sound pressure of the sound acquired by the second microphone 12 is conspicuous in the high-range component. Accordingly, a high-range sound pressure difference calculating unit 13C calculates an average value of sound pressure differences for every frequency band at a frequency higher than a predetermined frequency as a high-range sound pressure difference. A sound source direction determining unit 13D determines a position of the sound source based on the high-range sound pressure difference calculated by the high-range sound pressure difference calculating unit 13C.

Specifically, the high-range sound pressure difference calculating unit 13C calculates spectrum power pow1 (bin) of the sound signal corresponding to the sound acquired by the first microphone 11 according to Equation (3), and calculates spectrum power pow2 (bin) of the sound signal corresponding to the sound acquired by the second microphone 12 according to Equation (4).

$$pow1[bin]=re1[bin]2+im1[bin]2 \quad (3)$$

$$pow2[bin]=re2[bin]2+im2[bin]2 \quad (4)$$

Bin=0, . . . , and F−1. F is a frequency band number, and may be, for example, 256. re1[bin] is an actual part of the frequency spectrum of the frequency band bin acquired when the sound signal of the sound acquired by the first microphone 11 is time-frequency converted. Further, im1[bin] is an imaginary part of the frequency spectrum of the frequency band bin acquired when the sound signal of the sound acquired by the first microphone 11 is time-frequency converted.

re2[bin] is an actual part of the frequency spectrum of the frequency band bin acquired when the sound signal of the sound acquired by the second microphone 12 is time-frequency converted. Further, im2[bin] is an imaginary part of the frequency spectrum of the frequency band bin acquired when the sound signal of the sound acquired by the second microphone 12 is time-frequency converted.

Next, a high-range sound pressure difference d_pow is calculated by Equation (5).

$$d\_pow=(\Sigma_{i=s}^{F-1} 10 \log_{10}(pow1[i]/pow2[i]))/((F-1)-s) \quad (5)$$

A high-range sound pressure difference d_pow is an example of a difference in a sound pressure, and is an average value of values obtained by subtracting the logarithm of spectrum power pow2[i] from the logarithm of spectrum power pow1[i]. The symbol "s" is a lower-limit frequency band number in the high range, and may be, for example, 96. When a sampling frequency of the sound signal is 16 kHz, and s=96, the high range is 3,000 Hz to 8 kHz.

FIG. 9 exemplifies a determination reference and a determination result of the sound source direction determining unit 13D. The high-range sound pressure difference d_pow is compared with a first threshold value that is a plus value, and when the high-range sound pressure difference d_pow is larger than the first threshold value, it is determined that the sound source exists at a position opposite to the upper surface of the case 18, that is, the upper side. Further, the high-range sound pressure difference d_pow is compared with a second threshold value that is a negative value, and when the high-range sound pressure difference d_pow is smaller than the second threshold value, it is determined that the sound source exists at a position opposite to the front surface of the case 18, that is, the front side.

As exemplified in FIG. 9, when the high-range sound pressure difference d_pow is equal to or larger than the second threshold value and equal to or smaller than the first threshold value, it is determined that it is impossible to determine the sound source direction. The first threshold value may be, for example, 1.5 dB, and the second threshold value may be, for example, −1.5 dB.

When the high-range sound pressure difference d_pow is acquired, the spectrum power of the second microphone 12 having the opening 120 in the front surface of the case 18 serves as a reference in Equation (5), so that the determination result exemplified in FIG. 9 is obtained. However, as exemplified in Equation (6), when the high-range sound pressure difference d_pow is acquired by using the spectrum power of the first microphone 11 having the opening portion 110 in the upper surface of the case 18 as a reference, the determination result is different.

$$d\_pow = (\Sigma_{i=s}^{F-1} 10 \log_{10}(pow2[i]/pow1[i]))/((F-1)-s) \qquad (6)$$

The high-range sound pressure difference d_pow is compared with the first threshold value that is a plus value, and when the high-range sound pressure difference d_pow is larger than the first threshold value, it is determined that the sound source exists at a position opposite to the front surface of the case 18, that is, the front side. Further, the high-range sound pressure difference d_pow is compared with the second threshold value that is a negative value, and when the high-range sound pressure difference d_pow is smaller than the second threshold value, it is determined that the sound source exists at a position opposite to the upper surface of the case 18, that is, the upper side.

Equations (5) and (6) for acquiring the high-range sound pressure difference are examples, and the present embodiment is not limited thereto. Further, the example, in which the high-range sound pressure difference that is the difference between the sound pressure of the high-range component of the sound acquired by the first microphone 11 and the sound pressure of the high-range component of the sound acquired by the second microphone 12 is used, has been described, but the present embodiment is not limited to the example.

The difference between a sound pressure of a predetermined frequency component of the sound acquired by the first microphone 11 and the sound pressure of the predetermined frequency component of the sound acquired by the second microphone 12 may be used instead of the high-range sound pressure difference. The predetermined frequency component is an example of a first frequency component, and may be satisfactory as the high-range component, but as long as a sound pressure difference between the first microphone 11 and the second microphone 12 is conspicuous at a frequency component depending on a direction of a sound source, the frequency component is satisfactory. Further, the determination reference and the determination result of FIG. 9 are also examples, and the present embodiment is not limited to the example.

Figure 10:
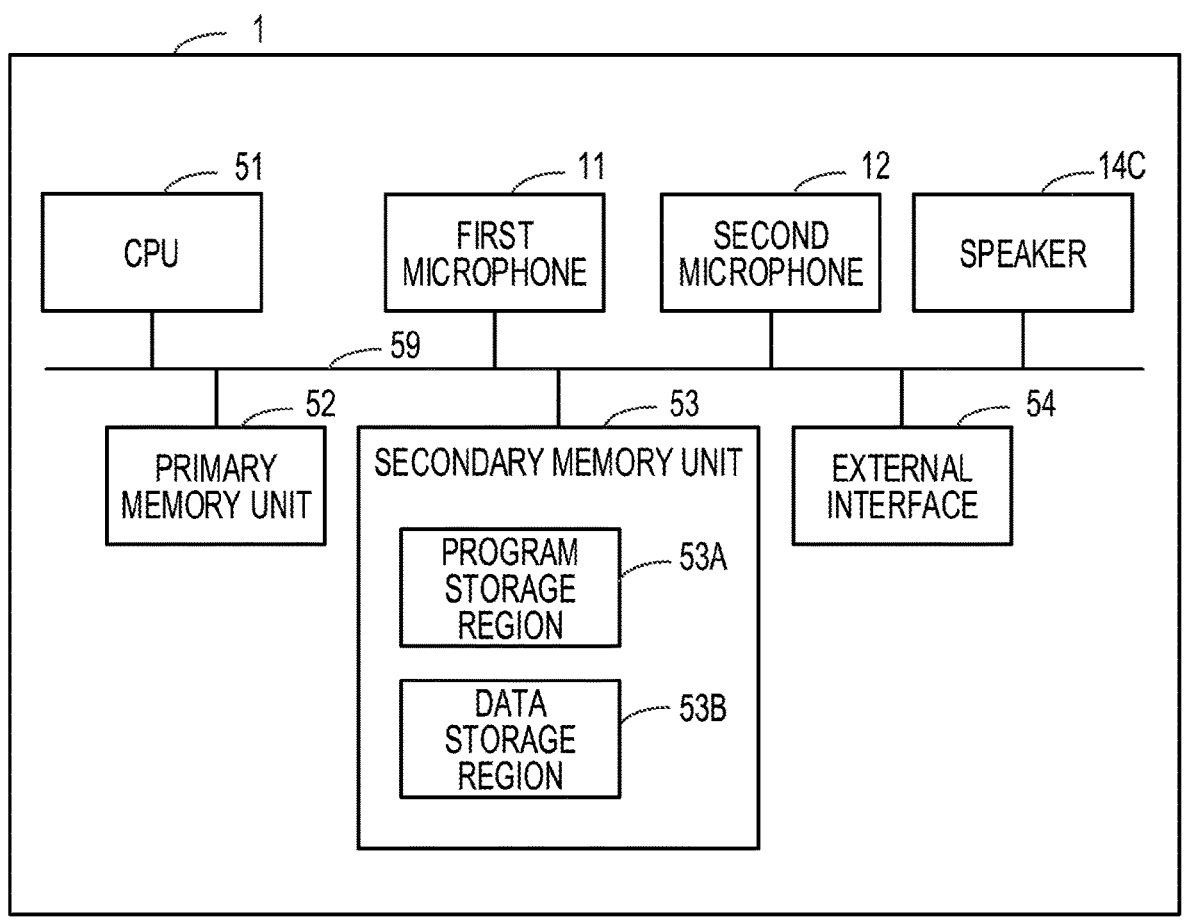
FIG. 10 is a block diagram illustrating an example of hardware of an information processing terminal according to the first to fifth embodiments.

FIG. 10 exemplifies a hardware configuration of the information processing terminal 1. The information processing terminal 1 includes a central processing unit (CPU) 51, which is an example of a hardware processor, a primary memory unit 52, a secondary memory unit 53, and an external interface 54. The information processing terminal 1 also includes the first microphone 11, the second microphone 12, and the speaker 14C.

The CPU 51, the primary memory unit 52, the secondary memory unit 53, the external interface 54, the first microphone 11, the second microphone 12, and the speaker 14C are connected to each other through a bus 59.

The primary memory unit 52 is a volatile memory such as a random access memory (RAM).

The secondary memory unit 53 includes a program storage region 53A and a data storage region 53B. The program storage region 53A stores programs, for example, a sound source direction determining program for causing the CPU 51 to execute the sound source direction determination processing and a voice translation program for causing the CPU 51 to execute the voice translation processing based on a determination result of the sound source direction determination processing. The data storage region 53B stores, for example, the sound signals corresponding to the sounds acquired from the first microphone 11 and the second microphone 12, and intermediate data temporarily generated in the sound source direction determination processing and the voice translation processing.

The CPU 51 reads out the sound source direction determining program from the program storage region 53A and develops the sound source direction determining program in the primary memory unit 52. The CPU 51 executes the sound source direction determining program to operate as the determining unit 13 of FIG. 1. The CPU 51 reads out the voice translation program from the program storage region 53A and develops the voice translation program in the primary memory unit 52. The CPU 51 executes the voice translation program to operate as the first translation unit 14A and the second translation unit 14B of FIG. 1. Further, the program such as the sound source direction determining program and the voice translation program may be stored in a non-transitory recording medium such as a digital versatile disc (DVD), be read out through a recording medium reading device, and be developed in the primary memory unit 52.

An external device is connected to the external interface 54, and the external interface 54 serves to transmit/receive various information between the external device and the CPU 51. For example, the speaker 14C may be an external device that is not included in the device for determining a sound source direction 10 and is connected through the external interface 54.

Figure 11:
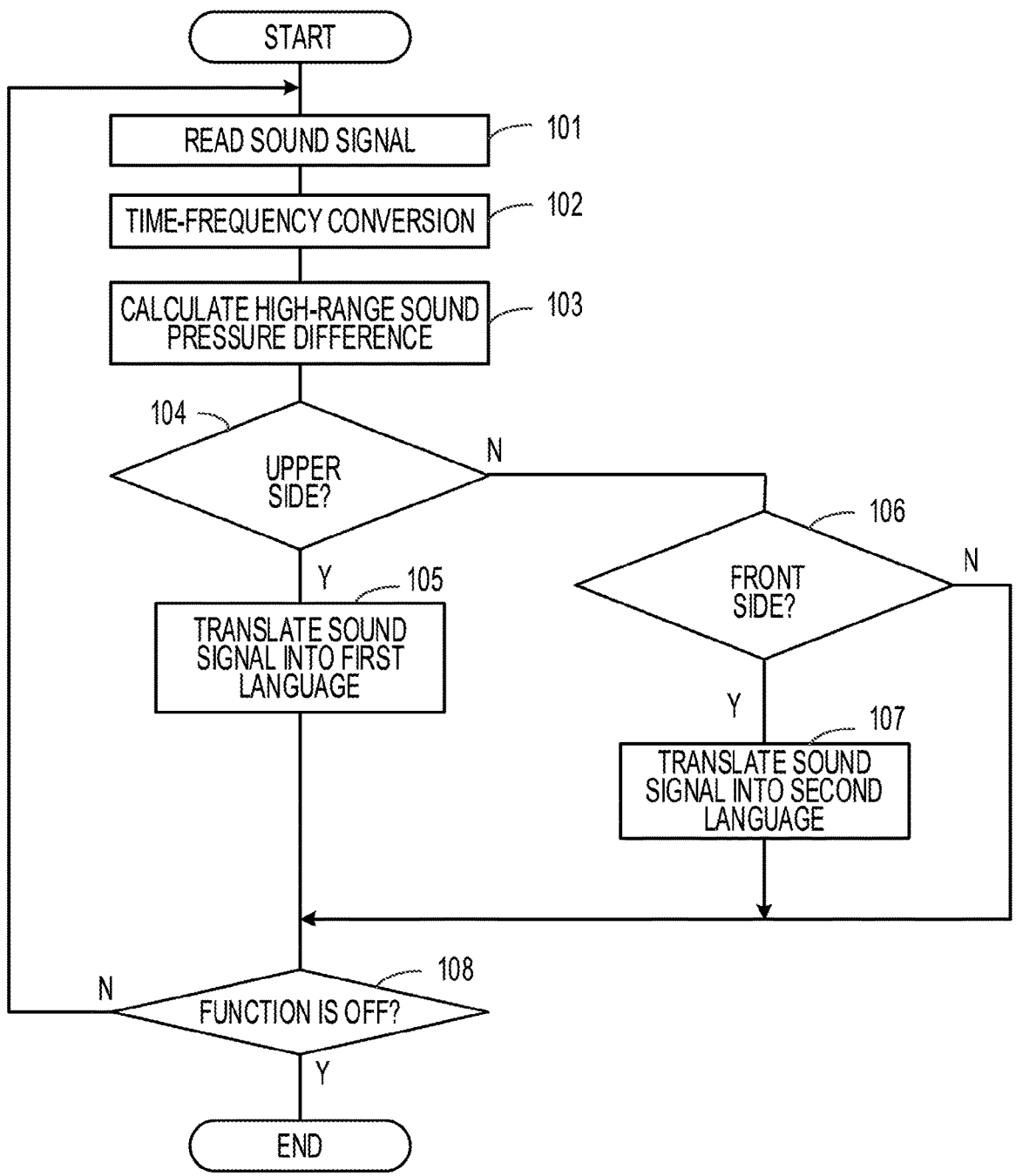
FIG. 11 is a flowchart illustrating an example of a sound source direction determination processing flow according to the first to third embodiments.

Next, an outline of the operation of the device for determining a sound source direction 10 will be schematically described. FIG. 11 schematically exemplifies the outline of the operation of the device for determining a sound source direction 10. For example, when the user inputs power to the device for determining a sound source direction 10, the CPU 51 reads a sound signal of one frame in operation 101. Specifically, the CPU 51 reads a sound signal of one frame corresponding to the sound acquired by the first microphone 11 (hereinafter, referred to as a "first sound signal") and a sound signal of one frame corresponding to the sound acquired by the second microphone 12 (hereinafter, referred to as a "second sound signal"). When a sampling frequency is 16 kHz, one frame may be, for example, 32 msecond.

In operation 102, the CPU 51 time-frequency converts each of the sound signals read in operation 101. In operation 103, the CPU 51 calculates spectrum power of each of the time-frequency converted sound signals by using Equations (3) and (4), and calculates a high-range sound pressure difference d_pow by using Equation (5).

In operation 104, the CPU 51 compares the high-range sound pressure difference d_pow calculated in operation 103 with a first threshold value, and when the high-range sound pressure difference d_pow is larger than the first threshold value, the CPU 51 determines that a sound source exists at the upper side of the device for determining a sound source direction 10 and proceeds to operation 105. The CPU 51 sorts the sound signal to the process of translating the sound signal from the second language into the first language in operation 105, and proceeds to operation 108. The sorted sound signal is translated from the second language into the first language by the existing voice translation processing technology, and is output, for example, as a sound from the speaker 14C.

When it is determined that the high-range sound pressure difference d_pow is equal to or smaller than the first threshold value in operation 104, the CPU 51 compares the high-range sound pressure difference d_pow with a second threshold value, and when the high-range sound pressure difference d_pow is smaller than the second threshold value, the CPU 51 determines that the sound source exists in the front side of the device for determining a sound source direction 10 in operation 106. When the determination of operation 106 is positive, that is, it is determined that that the sound source exists in the front side of the device for determining a sound source direction 10, the CPU 51 proceeds to operation 107. The CPU 51 sorts the sound signal to the processing of translating the sound signal from the first language to the second language in operation 107 and proceeds to operation 108. The sorted sound signal is translated from the first language into the second language by the existing voice translation processing technology, and is output, for example, in the form of a sound in the speaker 14C.

When the determination of operation 106 is negative, the CPU 51 proceeds to operation 108. That is, when the high-range sound pressure difference d_pow is equal to or smaller than the first threshold value and is also equal to or larger than the second threshold value, it is determined that it is impossible to determine the position of the sound source, so that both the translation from the first language into the second language and the translation from the second language into the first language are not performed.

In operation 108, the CPU 51 determines whether the sound source direction determination function of the device for determining a sound source direction 10 is OFF by, for example, an operation of the user. When the determination of operation 108 is negative, that is, the sound source direction determination function is ON, the CPU 51 proceeds to operation 101 to read a sound signal of a next frame and continue the sound source direction determination processing. When the determination of operation 108 is positive, that is, the sound source direction determination function is OFF, the CPU 51 terminates the sound source direction determination processing.

The first sound path and the second sound path are installed inside the microphone installation part of the present embodiment. The first sound path has the opened first opening portion in the first flat surface at one end thereof, and a sound is propagated in the first opening portion. The second sound path, which has the second opening portion opened in the second flat surface crossing the first flat surface at one end thereof, and in which a sound is propagated in the second opening portion, is provided inside the microphone installation part. The first microphone is provided at the other end of the first sound path, and the second microphone is provided at the other end of the second sound path. The determining unit determines a direction in which a sound source exists, based on a difference in a sound pressure. The difference in the sound pressure is a difference between a first sound pressure that is a sound pressure of a first frequency component of the sound acquired by the first microphone and a second sound pressure that is a sound pressure of a first frequency component of the sound acquired by the second microphone.

In the present embodiment, by the configuration described above, it is possible to improve the accuracy of the determination of the sound source direction by using the omnidirectional microphone.

In the present embodiment, the first flat surface is orthogonal to the second flat surface, and the area of the first flat surface is equal to or smaller than a predetermined value, and the area of the second flat surface is larger than a predetermined value. The first sound path includes the first diffraction part, which diffracts a sound to the first opening portion, and further includes the second diffraction part, which is the bent portion diffracting a sound, and the second sound path includes the third diffraction part, which diffracts a sound to the second opening portion.

In the present embodiment, by the configuration described above, even when the area of the flat surface having the opening portion of the sound path is equal to or smaller than the predetermined value, in which it is possible to sufficiently reflect a sound, it is possible to improve accuracy of the determination of the sound source direction by using the omnidirectional microphone.

In the present embodiment, the case where the area of the upper surface of the case is equal to or smaller than the predetermined value and the area of the front surface of the case is larger than the predetermined value has been exemplified, but the area of the upper surface of the case may be larger than the predetermined value and the area of the front surface of the case may be equal to or smaller than the predetermined value. In this case, the first sound path having the opening portion in the upper surface does not include the diffraction part, which is the bent portion, and the second sound path having the opening portion in the front surface has the diffraction part, which is the bent portion.

The case where the voice translation device 14 is included in the case 18 of the device for determining a sound source direction 10 has been exemplified, but the present embodiment is not limited thereto. For example, the voice translation device 14 may exist outside the case 18 of the device for determining a sound source direction 10 and be connected with the device for determining a sound source direction 10 through a wire connection or a wireless connection.

Second Embodiment

Next, an example of the second embodiment will be described. The descriptions of the same configurations and operations as those of the first embodiment will be omitted.

Figure 12:
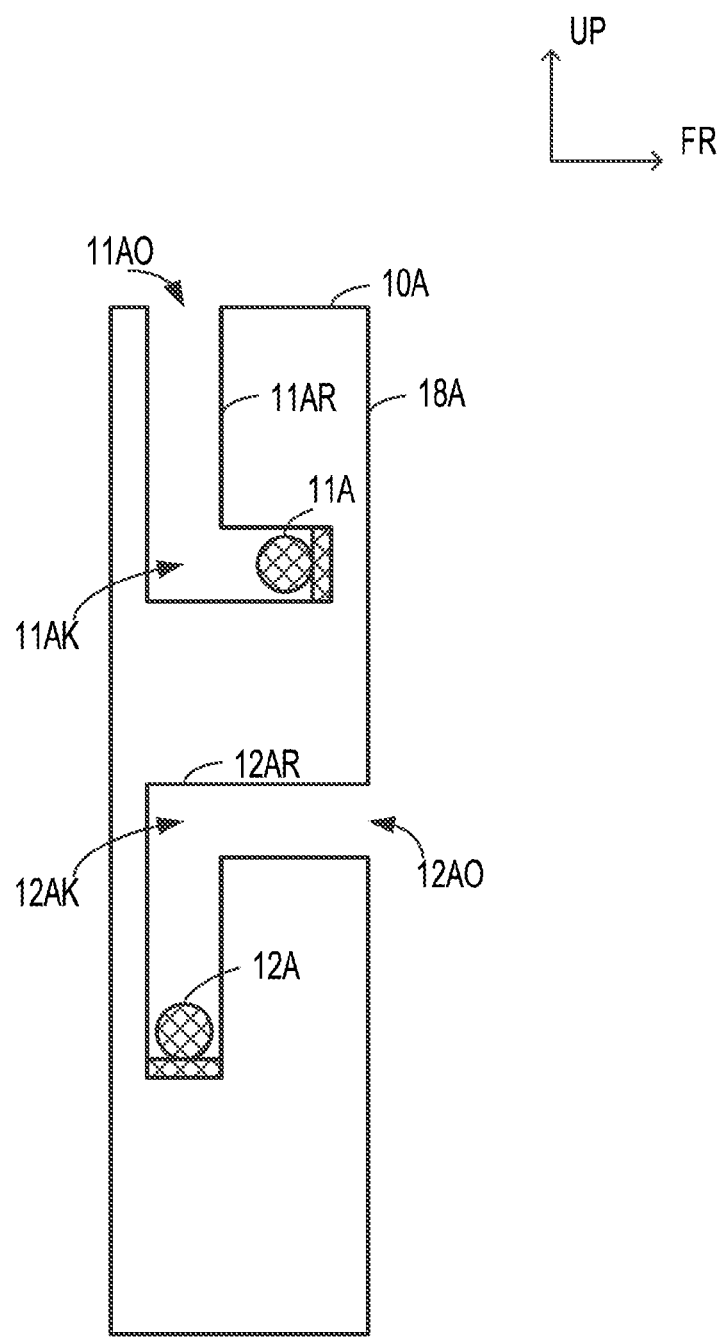
FIG. 12 is a cross-sectional view taken along cutting line 3-3 of FIG. 2A according to the second embodiment.

FIG. 12 exemplifies a cross-sectional view taken along cutting line 3-3 of FIG. 2A. In the second embodiment, similar to the first embodiment, an area of an upper surface of a case 18A of a device for determining a sound source direction 10A is equal to or smaller than a predetermined value, and an area of a front surface of the case 18A of the device for determining a sound source direction 10A is larger than a predetermined value.

In the second embodiment, a first sound path 11AR includes a diffraction part, which is an example of a first diffraction part diffracting a sound to an opening portion 11AO, and includes a diffraction part, which is an example of a second diffraction part that is a bent portion 11AK diffracting a sound in the middle thereof. Further, a second sound path 12AR includes a diffraction part, which is an example of a third diffraction part diffracting a sound to a second opening portion 12AO, and includes a diffraction part, which is an example of a fourth diffraction part that is a bent portion 12AK diffracting a sound in the middle thereof.

The front surface of the case 18A of the device for determining a sound source direction 10A has an area larger than the predetermined value similar to the first embodiment, but unlike the first embodiment, the second sound path 12AR has the bent portion 12AK, which is the diffraction part, in the middle thereof.

In the present embodiment, by the configuration described above, it is possible to improve the accuracy of the determination of the sound source direction by using the omnidirectional microphone by using sound reduction of a predetermined frequency component (for example, the high-range component) by the diffraction.

Third Embodiment

Next, an example of the third embodiment will be described. The descriptions of the same configurations and operations as those of the first embodiment and the second embodiment will be omitted.

Figure 13A:
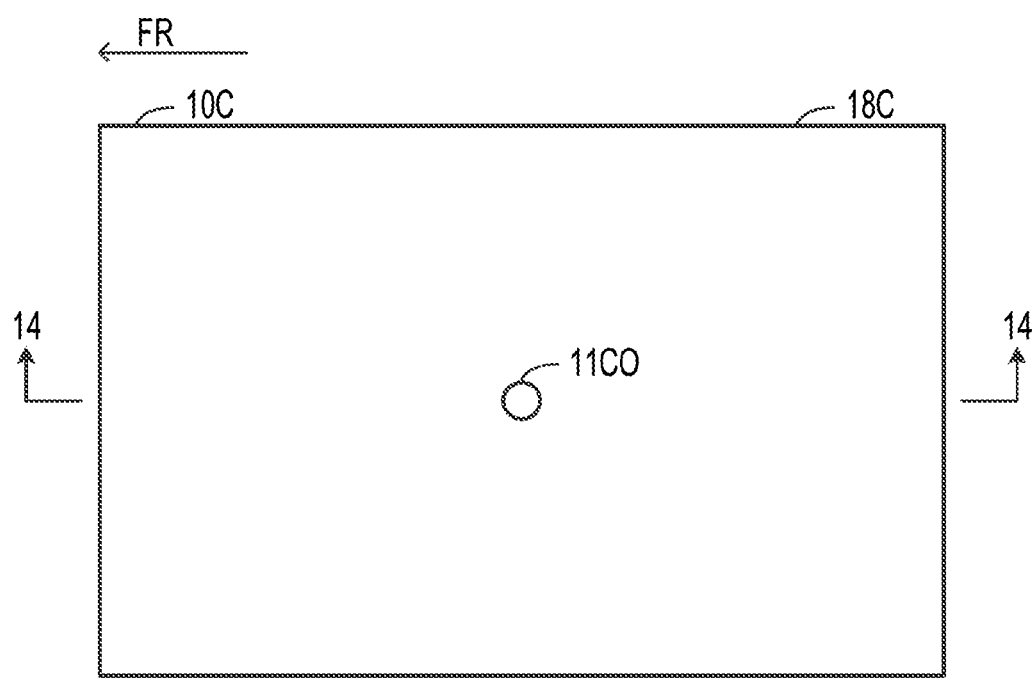
FIG. 13A is a conceptual diagram illustrating an example of an external appearance of a device for determining a sound source direction according to the third and fifth embodiments.
Figure 13B:
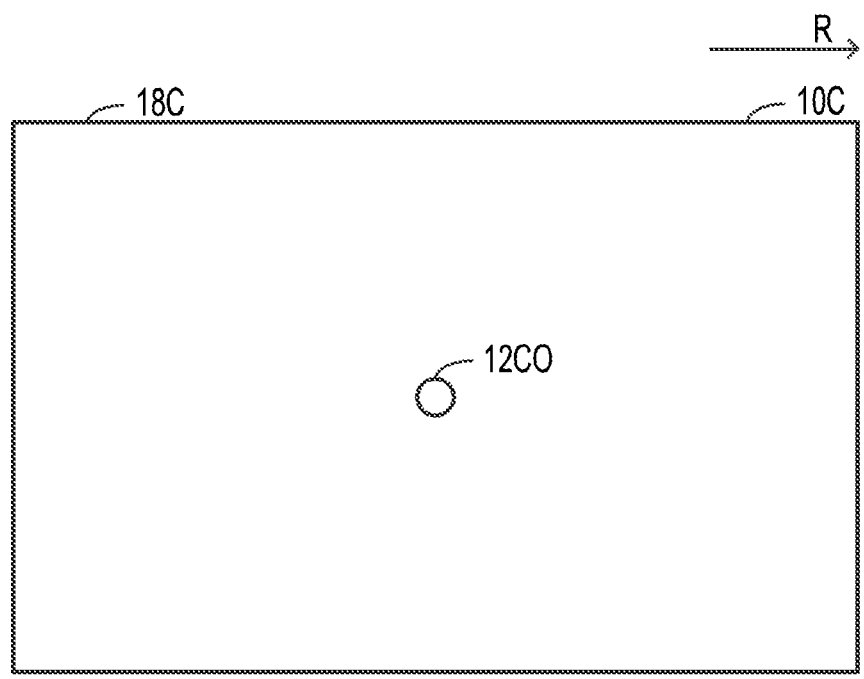
FIG. 13B is a conceptual diagram illustrating an example of an external appearance of a device for determining a sound source direction according to the third and fifth embodiments.
Figure 13C:
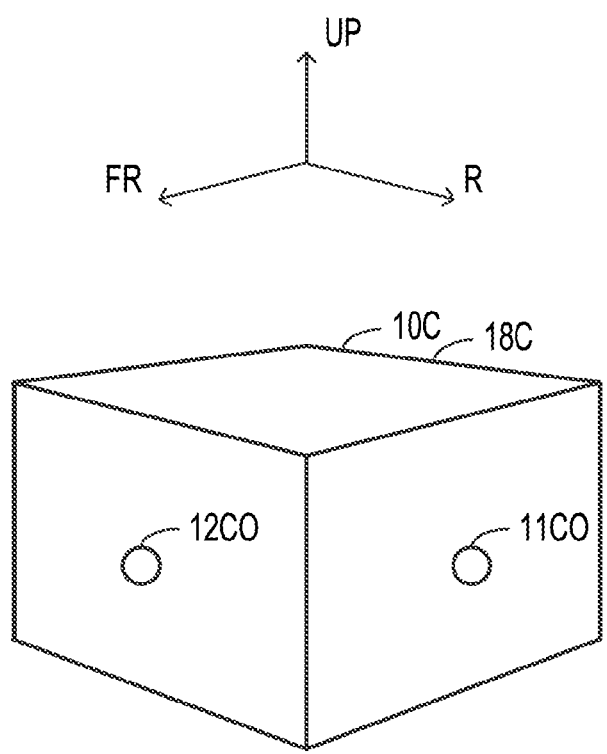
FIG. 13C is a conceptual diagram illustrating an example of an external appearance of a device for determining a sound source direction according to the third and fifth embodiments.

FIGS. 13A to 13C exemplify an external appearance of a device for determining a sound source direction 10C according to the third embodiment. FIG. 13A is a diagram of a right surface of a case 18C, which is an example of a first flat surface, viewed at the front, FIG. 13B is a diagram of a front surface of the case 18C, which is an example of a second flat surface, viewed at the front, and FIG. 13C is a diagram of a side connecting the front surface and the right surface of the case 18C of the device for determining a sound source direction 10C, viewed at the front. In the drawings, the arrow R indicates the right hand when the device for determining a sound source direction 10R is viewed at the front.

Figure 14:
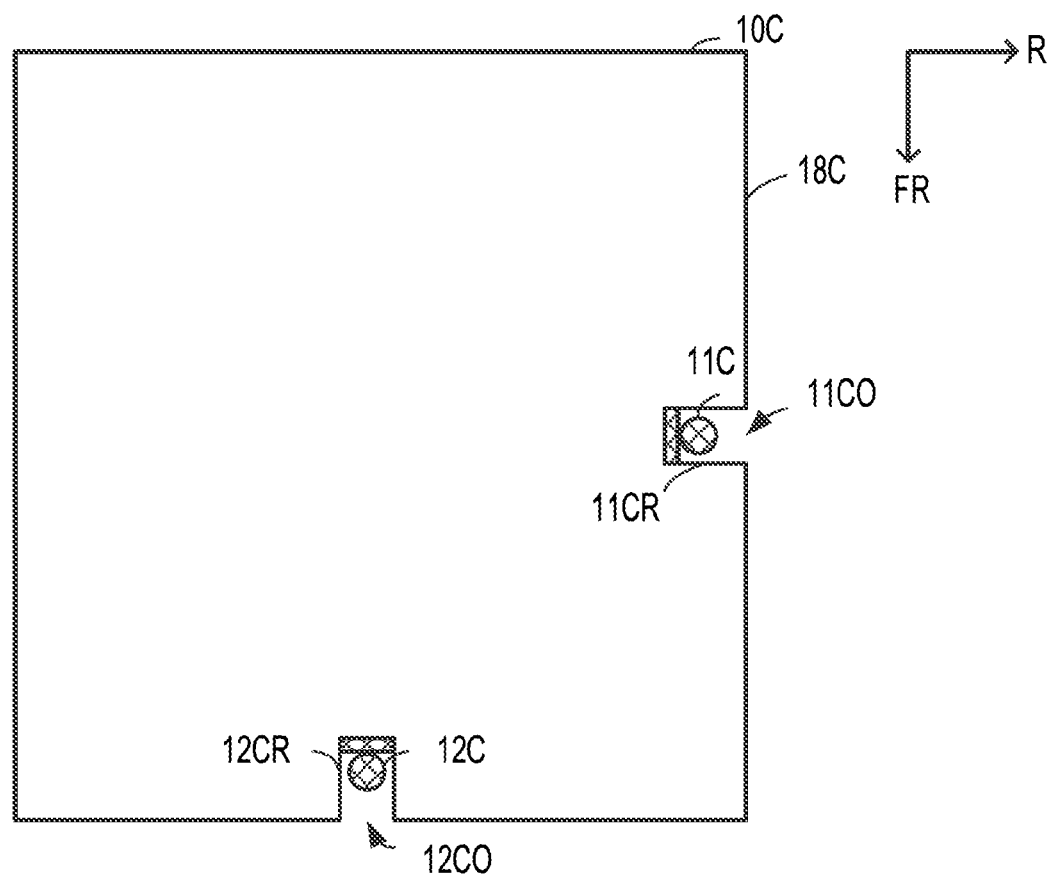
FIG. 14 is a cross-sectional view taken along cutting line 14-14 of FIG. 13A according to the third and fifth embodiments.

FIG. 14 exemplifies a cross-sectional view taken along cutting line 14-14 of FIG. 13A. In the third embodiment, a first sound path 11CR has an opened first opening portion 11CO in the right surface of the case 18C at one end thereof, and a second sound path 12CR has an opened second opening portion 12CO in the front surface of the case 18C at one end thereof. A first microphone 11C is provided at the other end of the first sound path 11CR, and a second microphone 12C is provided at the other end of the second sound path 12CR.

Unlike the first and second embodiments, both the first sound path 11CR and the second sound path 12CR do not have a bent portion, which is a diffraction part, in the middle thereof. The reason is that, in the third embodiment, both the front surface and the right surface of the case 18C have areas larger than a predetermined value, in which it is possible to sufficiently reflect a sound. In the third embodiment, the first sound path 11CR includes a diffraction part, which is an example of a first diffraction part diffracting a sound to a first opening portion 11CO, and the second sound path 12CR includes a diffraction part, which is an example of the second diffraction part diffracting a sound to a second opening portion 12CO.

In the present embodiment, by the configuration described above, it is possible to improve the accuracy of the determination of the sound source direction by using the omnidirectional microphone by using the sound reflected from the flat surface of the case.

In the first to third embodiments, the device for determining a sound source direction may have a third flat surface that crosses at least one of the first flat surface and the second flat surface. Further, a third sound path, which has an opened third opening portion provided in the third flat surface at one end thereof, and in which a sound is propagated in the third opening portion, may be installed inside the case, and a third omnidirectional microphone may also be provided at the other end of the third sound path.

When the area of the third flat surface is equal to or smaller than a predetermined value, the third sound path includes a diffraction part, which is a bent portion, in the middle thereof, and when the area of the third flat surface is larger than the predetermined value, the third sound path may include or may not include a diffraction part, which is a bent portion, in the middle thereof. In this case, a direction in which a sound source exists is determined based on a difference between a sound pressure of a predetermined frequency component of a sound acquired by a microphone provided at the other end of the sound path having the opening portion in the flat surface crossing the third flat surface and a sound pressure of the predetermined frequency component of the sound acquired by the third microphone.

In the present embodiment, the example in which the sound signal, of which the sound source direction is determined, is translated from the first language into the second language or from the second language into the first language by the voice translation device 14 according to the sound source direction, has been described, but the present embodiment is not limited thereto. The voice translation device 14 may include, for example, only one of the first translation unit 14A and the second translation unit 14B.

The information processing terminal 1 may include a conference supporting device, instead of the voice translation device 14. The conference supporting device performs, for example, a switch of, for example, a camera, a microphone, and a display based on the determined sound source direction and the sound signal. Further, the information processing terminal 1 may include a drive supporting device, instead of the voice translation device 14. When the determined sound source direction is a driver's seat side, the drive supporting device supports, for example, driving based on the sound signal, and when the determined sound source direction is a passenger's seat side, the drive supporting device provides, for example, entertainment, such as play of music or video, based on the sound signal.

The information processing terminal including the device for determining a sound source direction may be an exclusive terminal for determining the sound source direction, but the device for determining a sound source direction may be inserted into an existing terminal by hardware or software. The existing terminal is, for example, a smart phone, a tablet, a wearable device, or a navigation system. Further, at least a part of hardware or software of the device for determining a sound source direction may be inserted to the corresponding existing terminal, and the device for determining a sound source direction may be connected with the corresponding existing terminal as an external device.

The processing order of the flowchart of FIG. 11 is an example, and the present embodiment is not limited to the order of the corresponding processing.

Fourth Embodiment

Next, an example of the fourth embodiment will be described. The descriptions of the same configurations and operations as those of the first to third embodiments will be omitted.

In the fourth embodiment, a device for determining a sound source direction 10D includes a determining unit 13', instead of the determining unit 13 of the device for determining a sound source direction 10 of FIG. 1. An outline of the sound source direction determination processing performed by the determining unit 13' of the fourth embodiment will be exemplified by using FIG. 15.

Figure 15:
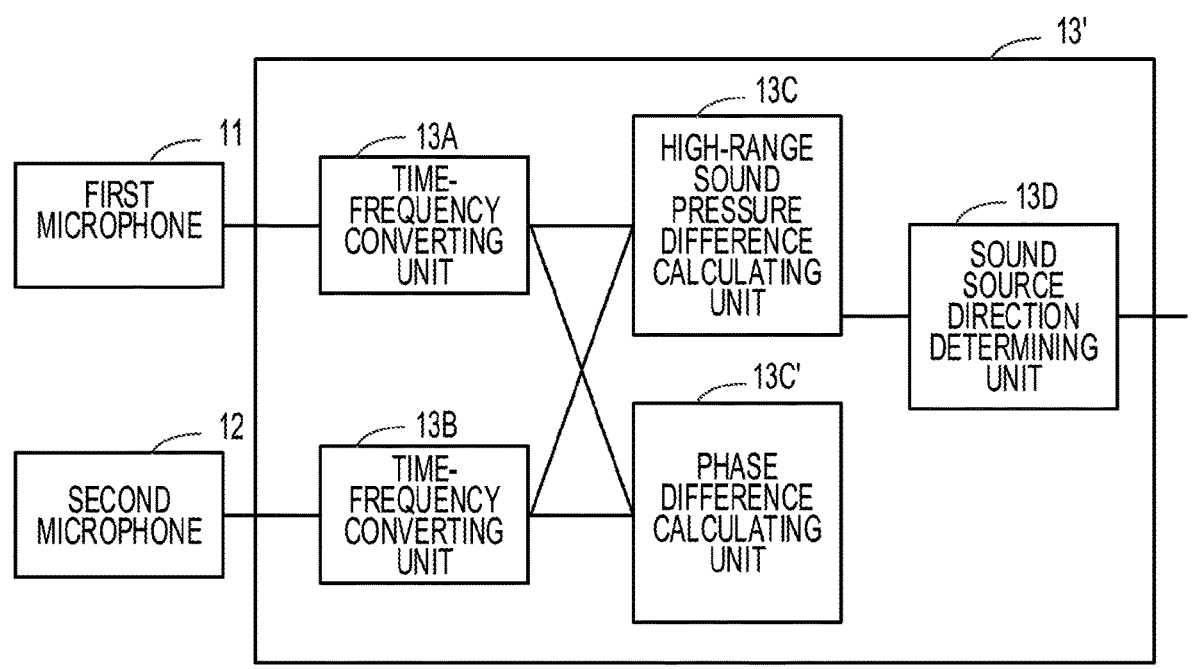
FIG. 15 is a block diagram exemplifying an outline of a sound source direction determination processing according to the fourth embodiment.

The determining unit 13' of FIG. 15 is different from the determining unit 13 of FIG. 8 in that the determining unit 13' of FIG. 15 further includes a phase difference calculating unit 13C'. That is, the fourth embodiment is different from the first embodiment in that in the fourth embodiment, a normalized phase difference is used in addition to the high-range sound pressure difference.

Figure 16A:
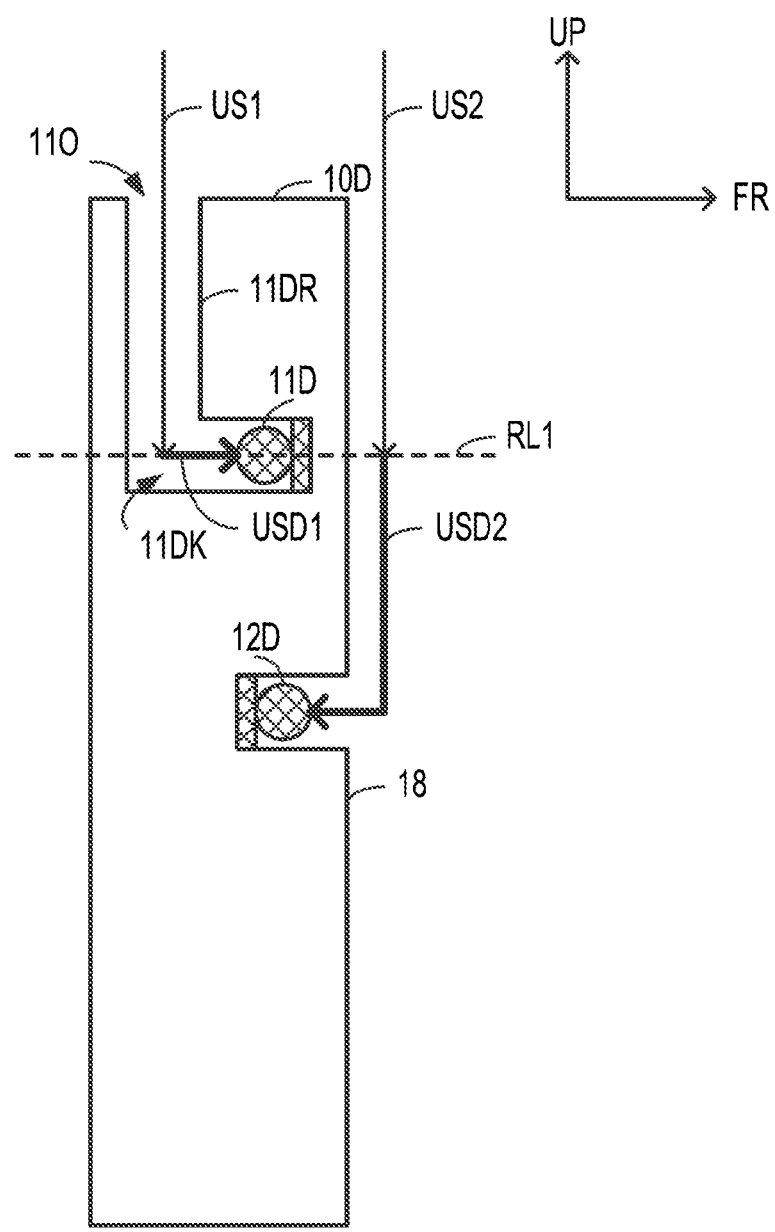
FIG. 16A is a conceptual diagram for describing a phase difference when a sound reaches a microphone.

As exemplified in FIG. 16A, the distance that the sound US1 travels for arrival from an upper side to a first microphone 11D is smaller than the distance that the sound US2 travels for arrival from an upper side to a second microphone 12D. This is clear from the comparison between the arrow USD1 indicating an arrival of the sound US1 to the first microphone 11D from reference line RL1 indicated for reference and the arrow USD2 indicating an arrival of the sound US2 to the second microphone 12D from reference line RL1.

That is, the time the sound travels for arrival from the upper side to the first microphone 11D is different from the time the sound travels for arrival from the upper side to the second microphone 12D. Accordingly, the phase when the sound from the upper side arrives at the first microphone 11D is different from a phase when the sound from the upper side arrives at the second microphone 12D.

Figure 16B:
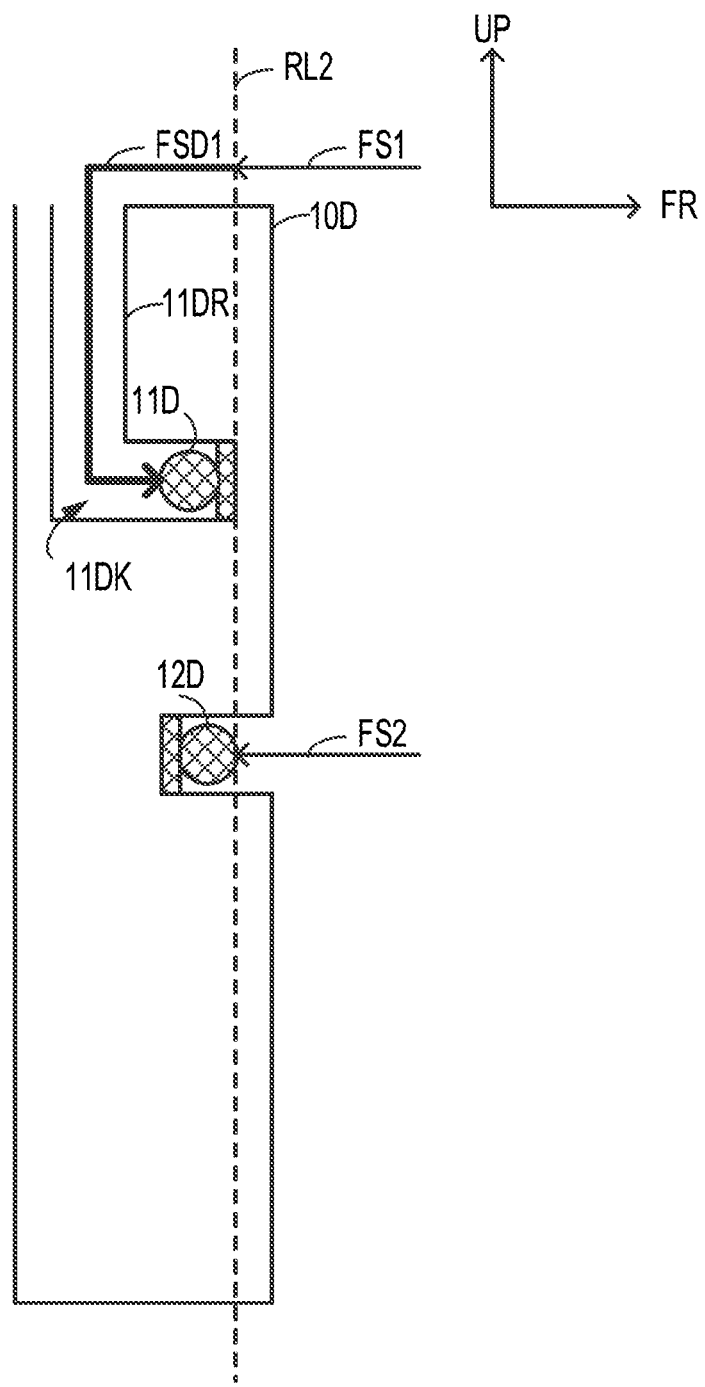
FIG. 16B is a conceptual diagram for describing a phase difference when a sound reaches a microphone.

As exemplified in FIG. 16B, the distance that the sound FS1 travels for arrival from a front side to the first microphone 11D is longer than the distance that the sound FS2 travels for arrival from the front side to the second microphone 12D. This is clear from the arrow FSD1 indicating the arrival of the sound FS1 to the first microphone 11D from reference line RL2 indicated for reference.

That is, the time that the sound travels for arrival from the front side to the first microphone 11D is different from the time that the sound travels for arrival from the front side to the second microphone 12D. Accordingly, the phase when the sound from the front side arrives at the first microphone 11D is different from the phase when the sound from the front side arrives at the second microphone 12D. In the fourth embodiment, a sound source direction is determined by using the corresponding phase difference.

The phase difference calculating unit 13C' of FIG. 15 calculates the difference between a first phase, which is the phase of the sound acquired by the first microphone 11D, and a second phase, which is the phase of the sound acquired by the second microphone 12D. Specifically, the phase difference calculating unit 13C' calculates a normalized phase difference a_phase, which is an example of the phase difference, by Equation (7).

$$a\_phrase = (\Sigma_{j=ss}^{ee} phase[j] \cdot C\_n[j])/(ee+1-ss) \quad (7)$$

The normalized phase difference a_phase is an average value of values obtained by normalizing a phase difference phase[j] of a jth frequency band with a normalized coefficient C_n[j]. j=ss, . . . , and ee, "ss" is a lower-limit frequency band number of the calculation of the normalized phase difference, "ee" is an upper-limit frequency band number of the calculation of the normalized phase difference, and "ss" and "ee" are numerical values included in bin (bin=0, . . . , ss, ee, F−1).

The phase difference phase[j] is calculated by Equation (8).

$$phase[j] = a\tan(phase\_im[j]/phase\_re[j]) \quad (8)$$

phase_re[j]=re1[j]×re2[j]+im1[j]×im2[j], phase_im[j]= im1[j]×re2[j]−re1[j]×im2[j], and "a tan" indicates arctangent.

Further, the normalized coefficient C_n[j] is calculated by Equation (9).

$$C\_n[j] = \lambda[j]/\lambda\_c \quad (9)$$

λ[j]=C/f_j, λ[j] is a wavelength corresponding to a frequency band number j, C is a sound speed, f_j is a frequency corresponding to the frequency band number j, and λ_c is a wavelength of a sound of an existing frequency. For example, when a sampling frequency is 16 kHz, the reference frequency may be 8 kHz, which is the upper-limit frequency.

The frequency corresponding to the upper-limit frequency band number "ee" for calculating the normalized phase difference may be, for example, C/2L. The symbol L is a distance between the first microphone 11 and the second microphone 12. A frequency corresponding to the lower-limit frequency band number "ss" for calculating the normalized phase difference may be, for example, 100 Hz.

Further, the upper-limit frequency band number "ee" and the lower-limit frequency band number "ss" for calculating the normalized phase difference may be set to have values, in which an influence of noise is not increased and it is possible to appropriately detect a change in phase. In a sound, when a frequency is high, power is decreased, so that when a frequency is high, a signal-to-noise ratio is decreased, and thus an influence of noise is increased. Further, when a low frequency is set in order to prevent an influence of noise from being increased, a wavelength of a sound at the low frequency is long, and thus a phase change is slow compared to a sound at a high frequency, so that it is difficult to appropriately detect a phase change in a short time.

The normalized phase difference a_phase calculated by Equation (7) has a plus value when a sound source exists at the upper side, that is, the sound source is closer to the first microphone 11D than the second microphone 12D. In the meantime, when the sound source exists in the front side, that is, the sound source is farther from the first microphone 11D than the second microphone 12D, the normalized phase difference has a negative value. Further, a sign of the normalized phase difference is different according to the kind of the first microphone 11D and the second microphone 12D, which serves as a reference. Further, the method of calculating the normalized phase difference is not limited to Equation (7).

Next, an outline of the operation of a device for determining a sound source direction 10D will be described. An outline of the operation of the device for determining a sound source direction 10D will be schematically exemplified in FIG. 17A. FIG. 11 is different from FIG. 17A in that operations 103, 104, and 106 of FIG. 11 are replaced with operations 103, 103B, 104, 104B, and 106 in FIG. 17A.

Figure 17A:
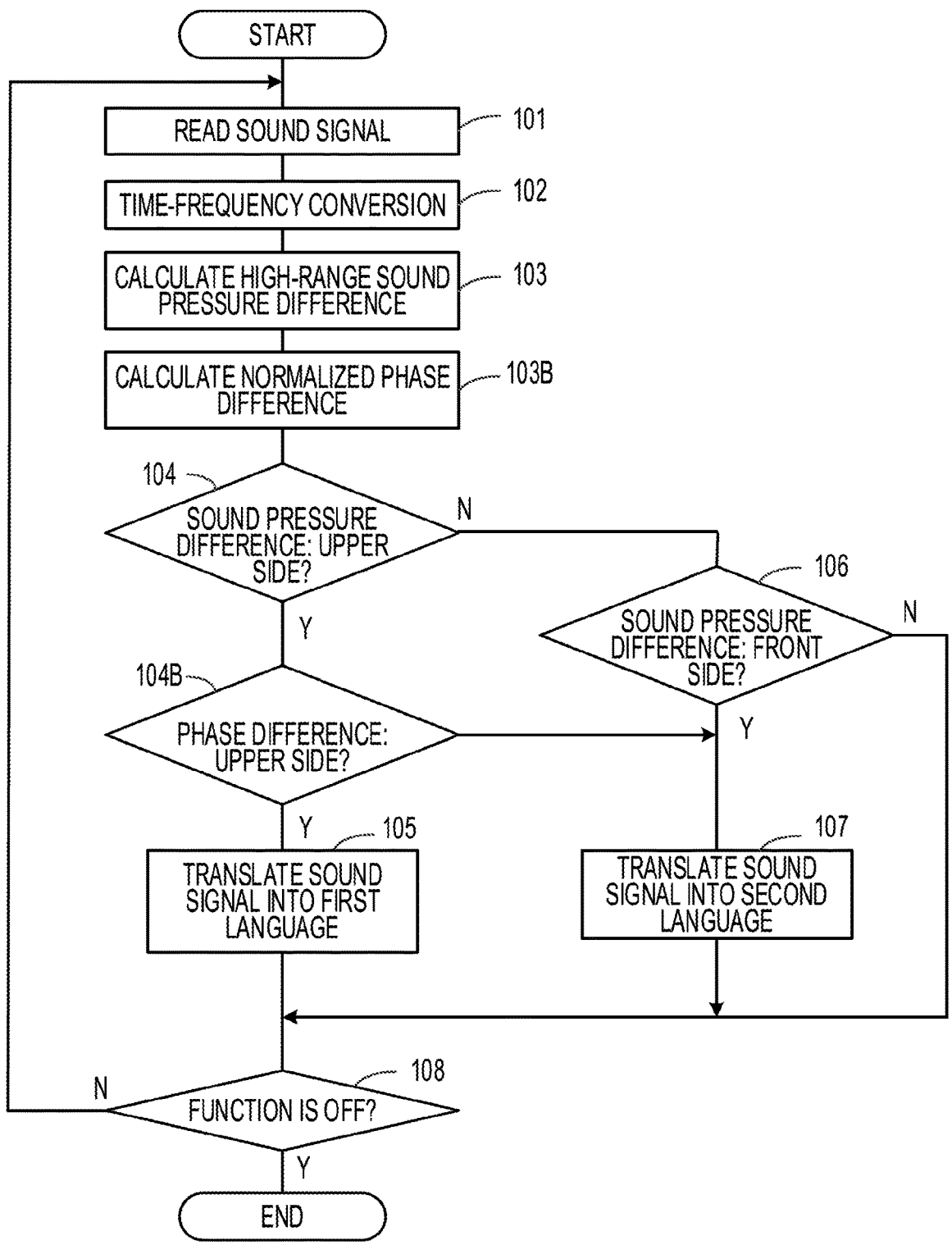
FIG. 17A is a flowchart illustrating an example of a sound source direction determination processing flow according to the fourth embodiment.

That is, in FIG. 17A, the CPU 51 calculates a high-range sound pressure difference in operation 103 as described above, and calculates a normalized phase difference a_phase by using Equation (7) in operation 103B. The CPU 51 determines whether the high-range sound pressure difference is larger than a first threshold value, which is a plus value, in operation 104, and when the determination of operation 104 is positive, the CPU 51 determines whether the normalized phase difference is larger than a third threshold value, which is a plus value, in operation 104B. When the determination of operation 104B is positive, the CPU 51 determines that a sound source exists at the upper side, and proceeds to operation 105.

When the determination of operation 104 is negative, that is, the high-range sound pressure difference is equal to or smaller than the first threshold value, which is the plus value, the CPU 51 determines that the sound source does not exist at the upper side, and determines whether the high-range sound pressure difference is smaller than a negative second threshold value in operation 106. When the determination of operation 106 is positive, or the determination of operation 104B is negative, that is, the normalized phase difference is equal to or smaller than the third threshold value, which is the plus value, the CPU 51 determines that the sound source exists in the front side and proceeds to operation 107.

When the determination of operation 106 is negative, that is, the high-range sound pressure difference is equal to or larger than the negative second threshold value, the CPU 51 determines that it is impossible to determine the sound source direction and proceeds to operation 108. The third threshold value, which is the plus value, may be, for example, 3.0 rad.

The present embodiment is not limited to the determination of the sound source direction in operations 104, 104B, and 106 of FIG. 17A. As exemplified in FIGS. 17B to 17F, the sound source direction may be determined by combining the determination of the high-range sound pressure difference and the determination of the normalized phase difference, and as exemplified in FIG. 17G, the sound source direction may be determined by the determination of the normalized phase difference.

Figure 17B:
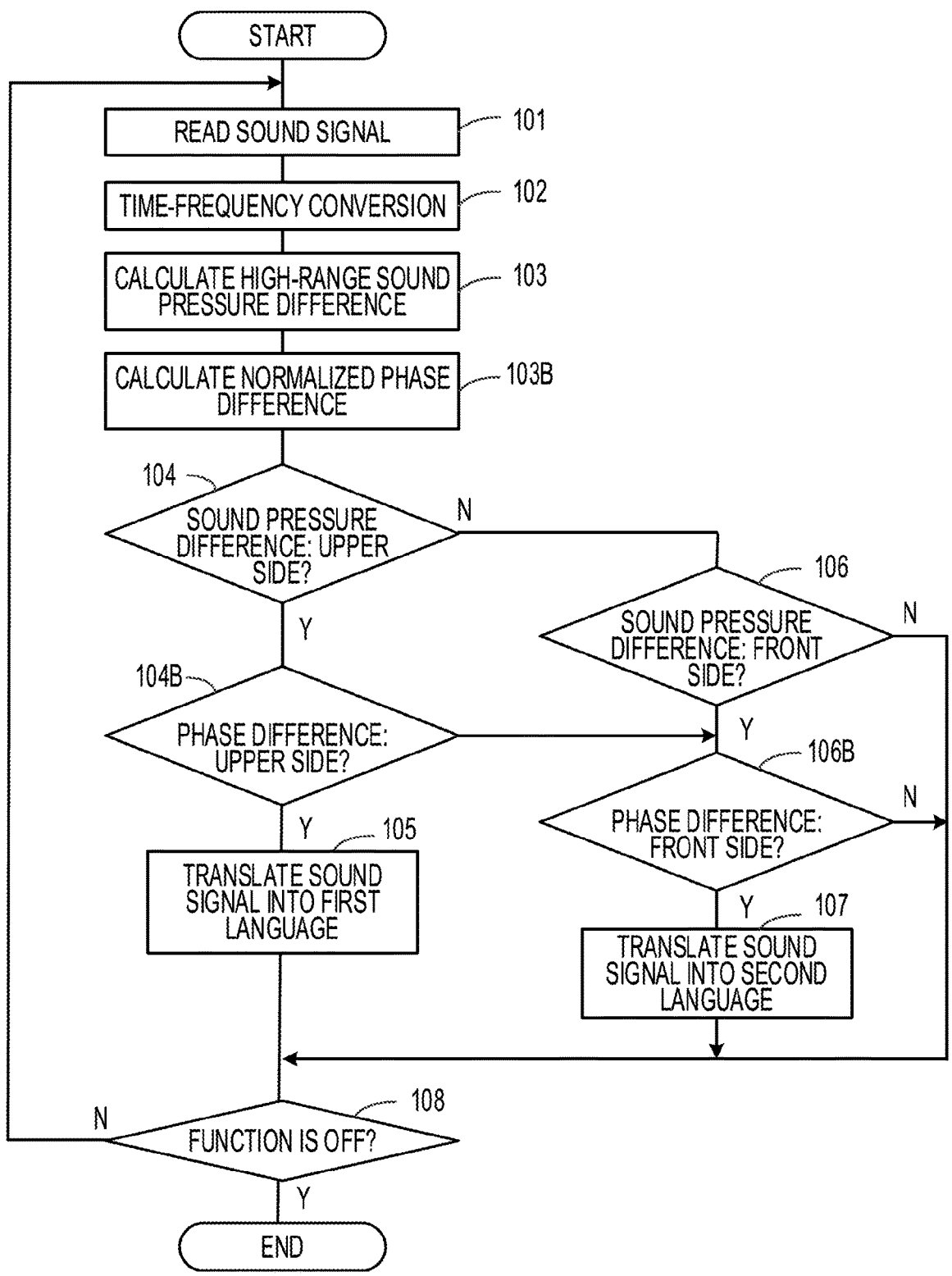
FIG. 17B is a flowchart illustrating an example of a sound source direction determination processing flow according to the fourth embodiment.

FIG. 11 is different from FIG. 17B in that operations 103, 104, and 106 of FIG. 11 are replaced with operations 103, 103B, 104, 104B, 106, and 106B in FIG. 17B.

That is, in FIG. 17B, the CPU 51 determines whether the high-range sound pressure difference is larger than a first threshold value, which is a plus value, in operation 104, and when the determination of operation 104 is positive, the CPU 51 determines whether a normalized phase difference is larger than a third threshold value, which is a plus value, in operation 104B. When the determination of operation 104B is positive, the CPU 51 determines that the sound source exists at the upper side and proceeds to operation 105.

When the determination of operation 104 is negative, that is, the high-range sound pressure difference is equal to or smaller than the first threshold value, which is the plus value, the CPU 51 determines that the sound source does not exist at the upper side, and determines whether the high-range sound pressure difference is equal to or smaller than a negative second threshold value in operation 106. When the determination of operation 106 is positive, or the determination of operation 104B is negative, the CPU 51 determines whether the normalized phase difference is smaller than a negative fourth threshold value in operation 106B. When the determination of operation 106B is positive, the CPU 51 determines that the sound source exists in the front side, and proceeds to operation 107.

When the determination of operation 106 or operation 106B is negative, that is, the high-range sound pressure difference is equal to or larger than a negative second threshold value or the normalized phase difference is equal to or larger than the negative fourth threshold value, the CPU 51 determines that it is impossible to determine the sound source direction and proceeds to operation 108.

Figure 17C:
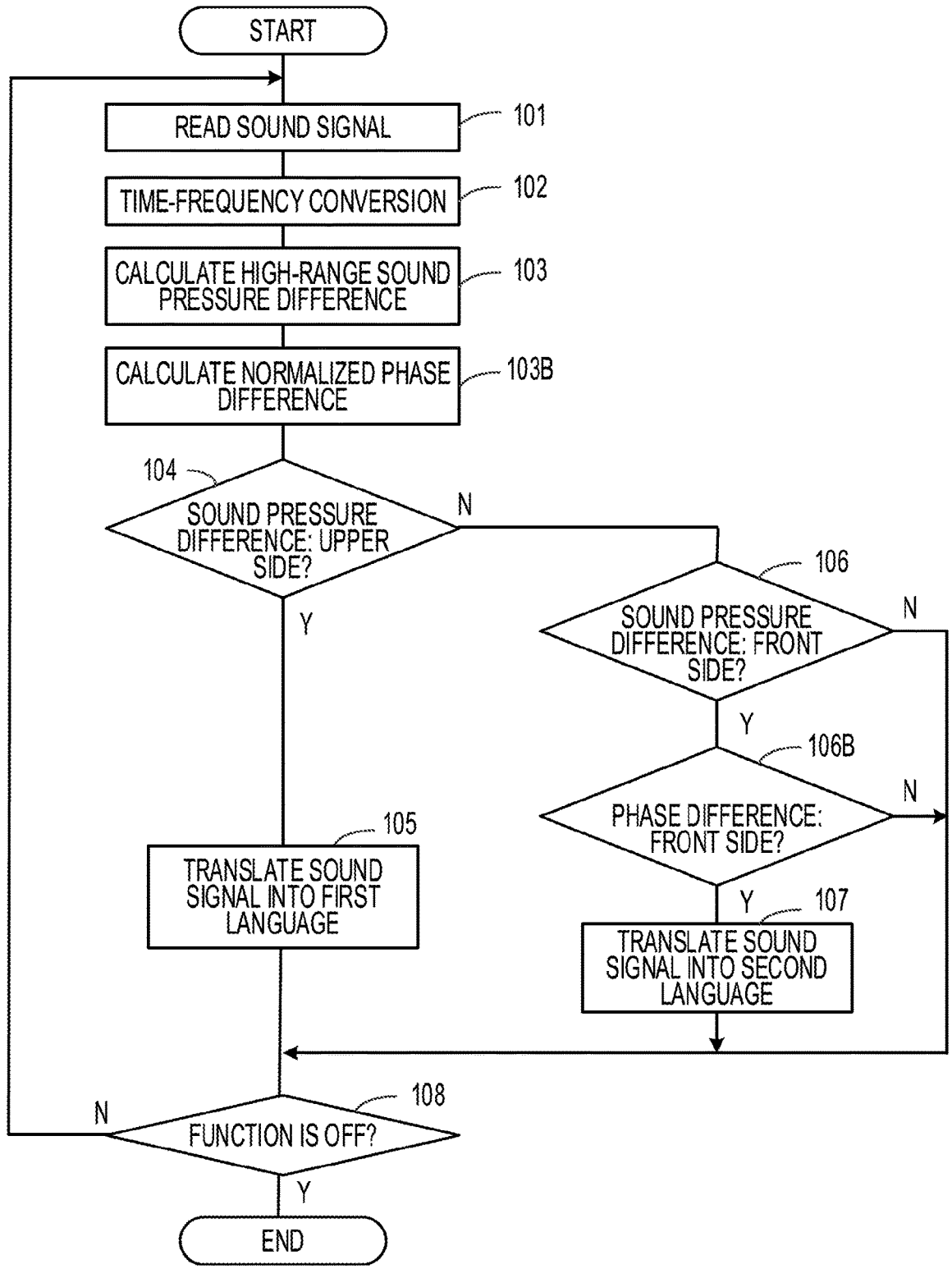
FIG. 17C is a flowchart illustrating an example of a sound source direction determination processing flow according to the fourth embodiment.

FIG. 11 is different from FIG. 17C in that operations 103, 104, and 106 of FIG. 11 are replaced with operations 103, 103B, 104, 106, and 106B in FIG. 17C.

That is, in FIG. 17C, the CPU 51 determines whether the high-range sound pressure difference is larger than a first threshold value, which is a plus value, in operation 104, and when the determination of operation 104 is positive, the CPU 51 determines whether a sound source exists at the upper side and proceeds to operation 105.

When the determination of operation 104 is negative, that is, the high-range sound pressure difference is equal to or smaller than the first threshold value, which is the plus value, the CPU 51 determines that the sound source does not exist at the upper side, and determines whether the high-range sound pressure difference is smaller than a negative second threshold value in operation 106. When the determination of operation 106 is positive, the CPU 51 determines whether a normalized phase difference is smaller than a negative fourth threshold value in operation 106B. When the determination of operation 106B is positive, the CPU 51 determines that the sound source exists in the front side, and proceeds to operation 107.

When the determination of operation 106 or operation 106B is negative, that is, the high-range sound pressure difference is equal to or larger than a negative second threshold value or the normalized phase difference is equal to or larger than the negative fourth threshold value, the CPU 51 determines that it is impossible to determine the sound source direction and proceeds to operation 108.

Figure 17D:
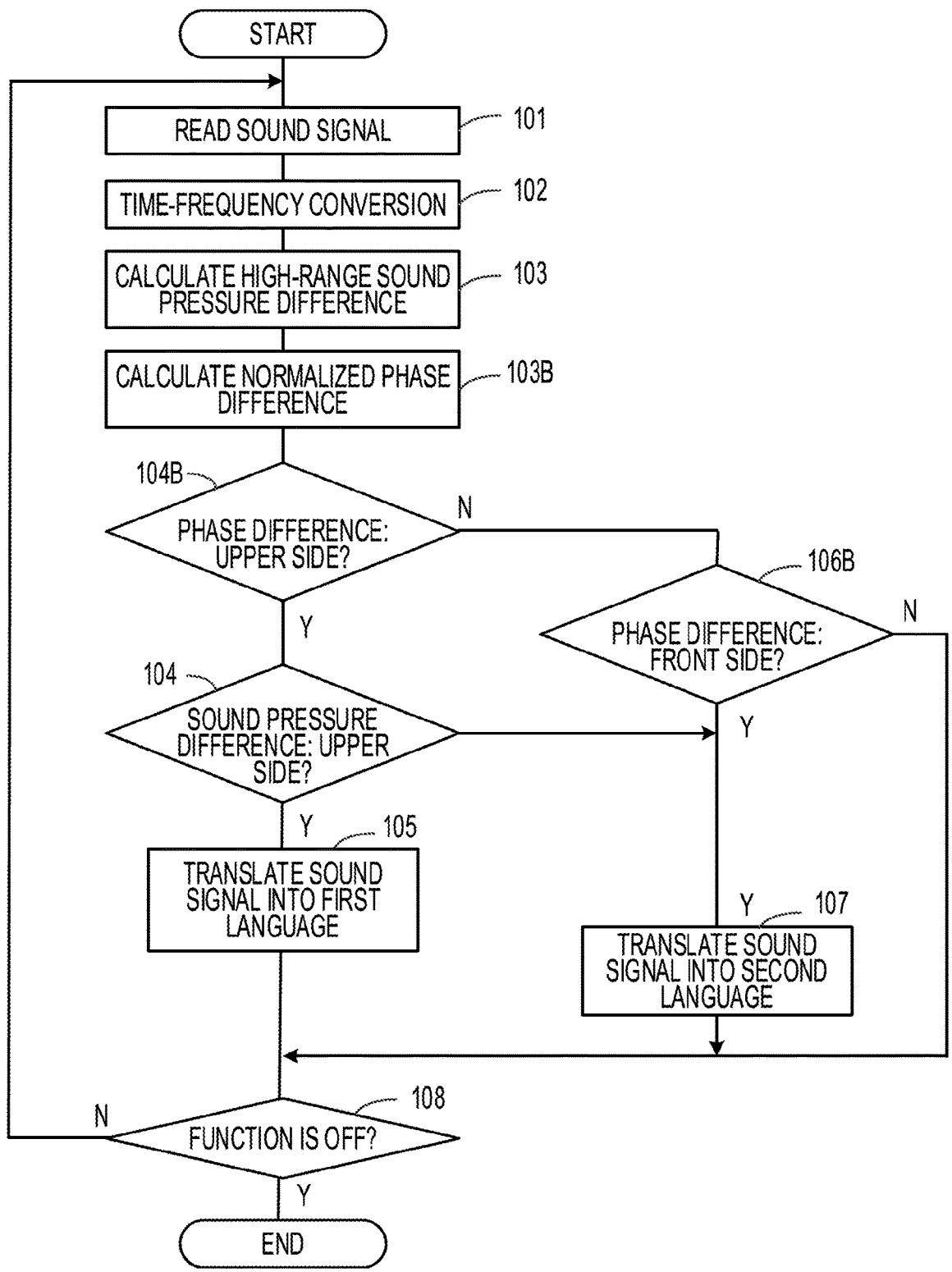
FIG. 17D is a flowchart illustrating an example of a sound source direction determination processing flow according to the fourth embodiment.

FIG. 11 is different from FIG. 17D in that operations 103, 104, and 106 of FIG. 11 are replaced with operations 103, 103B, 104B, 104, and 106B in FIG. 17D.

That is, in FIG. 17D, the CPU 51 determines whether a normalized phase difference is larger than a third threshold value, which is a plus value, in operation 104B. When the determination of operation 104B is positive, that is, the normalized phase difference is larger than the third threshold value, which is the plus value, the CPU 51 determines whether a high-range sound pressure difference is larger than a first threshold value, which is a plus value, in operation 104. When the determination of operation 104 is positive, the CPU 51 determines that a sound source exists at the upper side, and proceeds to operation 105.

When the determination of operation 104B is negative, that is, the normalized phase difference is equal to or smaller than the third threshold value, which is the plus value, the CPU 51 determines that the sound source does not exist at the upper side, and determines whether the normalized phase difference is smaller than a negative fourth threshold value in operation 106B. When the determination of operation 106B is positive, or the determination of operation 104 is negative, that is, the normalized phase difference is equal to or larger than the negative fourth threshold value, or the high-range sound pressure difference is equal to or smaller than the first threshold value, which is the plus value, the CPU 51 determines that the sound source exists in the front side and proceeds to operation 107.

When the determination of operation 106B is negative, that is, the normalized phase difference is equal to or larger than the negative fourth threshold value, the CPU 51 determines that it is impossible to determine a direction of the sound source and proceeds to operation 108.

Figure 17E:
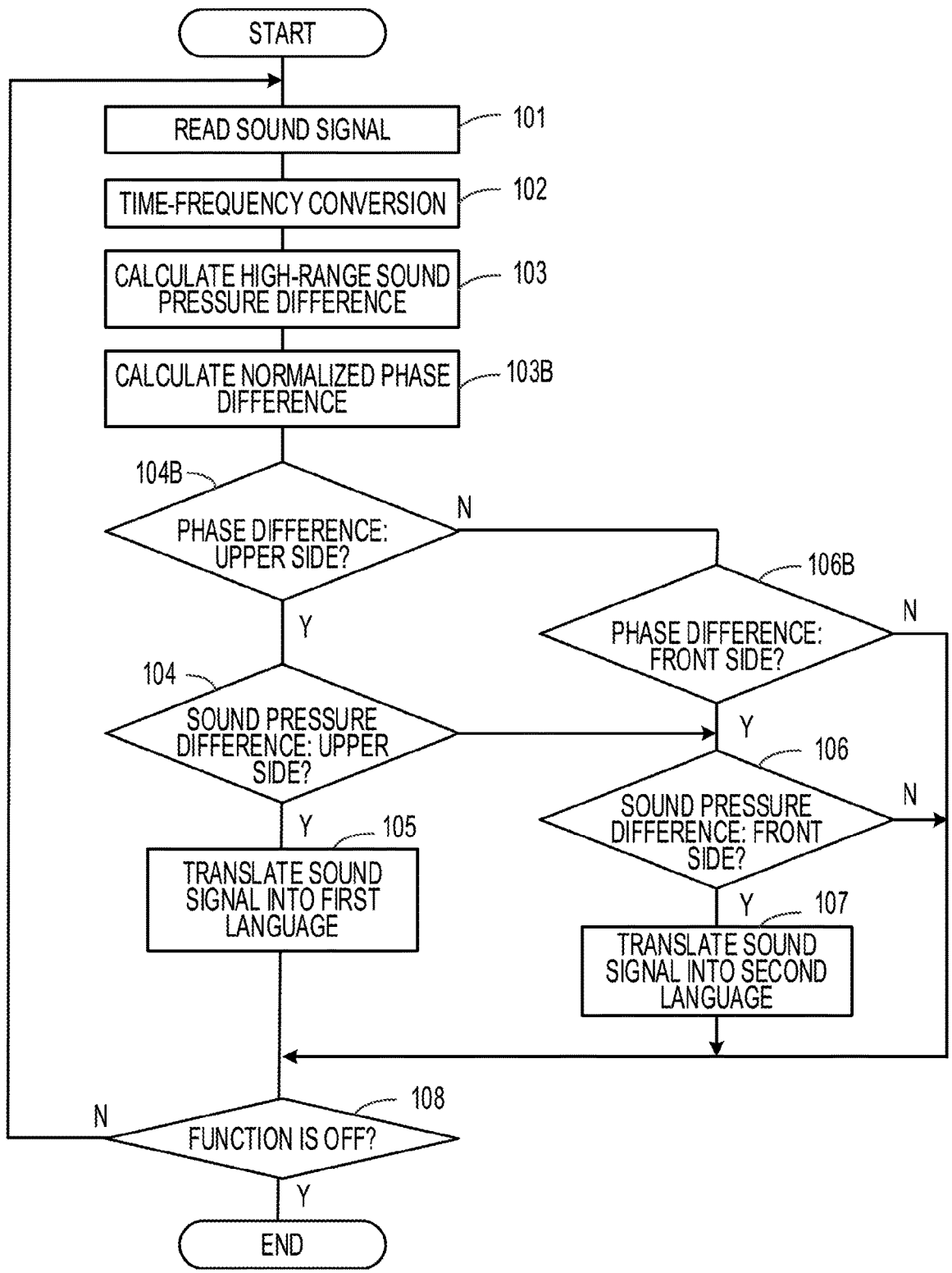
FIG. 17E is a flowchart illustrating an example of a sound source direction determination processing flow according to the fourth embodiment.

FIG. 11 is different from FIG. 17E in that operations 103, 104, and 106 of FIG. 11 are replaced with operations 103, 103B, 104B, 104, 106B, and 106 in FIG. 17E.

That is, in FIG. 17E, the CPU 51 determines whether a normalized phase difference is larger than a third threshold value, which is a plus value, in operation 104B. When the determination of operation 104B is positive, that is, the normalized phase difference is larger than the third threshold value, which is the plus value, the CPU 51 determines whether a high-range sound pressure difference is larger than a first threshold value, which is a plus value, in operation 104. When the determination of operation 104 is positive, the CPU 51 determines that a sound source exists at the upper side, and proceeds to operation 105.

When the determination of operation 104B is negative, that is, the normalized phase difference is equal to or smaller than the third threshold value, which is the plus value, the CPU 51 determines that the sound source does not exist at the upper side, and determines whether the normalized phase difference is smaller than a negative fourth threshold value in operation 106B. When the determination of operation 106B is positive or the determination of operation 104 is negative, that is, the normalized phase difference is smaller than the negative fourth threshold value, or the high-range sound pressure difference is equal to or smaller than the first threshold value, which is the plus value, the CPU 51 proceeds to operation 106. The CPU 51 determines whether the high-range sound pressure difference is smaller than a negative second threshold value in operation 106. When the determination of operation 106 is positive, that is, the high-range sound pressure difference is smaller than the negative second threshold value, the CPU 51 determines that a sound source exists in the front side and proceeds to operation 107.

When the determination of operation 106B is negative or the determination of operation 106 is negative, that is, the normalized phase difference is equal to or larger than the negative fourth threshold value, or the high-range sound pressure difference is equal to or larger than the negative second threshold value, the CPU 51 determines that it is impossible to determine the sound source direction. When it is determined that it is impossible to determine the sound source direction, the CPU 51 proceeds to operation 108.

Figure 17F:
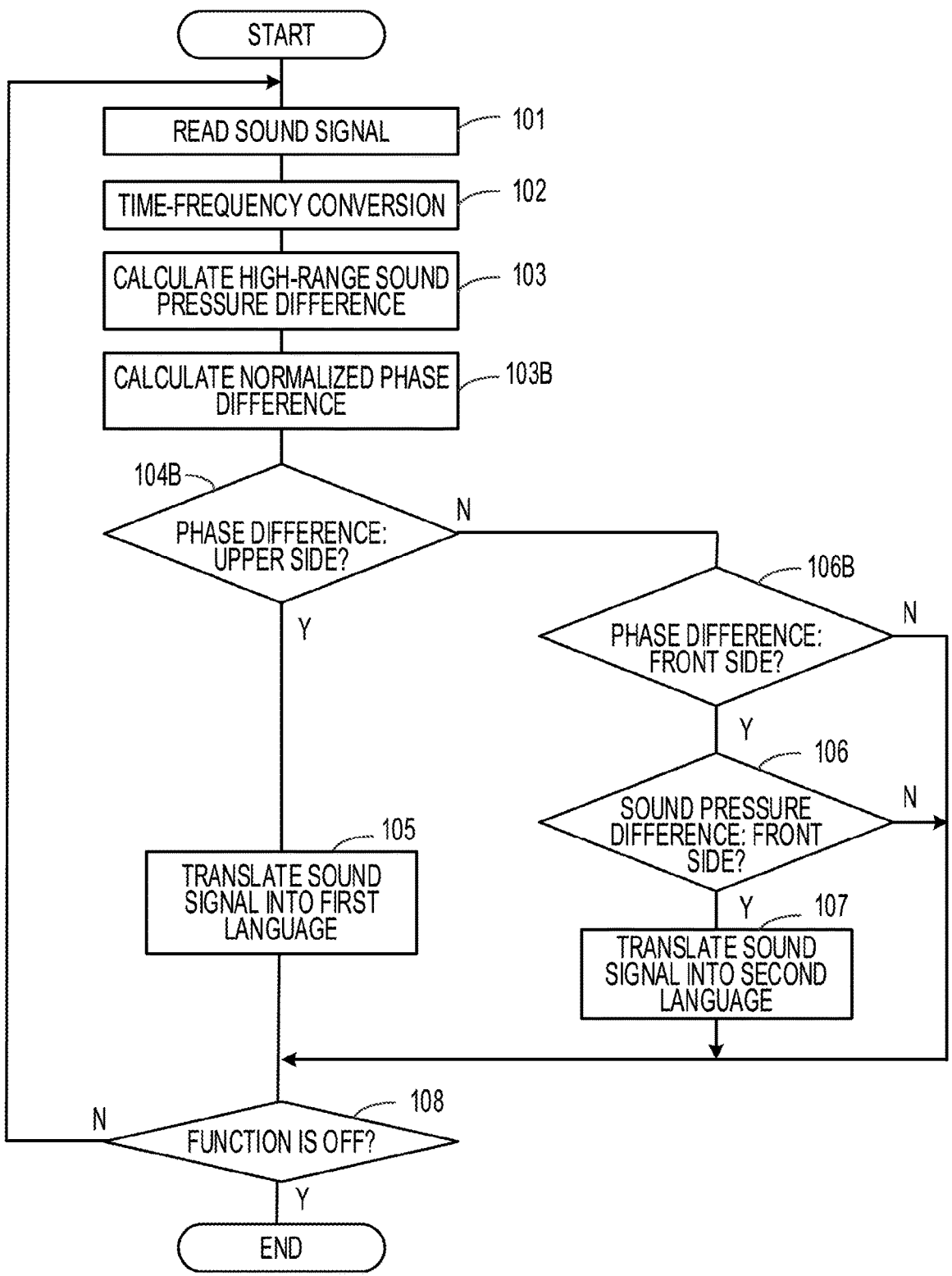
FIG. 17F is a flowchart illustrating an example of a sound source direction determination processing flow according to the fourth embodiment.

FIG. 11 is different from FIG. 17F in that operations 103, 104, and 106 of FIG. 11 are replaced with operations 103, 103B, 104B, 106B, and 106 in FIG. 17E.

That is, in FIG. 17F, the CPU 51 determines whether a normalized phase difference is larger than a third threshold value, which is a plus value, in operation 104B. When the determination of operation 104B is positive, that is, the normalized phase difference is larger than the third threshold value, which is the plus value, the CPU 51 determines that the sound source exists at the upper side and proceeds to operation 105.

When the determination of operation 104B is negative, that is, the normalized phase difference is equal to or smaller than the third threshold value, which is the plus value, the CPU 51 determines that the sound source does not exist at the upper side, and determines whether the normalized phase difference is smaller than a negative fourth threshold value in operation 106B. When the determination of operation 106B is positive, that is, the normalized phase difference is smaller than the negative fourth threshold value, the CPU 51 determines whether a high-range sound pressure difference is smaller than a negative second threshold value in operation 106. When the determination of operation 106 is positive, that is, the high-range sound pressure difference is smaller than the negative second threshold value, the CPU 51 determines that a sound source exists in the front side and proceeds to operation 107.

When the determination of operation 106B is negative or the determination of operation 106 is negative, that is, the normalized phase difference is equal to or larger than the negative fourth threshold value, or the high-range sound pressure difference is equal to or larger than the negative second threshold value, the CPU 51 determines that it is impossible to determine the sound source direction. When it is determined that it is impossible to determine the sound source direction, the CPU 51 proceeds to operation 108.

Figure 17G:
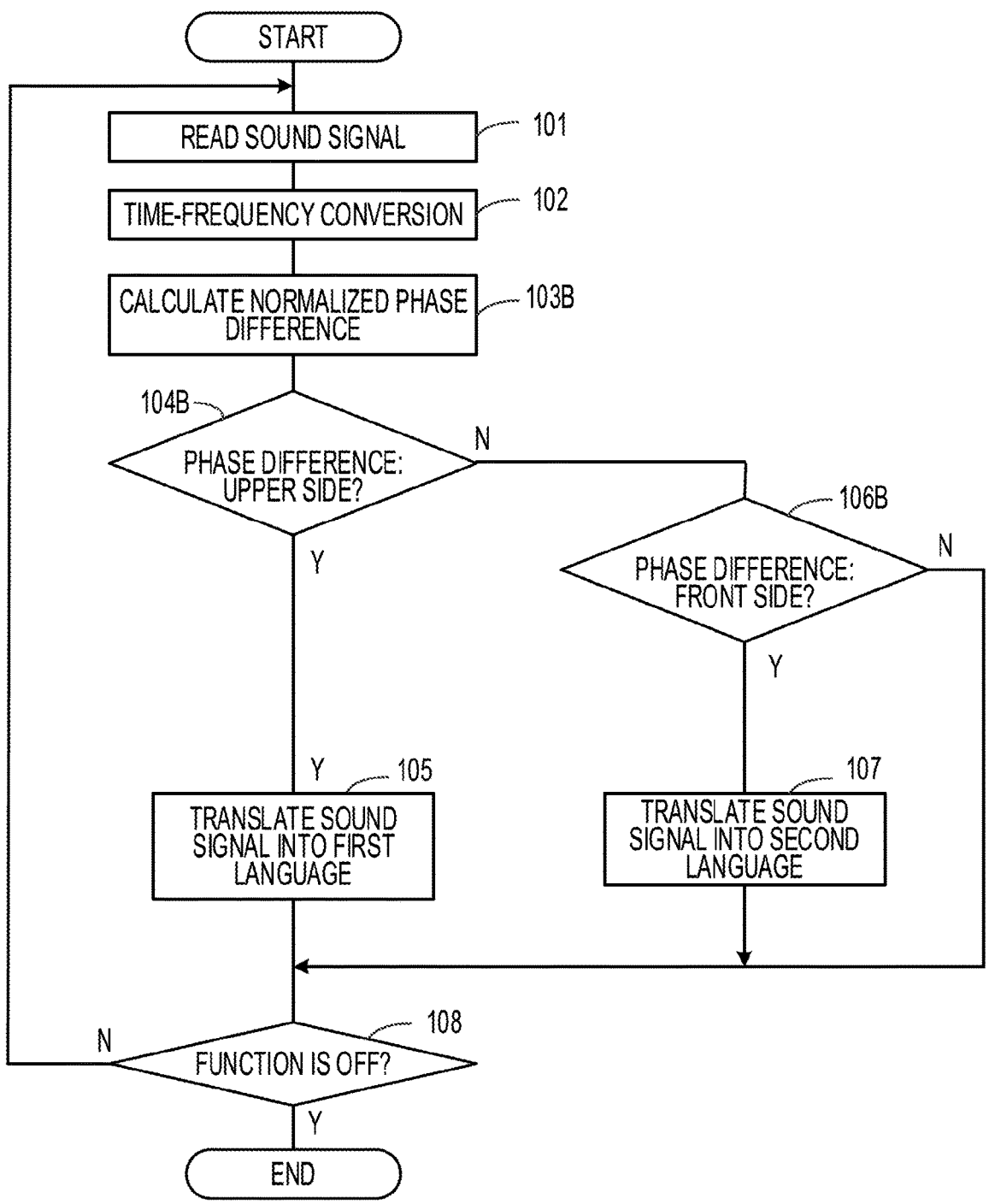
FIG. 17G is a flowchart illustrating an example of a sound source direction determination processing flow according to the fourth embodiment.

FIG. 11 is different from FIG. 17G in that operations 103, 104, and 106 of FIG. 11 are replaced with operations 103B, 104B, and 106B in FIG. 17G.

That is, in FIG. 17G, the CPU 51 calculates a normalized phase difference in operation 103B. The CPU 51 determines whether the normalized phase difference is larger than a third threshold value, which is a plus value, in operation 104B. When the determination of operation 104B is positive, that is, the normalized phase difference is larger than the third threshold value, which is the plus value, the CPU 51 determines that the sound source exists at the upper side and proceeds to operation 105.

When the determination of operation 104B is negative, that is, the normalized phase difference is equal to or smaller than the third threshold value, which is the plus value, the CPU 51 determines that the sound source does not exist at the upper side, and determines whether the normalized phase difference is smaller than a negative fourth threshold value in operation 106B. When the determination of operation 106B is positive, that is, the normalized phase difference is smaller than the negative fourth threshold value, the CPU 51 determines that the sound source exists in the front side and proceeds to operation 107.

When the determination of operation 106B is negative, that is, the normalized phase difference is equal to or larger than the negative fourth threshold value, the CPU 51 determines that it is impossible to determine a sound source direction and proceeds to operation 108. Further, the processing orders of the flowcharts of FIGS. 17A to 17G are examples, and the present embodiment is not limited to the corresponding processing order.

In the fourth embodiment, a first sound path 11DR has a bent portion 11DK, so that a distance between the first microphone 11D and the second microphone 12D may be longer than that of the case where the sound path does not have the bent portion. Accordingly, it is possible to increase a difference in a movement distance of the sound for a wavelength of a sound at a predetermined frequency, so that it is possible to easily detect a variation of the phase difference.

The example in which the first sound path 11DR has the bent portion 11DK is illustrated in FIGS. 16A and 16B, but the present embodiment is not limited thereto. The present embodiment may also be applied to the case where each of the two sound paths has the bent portion like the second embodiment, and the case where both the two sound paths do not have the bent portion as in the third embodiment.

The device for determining a sound source direction according to the present embodiment includes a microphone installation part, a first microphone, and a second microphone. The microphone installation part is provided with a first sound path, in which an opened first opening portion is provided in a first flat surface at one end thereof and a sound is propagated in the first opening, and a second sound path, in which an opened second opening portion is provided in a second flat surface crossing the first flat surface at one end thereof and a sound is propagated in the second opening, therein. The first microphone is an omnidirectional microphone installed at the other end of the first sound path, and the second microphone is an omnidirectional microphone installed at the other end of the second sound path.

A determining unit of the device for determining a sound source direction according to the present embodiment determines a direction in which a sound source exists, based on at least one of a sound pressure difference between a first sound pressure and a second sound pressure and a phase difference between a first phase and a second phase. The first sound pressure is a sound pressure of a first frequency component of a sound acquired by the first microphone, and the second sound pressure is a sound pressure of the first frequency component of a sound acquired by the second microphone. The first phase is a phase of a second frequency component of the sound acquired by the first microphone, and the second phase is a phase of the second frequency component of the sound acquired by the second microphone.

In the present embodiment, even in the case where it is difficult to determine the sound source direction only by the sound pressure difference, it is possible to appropriately determine the sound source direction.

[Description of the Fourth Embodiment]

Figure 22A:
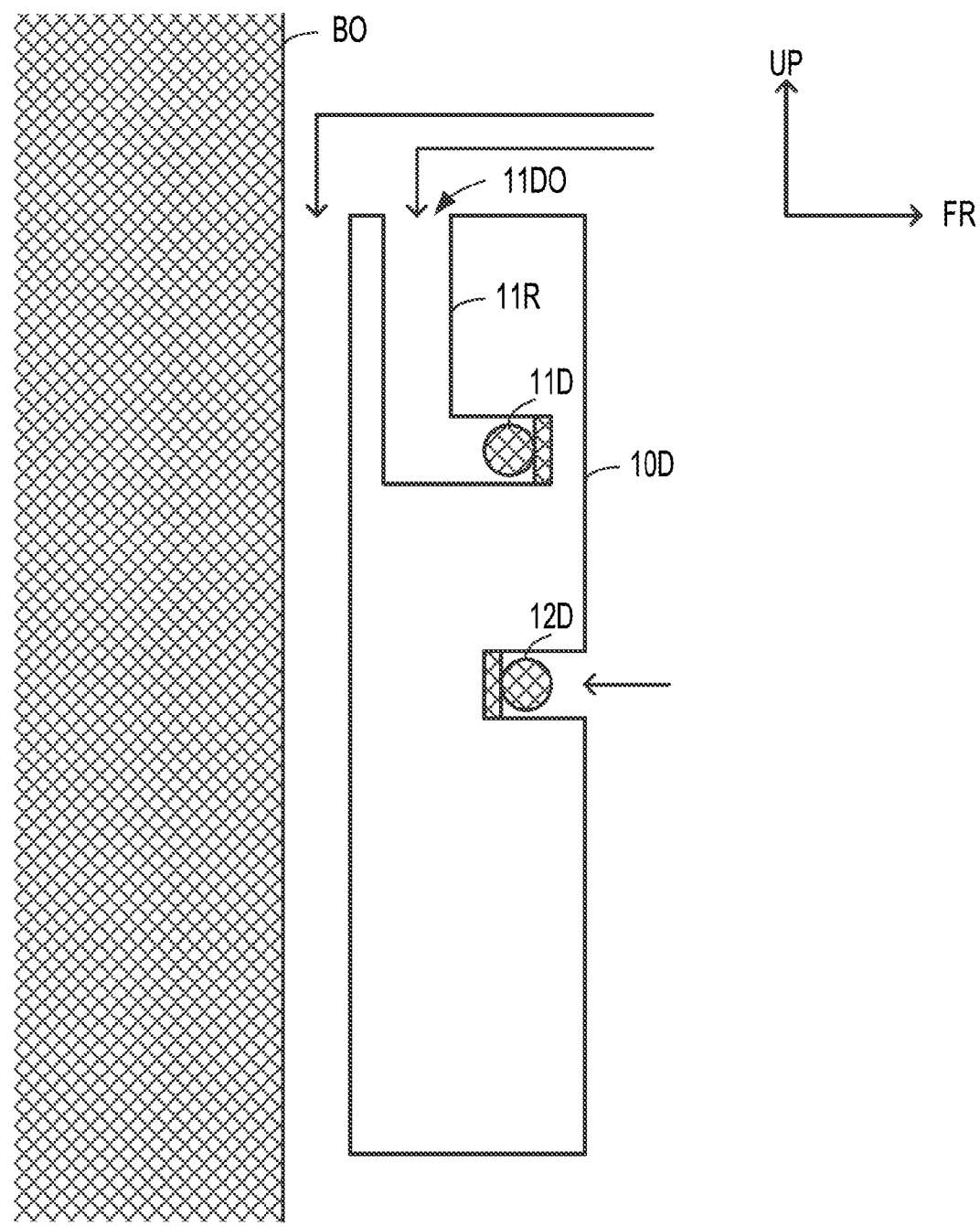
FIG. 22A is a conceptual diagram for describing diffraction of a sound when there is a gap in a rear surface of a device for determining a sound source direction.

FIG. 22A exemplifies the case where there is a gap in a rear surface of the device for determining a sound source direction 10D, that is, for example, there is a gap between an object BO, such as a cloth of a user, mounted with the device for determining a sound source direction 10D, and the rear surface of the device for determining a sound source direction 10D. When a sound source exists in the front side, a sound pressure of a sound acquired by the first microphone 11D is smaller than a sound pressure of a sound acquired by the second microphone 12D. Since the sound pressure of the first microphone 11D is attenuated by diffraction and the sound, which is not diffracted in a first opening 11DO is diffracted at an entrance of the gap and passes through the gap, the sound does not arrive at the first microphone 11D.

Figure 22B:
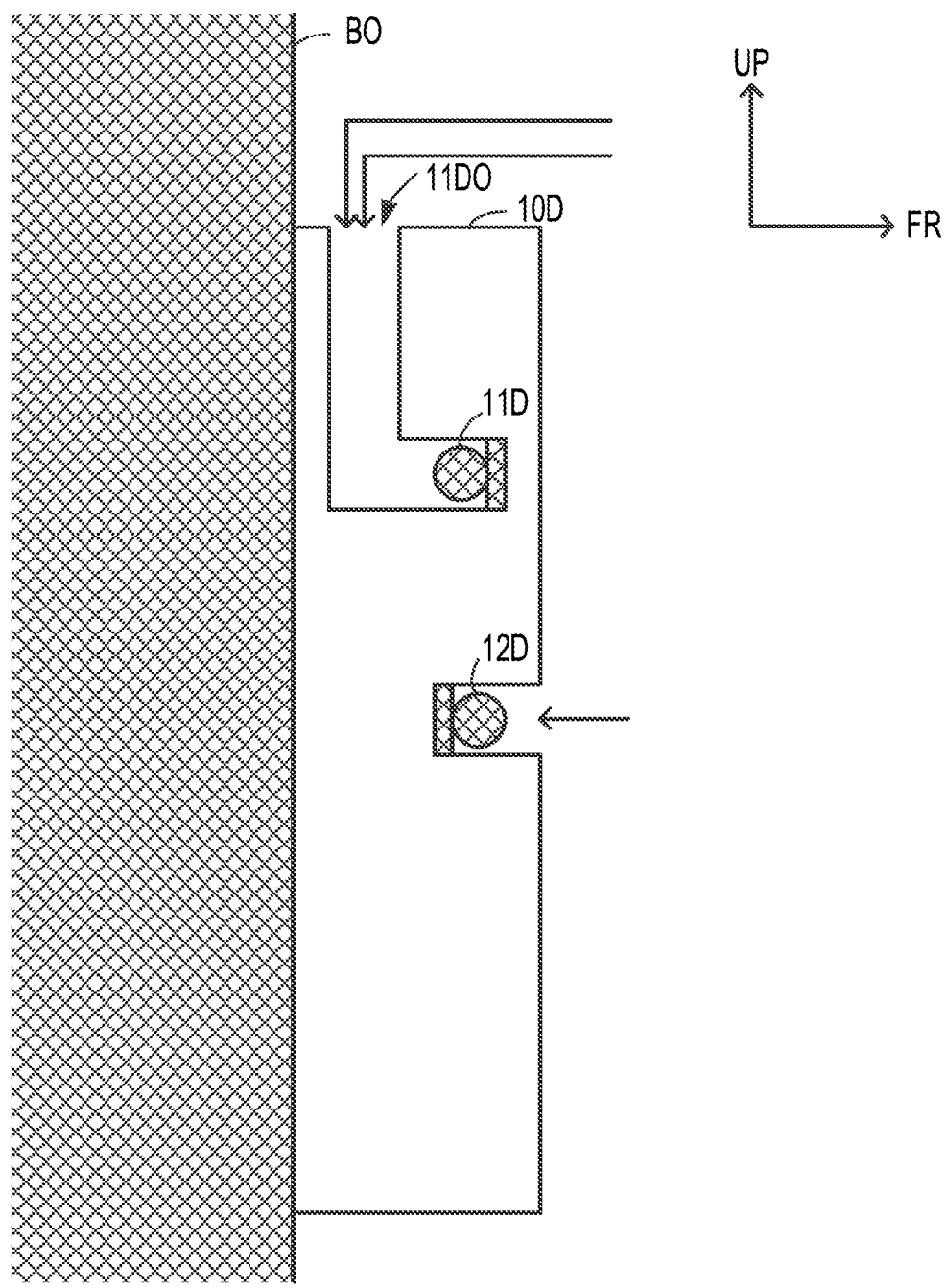
FIG. 22B is a conceptual diagram for describing diffraction of a sound when there is no gap in a rear surface of a device for determining a sound source direction.

FIG. 22B exemplifies the case where there is no gap in the rear surface of the device for determining a sound source direction 10D, that is, for example, there is no gap between an object BO, such as a cloth of a user, mounted with the device for determining a sound source direction 10D, and the rear surface of the device for determining a sound source direction 10D. When a sound source exists in the front side, a sound pressure of a sound acquired by the first microphone 11D is larger than a sound pressure of a sound acquired by the second microphone 12D. In the case where the sound source exists in the front side, even when the sound pressure of the sound acquired by the first microphone 11D is smaller than the sound pressure of the sound acquired by the second microphone 12D, the sound pressure of the sound acquired by the first microphone 11D is close to the sound pressure of the sound acquired by the second microphone 12D in a degree, in which it is difficult to determine a sound source direction. The reason is that the sound, which passes through the gap in FIG. 22A, is diffracted in the first opening 11DO and arrives at the first microphone 11D in FIG. 22B.

Figure 23A:
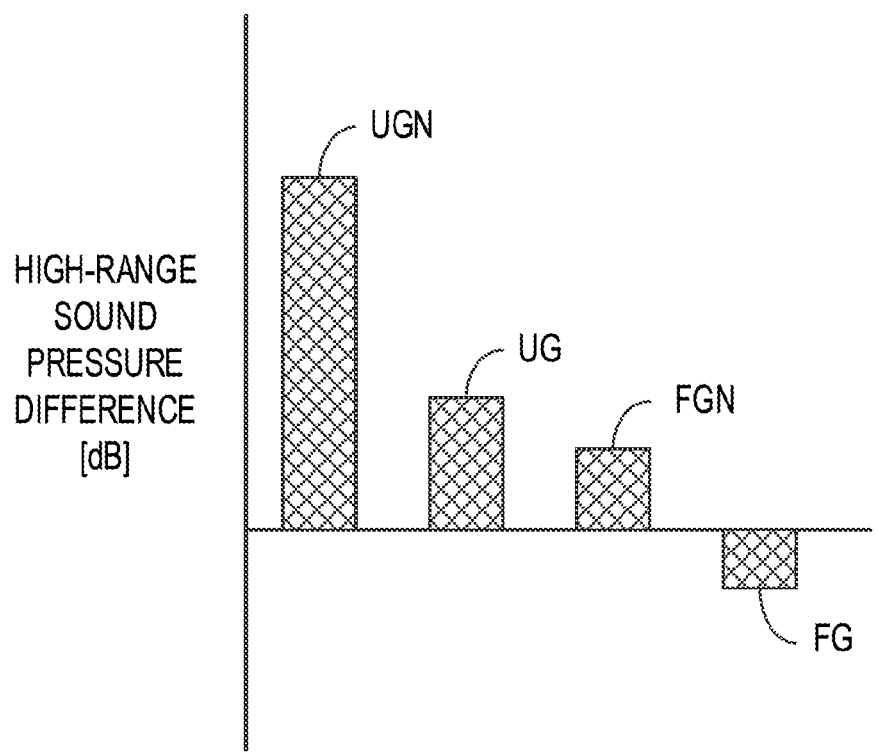
FIG. 23A is a conceptual diagram exemplifying a high range sound pressure difference between a case where there is a gap in the rear surface of the device for determining a sound source direction and a case where there is no gap.

FIG. 23A exemplifies a high-range sound pressure difference between the first microphone 11D and the second microphone 12D. First block UGN from the left side indicates a first sound pressure difference when the sound source exists at the upper side and there is no gap. Second block UG from the left side indicates a second sound pressure difference when the sound source exists at the upper side and there is a gap. Since there is the sound passing through the gap, the second sound pressure difference is smaller than the first sound pressure difference.

Fourth block FG from the left side indicates a fourth sound pressure difference when the sound source exists in the front side and there is a gap. Since the sound pressure of the sound acquired by the second microphone 12D is larger than the sound pressure of the sound acquired by the first microphone 11D, the fourth sound pressure value has a negative value.

In the meantime, third block FGN from the left side indicates a third sound pressure difference when the sound source exists in the front side and there is no gap. Since there is no gap, the sound pressure of the sound acquired by the first microphone 11D is larger than the sound pressure of the sound acquired by the second microphone 12D, so that the sound pressure difference has a plus value because even the sound passing through the gap arrives at the first microphone 11D when there is the gap. Even when the sound pressure of the sound acquired by the first microphone 11D is smaller than the sound pressure of the sound acquired by the second microphone 12D, the sound pressure of the sound acquired by the first microphone 11D is close to the sound pressure of the sound acquired by the second microphone 12D, and the sound pressure difference is decreased to the degree, in which it is difficult to determine the sound source direction. The first sound pressure difference is, for example, 4.8 dB, the second sound pressure difference is, for example, 1.8 dB, the third sound pressure difference is, for example, 1.2 dB, and the fourth sound pressure difference is, for example, −0.9 dB.

Accordingly, when there is no gap in the rear surface of the device for determining a sound source direction 10D, there is a case where it is difficult to determine the sound source direction due to the high-range sound pressure difference. That is, there is a case where it is difficult to set an appropriate threshold value for determining the sound source direction. For example, when the first threshold value, which is the plus value, for determining whether the sound source exists at the upper side is set to be large, there is a concern that the high-range sound pressure difference, which is indicated by block UG, when the sound source exists at the upper side may be determined as the high-range sound pressure difference when the sound source exists in the front side. In the meantime, when the first threshold value, which is the plus value, is set to be small, there is a concern that the high-range sound pressure difference, which is indicated by block FGN, when the sound source exists in the front side may be determined as the high-range sound pressure difference when the sound source exists at the upper side.

Figure 23B:
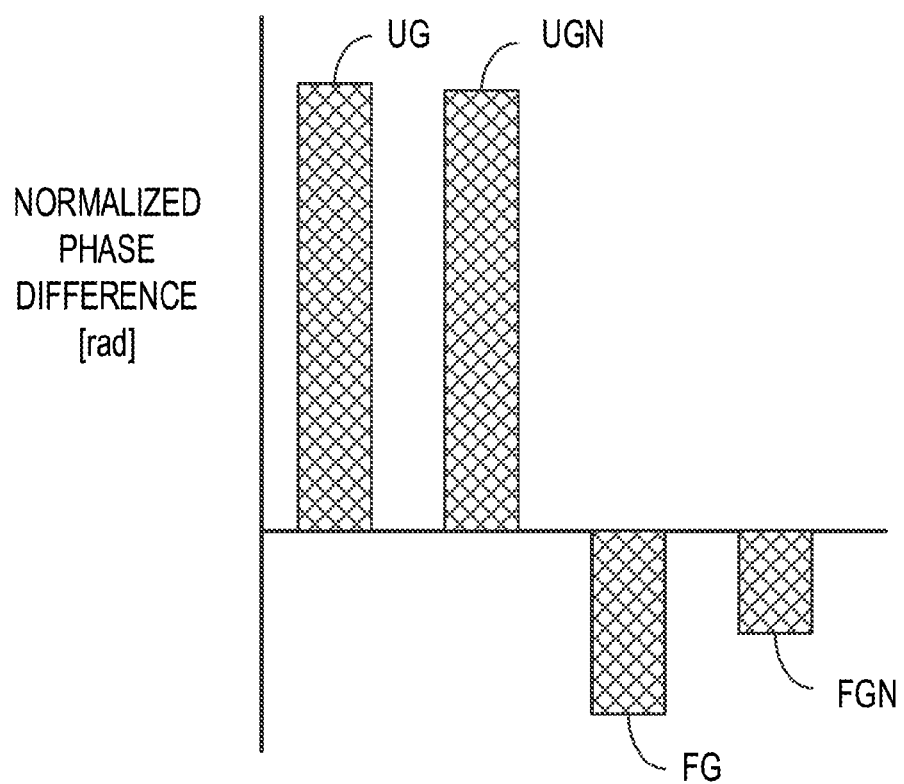
FIG. 23B is a conceptual diagram exemplifying a normalized phase difference between a case where there is a gap in the rear surface of the device for determining a sound source direction and a case where there is no gap.

FIG. 23B exemplifies a normalized phase difference between the phase of the sound acquired by the first microphone 11D and the phase of the sound acquired by the second microphone 12D. First block UG from the left side indicates a first phase difference when the sound source exists at the upper side and there is no gap. Second block UGN from the left side indicates a second phase difference when the sound source exists at the upper side and there is a gap.

Third block FG from the left side indicates a third phase difference when the sound source exists in the front side and there is a gap. Fourth block FGN from the left side indicates a phase difference when the sound source exists in the front side and there is no gap. That is, regardless of the existence of the gap in the rear surface of the device for determining a sound source direction 10, when the sound source exists at the upper side, the phase difference has a plus value. Further, when the sound source exists in the front side, the phase difference has a negative value. The first phase difference is, for example, 6.1 rad, the second phase difference is, for example, 6.0 rad, the third phase difference is, for example, −2.5 rad, and the fourth phase difference is, for example, −1.4 rad. Accordingly, regardless of the existence of the gap in the rear surface of the device for determining a sound source direction 10, it is comparatively easy to set an appropriate threshold value for determining the sound source direction.

When the sound source exists at the upper side of the device for determining a sound source direction 10D, the sound arrives at the first microphone 11D prior to the arrival of the sound to the second microphone 12D. Further, when the sound source exists in the front side of the device for determining a sound source direction 10D, the sound arrives at the second microphone 12D prior to the arrival of the sound to the first microphone 11D. Accordingly, the phase difference may be used for determining the sound source direction. Further, since the phase difference is not influenced much by an absolute sound pressure, it is possible to acquire an appropriate phase difference even when an absolute sound pressure is changed according to the existence of the gap in the rear surface of the device for determining a sound source direction 10D.

Fifth Embodiment

Next, an example of the fifth embodiment will be described. The descriptions of the same configurations and operations as those of the first to fourth embodiments will be omitted. In the fifth embodiment, a threshold value for determining the sound source direction is adjusted based on sound signals corresponding to sounds uttered by a user and a conversation partner.

Figure 24:
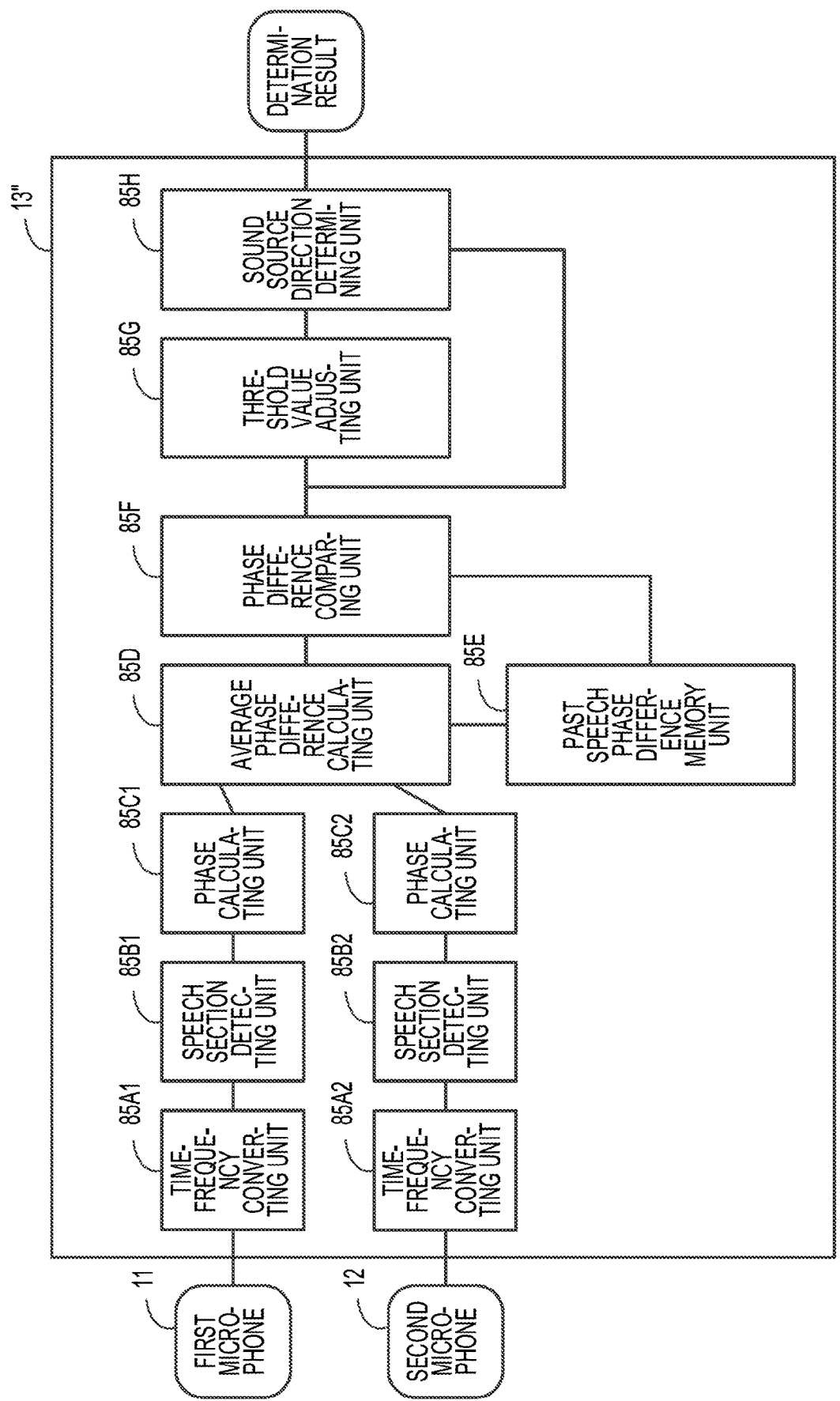
FIG. 24 is a block diagram exemplifying an outline of a sound source direction determination processing according to the fifth embodiment.

FIG. 24 exemplifies an outline of the sound source direction determination processing of the fifth embodiment performed by a determining unit 13", instead of the determining unit 13 of the device for determining a sound source direction 10 of FIG. 1. A time-frequency converting unit 85A1 time-frequency converts a sound signal corresponding to a sound acquired by a first microphone 11, and a time-frequency converting unit 85A2 time-frequency converts a sound signal corresponding to a sound acquired by a second microphone 12.

A speech section detecting unit 85B1 detects a speech section of the sound signal corresponding to the sound acquired by the first microphone 11, and a speech section detecting unit 85B2 detects a speech section of the sound signal corresponding to the sound acquired by the second microphone 12. The existing method may be applied to the detection of the speech section.

A phase calculating unit 85C1 calculates the phase of the sound signal corresponding to the sound acquired by the first microphone 11 by using the sound signal of the detected speech section. A phase calculating unit 85C2 calculates the phase of the sound signal corresponding to the sound acquired by the second microphone 12 by using the sound signal of the detected speech section. An average phase difference calculating unit 85D calculates a phase difference by using the calculated phases, and calculates a phase difference average value, which is an average value of the phase difference of the speech sections.

A past speech phase difference memory unit 85E stores the calculated phase difference average value to be used as a future past speech phase difference. A phase difference comparing unit 85F compares a phase difference average value with a previously stored past speech phase difference.

When there is a difference exceeding a predetermined value, which is an example of a third threshold value, in the phase difference average value and the past speech phase difference, a threshold value adjusting unit 85G adjusts a threshold value, based on which the sound source direction is determined. The difference is an absolute value of the value obtained by subtracting the past speech phase difference from the phase difference average value.

For example, the difference between a phase difference average value of a voice of a user and a phase difference average value of a voice of a conversation partner is obtained at each angle by inclining the front surface of the case 18 of the device for determining a sound source direction 10 at a plurality of different angles to a vertical direction. The minimum value among the absolute values of the plurality of acquired differences may be used as the third predetermined value. The third threshold value may be, for example, 4.1 rad. When there is no past speech phase difference exceeding the third predetermined value, the threshold value adjusting unit 85G does not adjust the threshold value.

When there is the plurality of past speech phase differences having a difference exceeding the predetermined threshold value, the latest past speech phase difference is used, and the threshold value adjusting unit 85G adjusts the threshold value, based on which the sound source direction is determined. Specifically, for example, a phase difference average value of a current speech section and an average value (that is, an intermediate value) of the past speech phase difference are set as the threshold value, based on which the sound source direction is determined. The sound source direction determining unit 85H determines the sound source direction by using the adjusted threshold value, and outputs a determination result.

Figure 25:
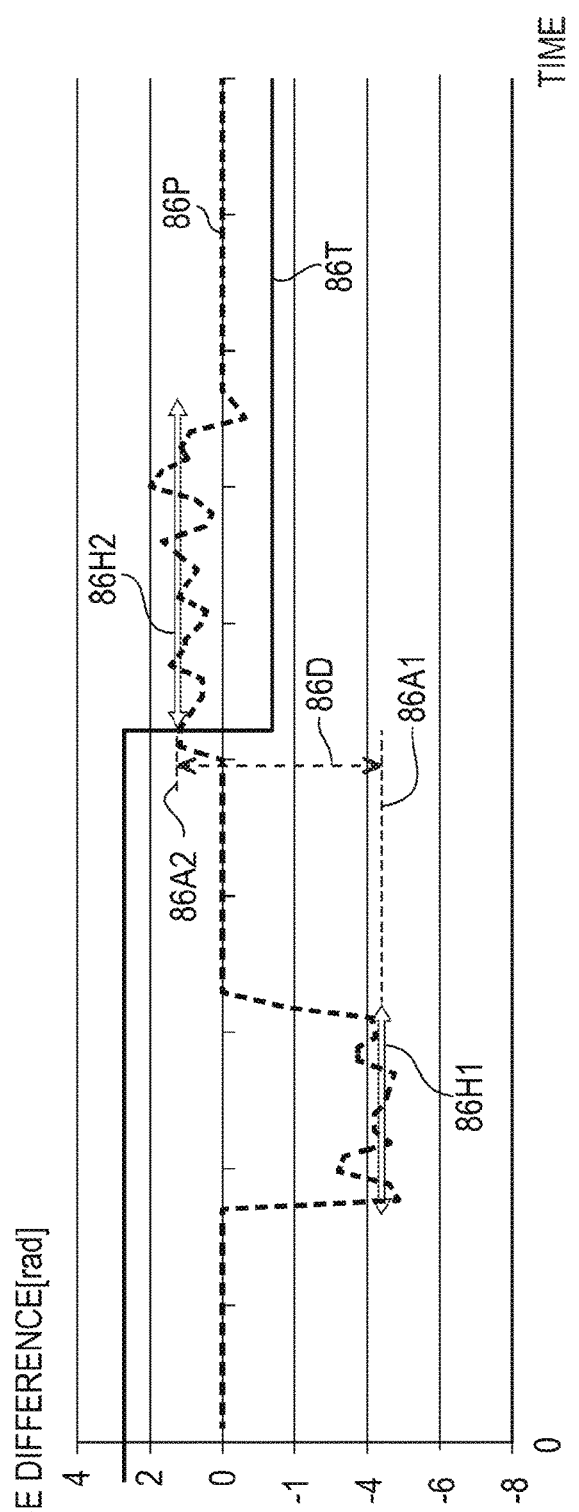
FIG. 25 is a conceptual diagram for describing an adjustment of a threshold value for determining a sound source direction.

The adjustment of the threshold value for determining the sound source direction will be described with reference to FIG. 25. A vertical axis of FIG. 25 indicates a phase difference (rad), and a horizontal axis indicates time, that is, a frame number. Broken line 86P indicates a phase difference between a sound signal corresponding to a sound acquired by the first microphone 11 and a sound signal corresponding to a sound acquired by the second microphone 12 for every frame.

As described above, a phase difference average value of a speech section 86H1, which is a previous speech section, is stored in, for example, the data storage region 53B of a secondary memory unit 53 as the past speech phase difference. There is difference 86D exceeding a predetermined value between the phase difference average value of the speech section 86H2, which is the current speech section, and the past speech phase difference corresponding to the speech section 86H1.

For example, the threshold value adjusting unit 85F sets an average value of the past speech phase difference corresponding to the speech section 86H1 and the phase difference average value of the speech section 86H2 as a threshold value 86T. The set threshold value is used for determining a sound source direction of the sound signal of the speech section 86H2.

Figure 26A:
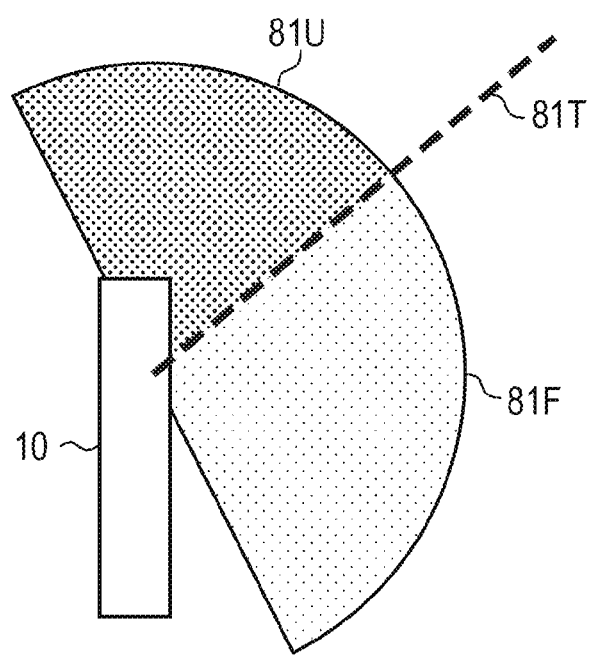
FIG. 26A is a conceptual diagram for exemplifying a relationship between a gradient of the device for determining a sound source direction and a threshold value for determining a sound source direction.

It is assumed that the device for determining a sound source direction 10 is worn by the user so that the front surface of the case 18 is approximately parallel to a vertical direction as exemplified in FIG. 26A. In FIG. 24A, based on a predetermined phase difference threshold value 81T as a boundary, a sound source direction of a voice of region 81U is determined to be the upper side, that is, the speech of the user, and a sound source direction of a voice of region 81F is determined to be the front side, that is, the speech of the conversation partner.

Figure 26B:
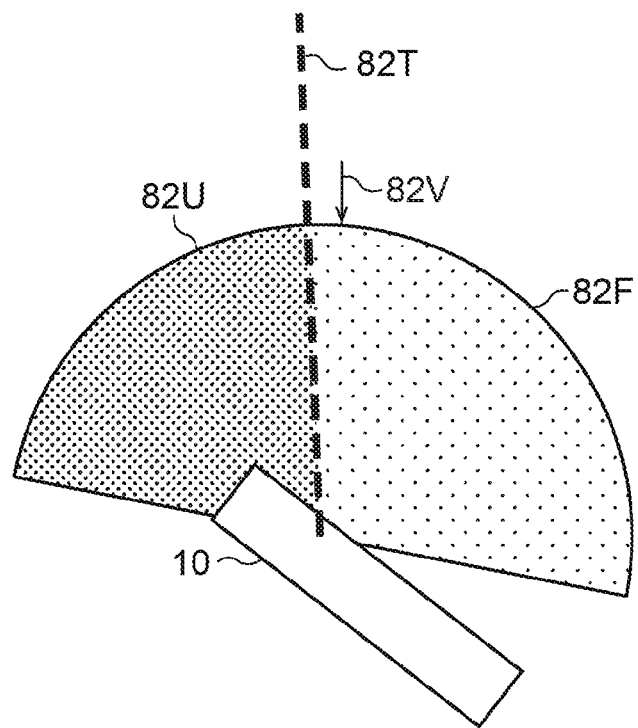
FIG. 26B is a conceptual diagram for exemplifying a relationship between a gradient of the device for determining a sound source direction and a threshold value for determining a sound source direction.

However, there is a case where the device for determining a sound source direction 10 is inclined as exemplified in FIG. 26B by, for example, a body type of the user, which is the person wearing the device for determining a sound source direction 10, or a mounting method. For example, when the user is a woman, the device for determining a sound source direction 10 is inclined so that the front surface of the case 18 of the device for determining a sound source direction 10 is obliquely directed toward the upper side by an influence of an inclination of the chest as exemplified in FIG. 26B. In this case, as exemplified in the phase difference threshold value 82T, the boundary of the determination is also inclined, that is, rotated.

In FIG. 26B, based on a phase difference threshold value 82T as a boundary, a sound source direction of a voice of region 82U is determined to be the upper side, that is, the speech of the user, who is the person wearing the device for determining a sound source direction 10, and a sound source direction of a voice of region 82F is determined to be the front side, that is, the speech of the conversation partner. Accordingly, there is a concern that the speech of the user exemplified by arrow 82V is determined as the speech of the conversation partner.

Figure 27A:
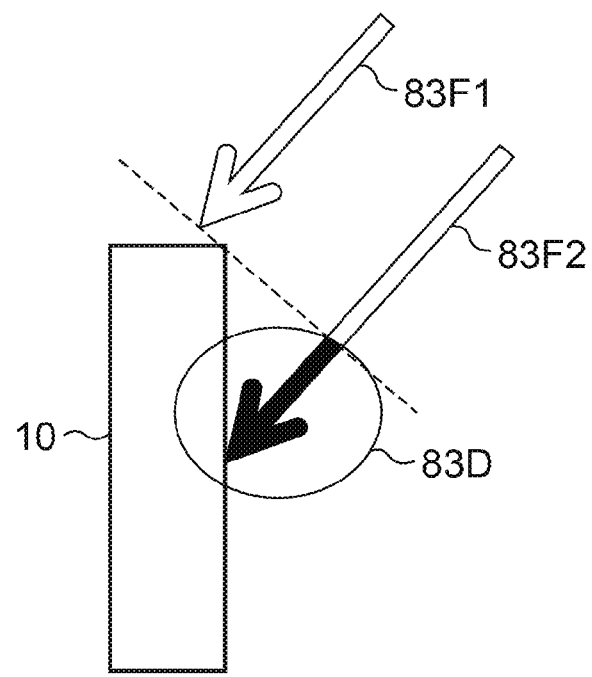
FIG. 27A is a conceptual diagram for exemplifying a relationship between a gradient of the device for determining a sound source direction and a phase difference between sounds reaching an upper surface and a front surface of the device for determining a sound source direction.
Figure 27B:
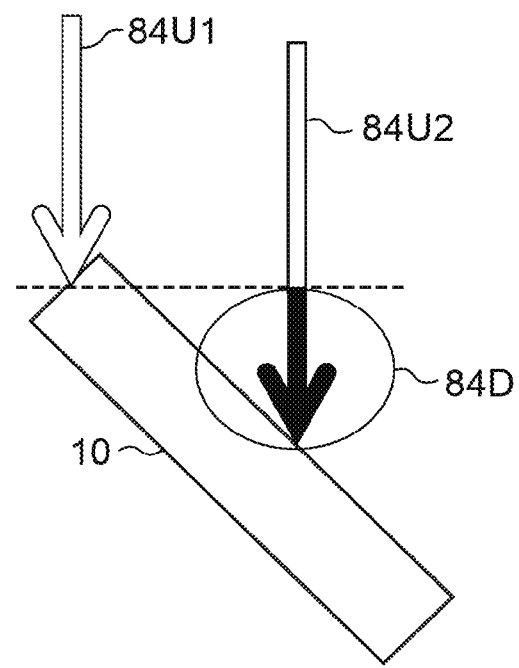
FIG. 27B is a conceptual diagram for exemplifying a relationship between a gradient of the device for determining a sound source direction and a phase difference between sounds reaching an upper surface and a front surface of the device for determining a sound source direction.

FIG. 27A exemplifies the case where the front surface of the case 18 of the device for determining a sound source direction 10 is approximately parallel to the vertical direction, and FIG. 27B exemplifies the case where the front surface of the case 18 of the device for determining a sound source direction 10 is inclined so as to obliquely head to the upper side. Phase difference 83D exemplified in FIG. 27A is approximately the same as phase difference 84D exemplified in FIG. 27B. Phase difference 83D indicates a phase difference between arrow 83F1 indicating the arrival of the voice of the conversation partner to the upper surface and arrow 83F2 indicating the arrival of the voice of the conversation partner to the front surface. Phase difference 84D indicates a phase difference between arrow 84U1 indicating the arrival of the voice of the user to the upper surface and arrow 84U2 indicating the arrival of the voice of the user to the front surface.

Figure 28:
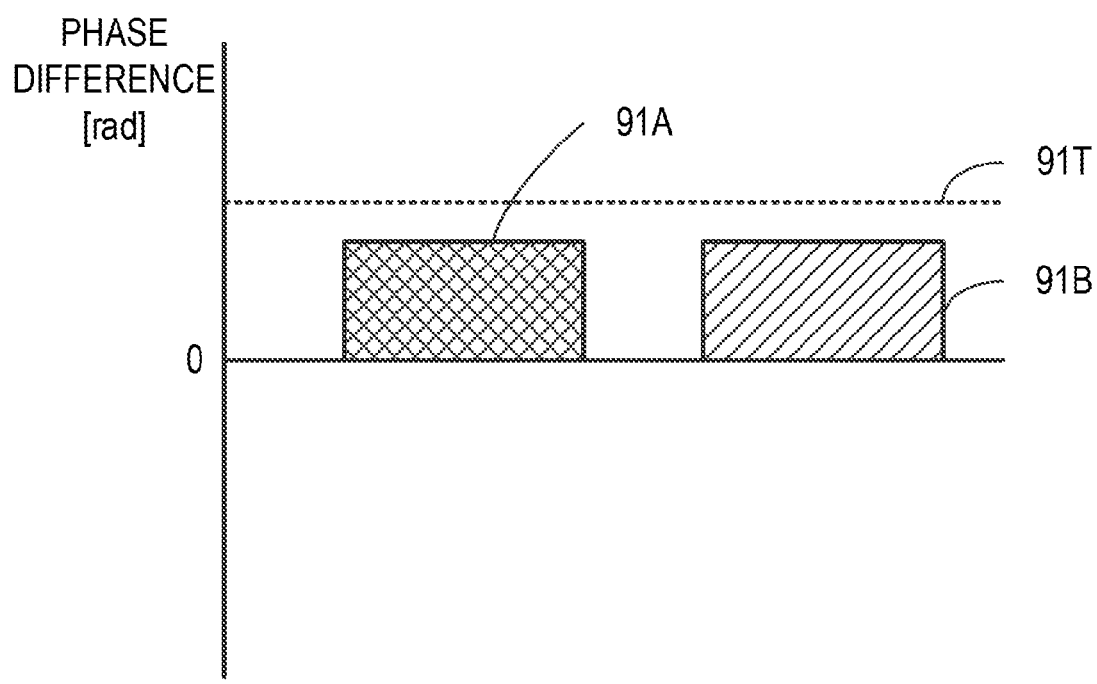
FIG. 28 is a conceptual diagram exemplifying a relationship between a user voice phase difference and a conversation partner voice phase difference when a gradient of the device for determining a sound source direction is different.

FIG. 28 exemplifies phase difference 91A corresponding to phase difference 83D of FIG. 27A and phase difference 91B corresponding to phase difference 84D of FIG. 27B. In phase difference threshold value 91T, it is difficult to discriminate phase difference 91A and phase difference 91B, so that even though the threshold value is adjusted, it is difficult to discriminate phase difference 91A and phase difference 91B.

In the meantime, in the phase difference between the voice of the user, who is the person wearing the device for determining a sound source direction 10, and the voice of the conversation partner, even though the device for determining a sound source direction 10 is inclined, there is a difference exceeding a predetermined value when the inclination is the same. Accordingly, it is possible to appropriately determine the sound source direction even when the device for determining a sound source direction 10 is inclined by adjusting the phase difference threshold based on the speech of the user and the speech of the conversation partner.

Figure 29A:
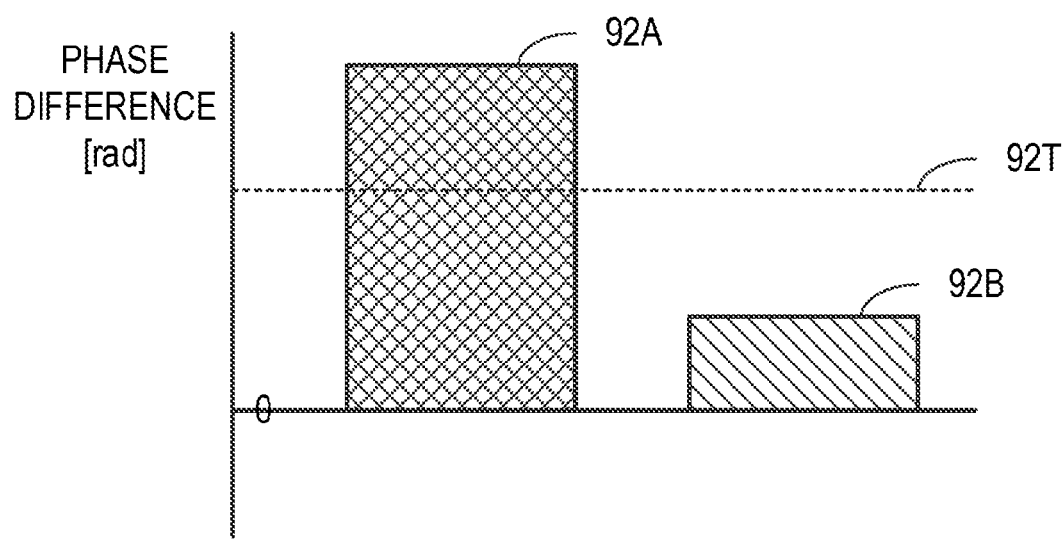
FIG. 29A is a conceptual diagram exemplifying a relationship between a user voice phase difference and a conversation partner voice phase difference when a gradient of the device for determining a sound source direction is the same.

FIG. 29A exemplifies the phase difference 92A of the voice of the user and phase difference 92B of the voice of the conversation partner in the case where the front surface of the case 18 of the device for determining a sound source direction 10 is approximately parallel to the vertical direction. It is possible to discriminate phase difference 92A and phase difference 92B by adjusting phase difference threshold value 92T with an average value of phase difference 92A and phase difference 92B. That is, it is possible to appropriately determine the sound source direction.

Figure 29B:
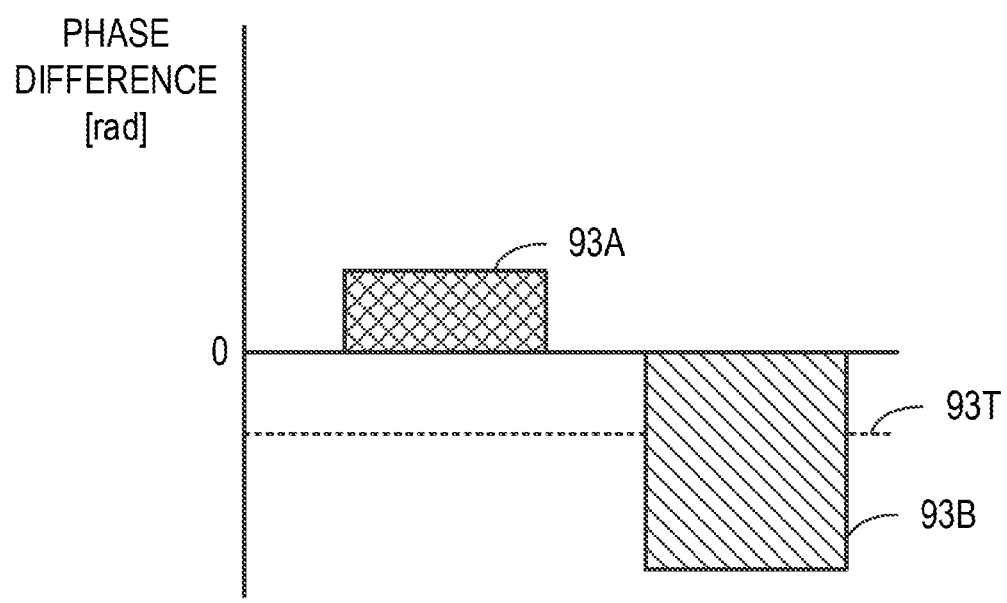
FIG. 29B is a conceptual diagram exemplifying a relationship between a user voice phase difference and a conversation partner voice phase difference when a gradient of the device for determining a sound source direction is the same.

FIG. 29B exemplifies the phase difference 93A of the voice of the user and phase difference 93B of the voice of the conversation partner in the case where the front surface of the case 18 of the device for determining a sound source direction 10 is inclined so as to obliquely head to the upper side. It is possible to discriminate the phase difference 93A and phase difference 93B by adjusting the phase difference threshold value 93T with an average value of phase difference 93A and phase difference 93B. That is, it is possible to appropriately determine the sound source direction.

Figure 30A:
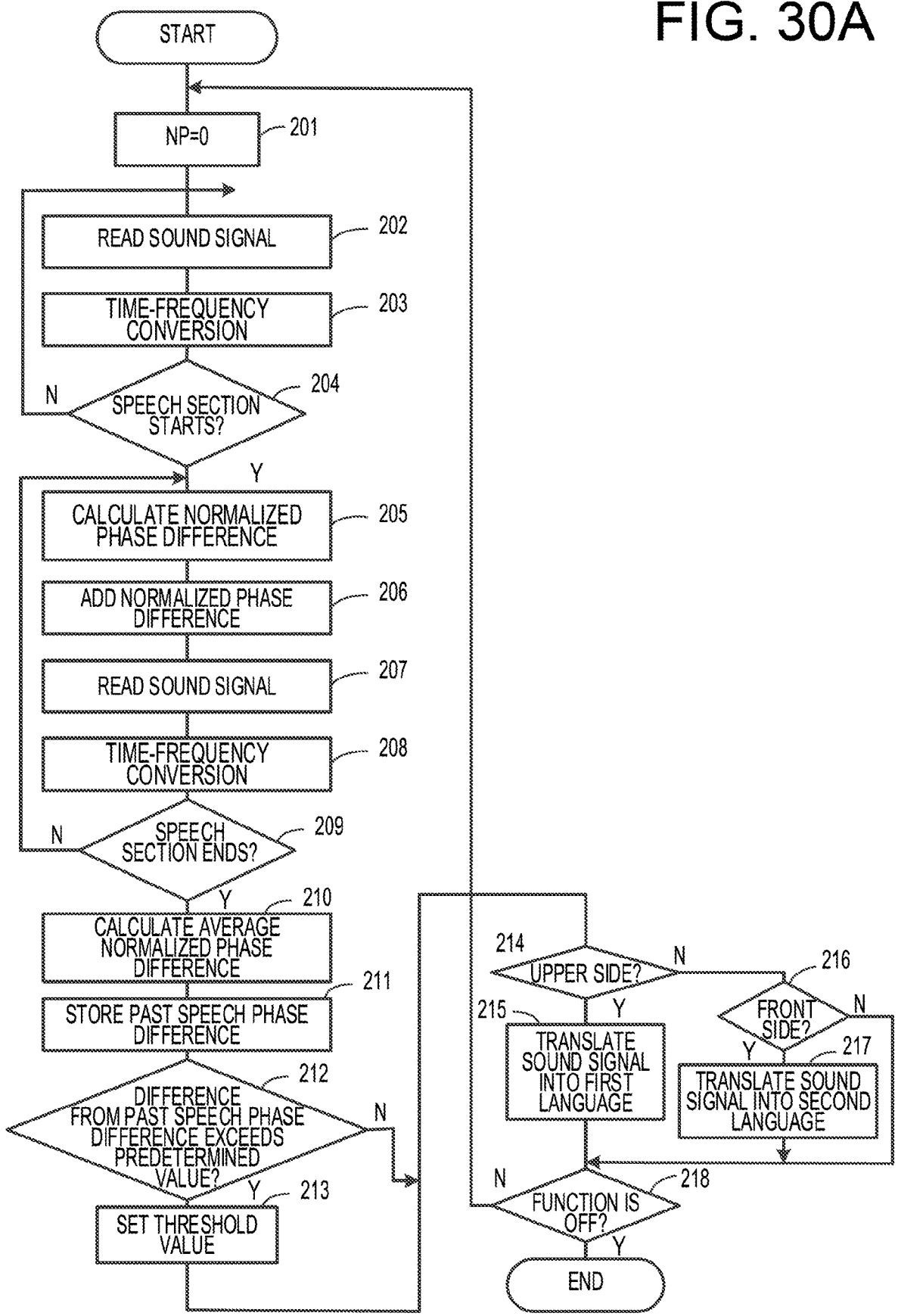
FIG. 30A is a flowchart illustrating an example of a sound source direction determination processing flow according to the fifth embodiment.

FIG. 30A illustrates an example of a sound source direction determination processing flow. The CPU 51 sets variable NP with 0 in operation 201. Variable NP is a variable for summing normalized phase differences of a speech section.

The CPU 51 reads sound signals corresponding to the sounds acquired by the first microphone 11 and the second microphone 12 of one frame in operation 202, and time-frequency converts the read sound signals in operation 203. The CPU 51 determines whether a speech section starts in operation 204.

When the determination of operation 204 is negative, the CPU 51 returns to operation 202. When the determination of operation 204 is positive, the CPU 51 calculates a normalized phase difference in operation 205, and adds the normalized phase difference to variable NP in operation 206.

The CPU 51 reads sound signals corresponding to the sounds acquired by the first microphone 11 and the second microphone 12 of one frame in operation 207, and time-frequency converts the read sound signals in operation 208. The CPU 51 determines whether the speech section ends in operation 209.

When the determination of operation 209 is negative, the CPU 51 returns to operation 205. When the determination of the operation 209 is positive, in operation 210, the CPU 51 calculates an average normalized phase difference, which is an example of a phase difference average value, by dividing the value of variable NP by the number of frames of the sound signal read in operation 207. The CPU 51 stores the calculated average normalized phase difference in, for example, the data storage region 53B of the secondary memory unit 53 as the past speech phase difference for the future use in operation 211.

The CPU 51 compares the past speech phase difference stored by the previous processing with an average normalized phase difference in operation 212. When the determination of operation 212 is positive, and there is a difference exceeding a predetermined value in the past speech phase difference and the average normalized phase difference, the CPU 51 adjusts a threshold value in operation 213 and proceeds to operation 214. Specifically, in operation 213, the CPU 51 sets an average value of the past speech phase difference and the average normalized speech distance as a threshold value, which is an example of a sixth threshold value, to adjust the threshold value.

When the determination of operation 212 is negative, the CPU 51 does not adjust the threshold value and proceeds to operation 214. The CPU 51 determines whether the sound source direction of the sound signal read in operation 207 is the upper side in operation 214. Specifically, the CPU 51 determines whether the average normalized phase difference exceeds a threshold value.

When the determination of operation 214 is positive, the CPU 51 sets the sound signal read in operation 207 to be translated into the first language in operation 215. When the determination of operation 214 is negative, the CPU 51 determines whether the sound source direction of the sound signal read in operation 207 is the front side in operation 216. Specifically, the CPU 51 determines whether the average normalized phase difference is equal to or smaller than the threshold value.

When the determination of operation 216 is positive, the CPU 51 sets the sound signal read in operation 207 to be translated into the second language in operation 217. The CPU 51 determines whether an operation, such as pressing a predetermined button by the user, of instructing to terminate the sound source direction determination processing is performed in operation 218.

When the determination of operation 218 is negative, the CPU 51 returns to operation 201, and when the determination of operation 218 is positive, the CPU 51 terminates the sound source direction determination processing.

Figure 30B:
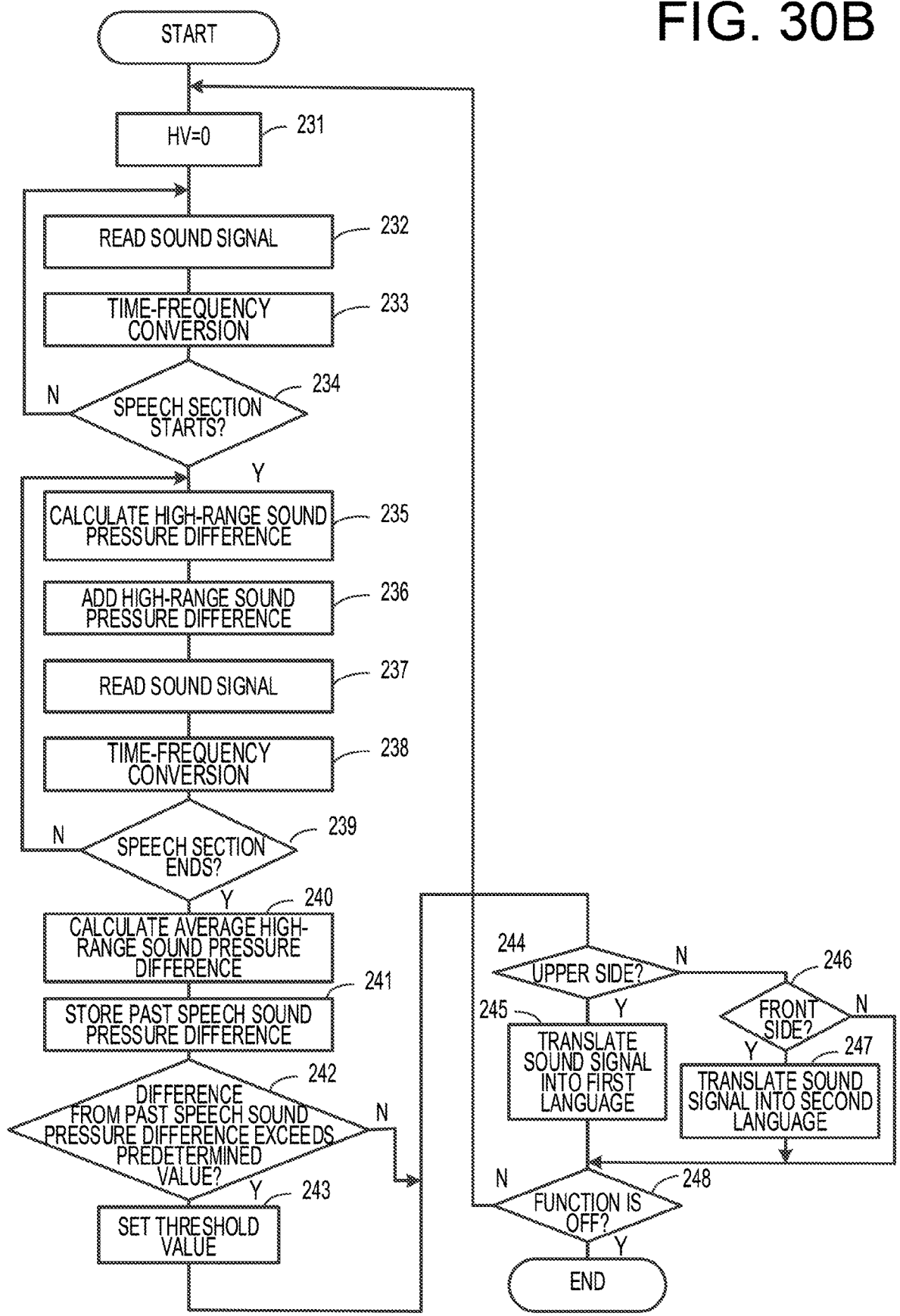
FIG. 30B is a flowchart illustrating an example of a sound source direction determination processing flow according to the fifth embodiment.

FIG. 30B illustrates an example of the sound source direction determination processing flow. The sound source direction determination processing of FIG. 30B adjusts a threshold value based on a sound pressure difference between a voice of a user and a voice of a conversation partner.

The CPU 51 sets variable HV for calculating a sum of a high-range sound pressure difference with 0 in operation 231. Operations 232 to 234 are the same as operations 202 to 204 of FIG. 30A.

The CPU 51 calculates a high-range sound pressure difference in operation 235, and adds the high-range sound pressure difference calculated in operation 236 to a value of variable HV. Operations 237 to 239 are the same as operations 207 to 209 of FIG. 30A.

In operation 240, the CPU 51 calculates an average high-range sound pressure difference, which is an example of a sound pressure difference average value, by dividing the value of variable HV by the number of frames of the sound signal read in operation 237. The CPU 51 stores the calculated average high-range sound pressure difference in, for example, the data storage region 53B of the secondary memory unit 53 as a past speech phase difference for the future use in operation 241.

The CPU 51 compares the past speech sound pressure difference stored by the previous processing with the average high-range sound pressure difference. When the determination of operation 242 is positive, the CPU 51 adjusts a threshold value by setting an average value of the past speech sound pressure difference and the average high-range sound pressure difference as the threshold value, which is an example of a fifth threshold value in operation 243, and the CPU 51 proceeds to operation 244. The determination of operation 242 is positive when there is a difference exceeding a predetermined value, which is an example of a second threshold value, in the past speech sound pressure difference and the average high-range sound pressure difference.

For example, a difference between a sound pressure difference average value of a voice of a user and a sound pressure difference average value of a voice of a conversation partner is obtained at each angle by inclining the front surface of the case 18 of the device for determining a sound source direction 10 at a plurality of different angles to a vertical direction. The minimum value among the absolute values of the plurality of acquired differences may be used as the second predetermined value. The second predetermined value may be, for example, 3.0 dB. When there is no past speech sound pressure difference exceeding the second predetermined value, the CPU 51 does not adjust the threshold value.

When the determination of operation 242 is negative, the CPU 51 does not adjust the threshold value and proceeds to operation 244. The CPU 51 determines whether the sound source direction of the sound signal read in operation 237 is the upper side in operation 244. Specifically, the CPU 51 determines whether the average high-range sound pressure difference is larger than the threshold value.

When the determination of operation 244 is positive, the CPU 51 sets the sound signal read in operation 237 to be translated into the first language in operation 245. When the determination of operation 244 is negative, the CPU 51 determines whether the sound source direction of the sound signal read in operation 207 is the front side in operation 246. Specifically, the CPU 51 determines whether the average high-range sound pressure difference is equal to or smaller than the threshold value. Operation 248 is the same as operation 218 of FIG. 30A.

FIG. 30A is an example, in which the fifth embodiment is applied to the sound source direction determination processing according to the fourth embodiment illustrated in FIG. 17G, and FIG. 30B is an example, in which the fifth embodiment is applied to the sound source direction determination processing according to the third embodiment illustrated in FIG. 11. However, the fifth embodiment may also be applied to sound source direction determination processing according to the fourth embodiment illustrated in FIGS. 17A to 17F. That is, both the threshold value that determines the sound pressure difference and the threshold value that determines the phase difference may be adjusted.

When there is a plurality of past speech phase differences, of which a difference from the phase difference average value exceeds a predetermined value, the latest past speech phase difference may be used, and the past speech phase difference, which has a maximum difference among the past speech phase differences within a predetermined time, may be used. Further, an average value of the past speech phase differences within the predetermined time may also be used.

When there is the plurality of past speech sound pressure differences, of which a difference from the sound pressure difference average value exceeds the predetermined value, the latest past speech sound pressure difference may be used, and the past speech sound pressure difference, which has a maximum difference among the past speech sound pressure differences within a predetermined time, may be used. Further, an average value of the past speech sound pressure differences within the predetermined time may also be used.

While an example has been described in which the phase difference average value or the sound pressure difference average value of the plurality of frames of the speech section is calculated, the phase difference average value or the sound pressure difference average value of the plurality of frames of a part of the speech section may also be calculated. Further, when the speech section extends over a long period of time, the speech section may be divided into a plurality of sections, and the phase difference average value or the sound pressure difference average value may be calculated for each of the plurality of divided sections.

The example, in which the threshold value, based on which the sound source direction is determined, is naturally adjusted during the conversation of the user and the conversation partner, has been described, but a user and a conversation partner may alternately speak a phrase exceeding a predetermined time length in the beginning of the conversation, and the threshold value may be adjusted by using the voices of the corresponding speech. The phrase may be, for example, a default greeting (for example, "Hello").

In the example, operation 216 of FIG. 30A may be omitted, but, for example, the threshold value, based on which the sound source direction is determined, in operation 214 may have a difference value from that of the threshold value, based on which the sound source direction is determined, in operation 216. Specifically, for example, the threshold value used in operation 216 may be reduced by a predetermined amount from the threshold value used in operation 214.

Accordingly, it is possible to reduce the possibility of erroneously determining the sound, of which the sound source direction is difficult to be determined, that is, which may be determined as a sound from any sound source direction. The same is applied to operation 246 of FIG. 30B. Further, the threshold value used in operation 214 or operation 244 may be increased by a predetermined amount.

A signal-to-noise ratio of the sound signal may be calculated, and when the signal-to-noise ratio is smaller than a predetermined value, which is an example of a fourth predetermined value, the threshold value, based on which the sound source direction is determined, may be decreased by a predetermined value, which is an example of a fifth predetermined value. The reason is that as the signal-to-noise ratio is small, a difference between a phase difference and a sound pressure difference according to a sound source direction tends to become small.

The fourth predetermined value may be, for example, a stationary signal-to-noise ratio, and the fifth predetermined value may be, for example, 0.5 dB in the case of the threshold value discriminating the sound pressure difference average value, and may be, for example, 0.5 rad in the case of the threshold value discriminating the phase difference average value. The stationary signal-to-noise ratio may be calculated by the existing method.

The example, in which the present embodiment is applied to the device for determining a sound source direction 10 exemplified in FIGS. 2A and 2B, has been described, but the present embodiment may also be applied to the device for determining a sound source direction 10C exemplified in FIGS. 13A to 13C. According to the present embodiment, even when a user is present at a position deviated from the position opposite to the right surface and the front surface of the case 18C and speaks, it is possible to appropriately determine the sound source direction, that is, the speaker.

The processing orders of the flowchart of FIGS. 30A and 30B are the examples, and the present embodiment is not limited to the order of the corresponding processing.

In the present embodiment, a threshold value, based on which a sound source direction is determined, is adjusted based on a voice of a user and a voice of a conversation partner, so that even when the device for determining a sound source direction is inclined, it is possible to appropriately determine the sound source direction.

[Related Art]

Next, a related art will be described. In the related art, as exemplified in FIG. 18, two directional microphones are disposed so that directionality 11XOR of a directional microphone 11X crosses directionality 12XOR of a directional microphone 12X. For example, the directionality 11XOR is directed upward and the directionality 12XOR is directed forward.

By this configuration, it is possible to determine a direction of a sound source by using a sound pressure difference between a sound acquired by the directional microphone 11X and a sound acquired by the directional microphone 12X. That is, when the sound pressure of the sound acquired by the directional microphone 11X is larger than the sound pressure of the sound acquired by the directional microphone 12X, a sound source exists at the upper side, and when the sound pressure of the sound acquired by the directional microphone 12X is larger than the sound pressure of the sound acquired by the directional microphone 11X, a sound source exists in the front side.

However, the directional microphone is larger than the omnidirectional microphone as exemplified in FIG. 19, so that it is difficult to miniaturize the device for determining a sound source direction when the directional microphone is used. In the example of FIG. 19, a volume of the directional microphone is 226 mm$^3$, and a volume of the omnidirectional microphone is 11 mm$^3$. That is, the volume of the directional microphone is about 20 times the volume of the omnidirectional microphone. Further, the directional microphone is more expensive than the omnidirectional microphone, so that when the directional microphone is used, it is also difficult to reduce a price of the sound source directional determining device.

Figure 18:
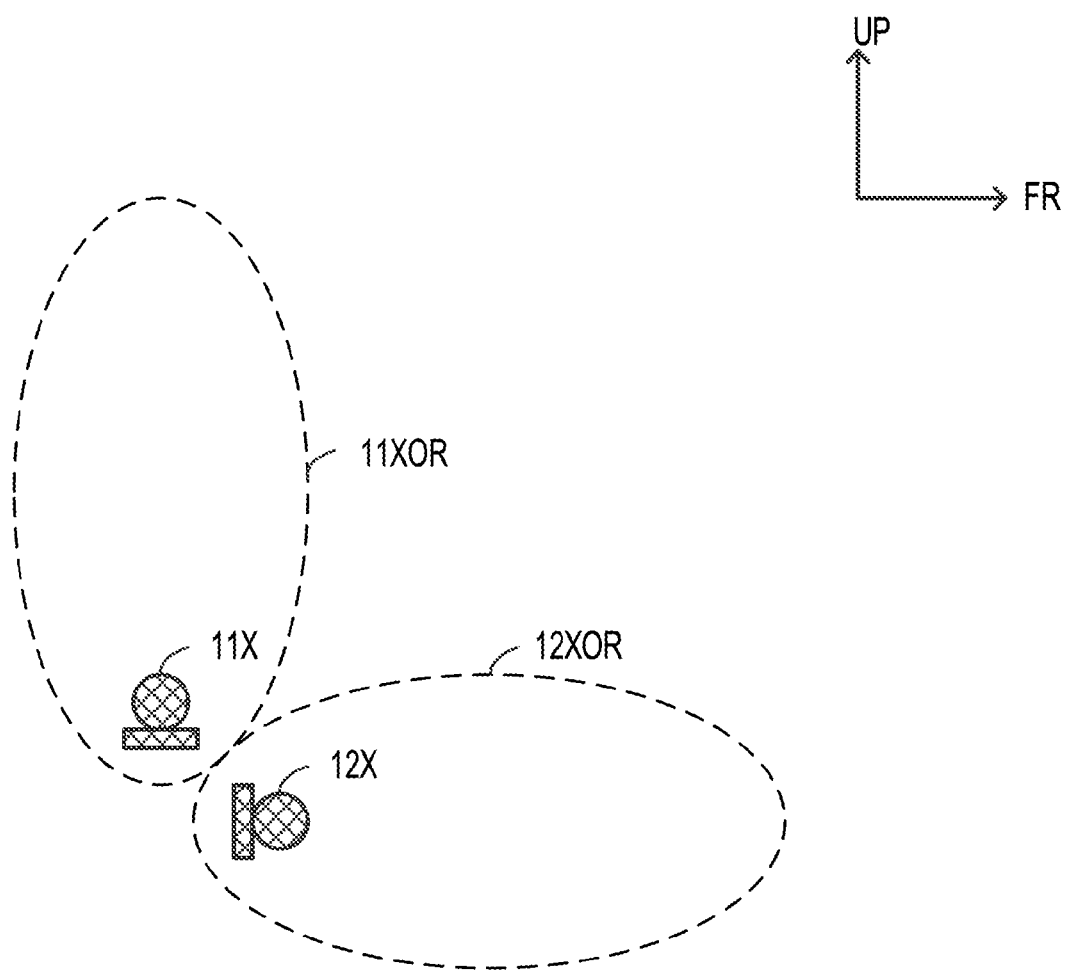
FIG. 18 is a conceptual diagram illustrating an example of a device for determining a sound source direction using a directional microphone according to a related art.
Figure 20A:
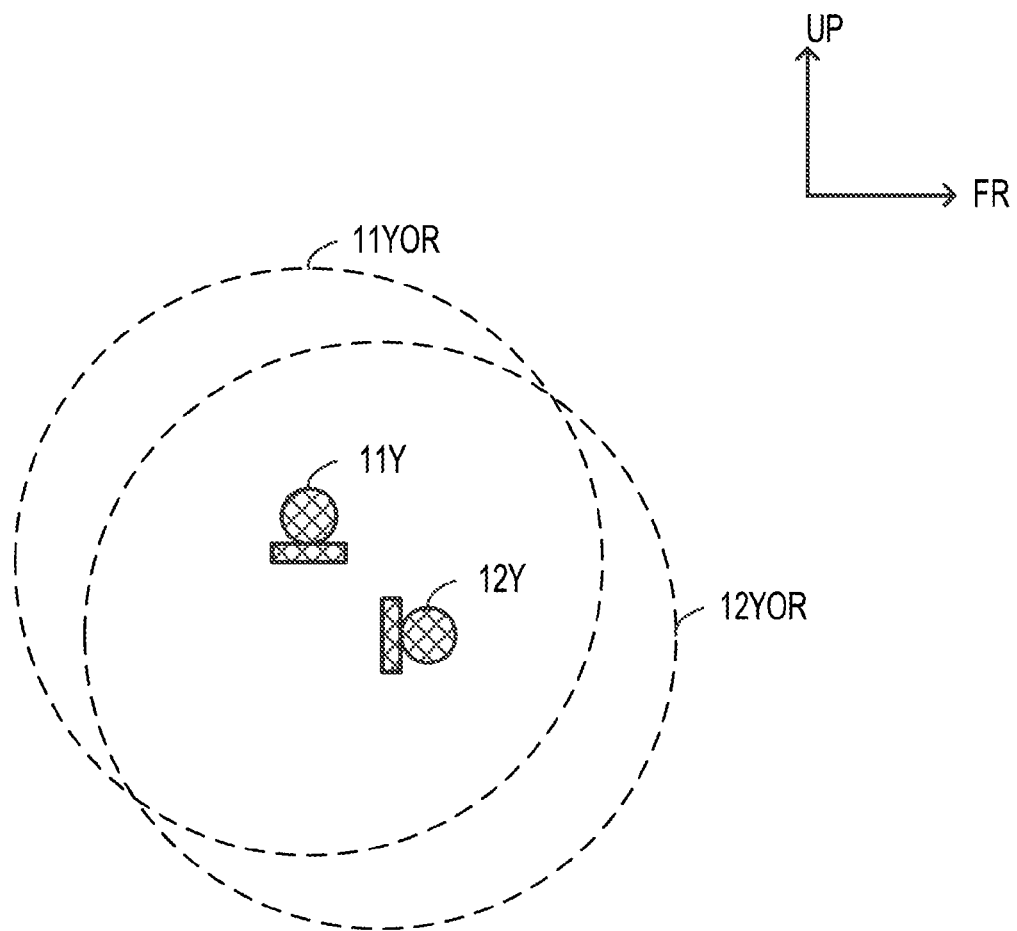
FIG. 20A is a conceptual diagram illustrating an example of a device for determining a sound source direction using an omnidirectional microphone for a related art.

However, it is difficult to implement the device for determining a sound source direction, which is capable of determining a sound source direction with high accuracy, by simply changing the directional microphone of the device for determining a sound source direction exemplified in FIG. 18 to the omnidirectional microphone. As exemplified in FIG. 20A, a range 11YOR, in which an omnidirectional microphone 11Y is capable of acquiring a sound, almost overlaps a range 12YOR, in which an omnidirectional microphone 12Y is capable of acquiring a sound. Accordingly, this is because there is no significant difference in the sound pressure difference between the sounds acquired by the omnidirectional microphones 11Y and 12Y to such an extent that the sound source direction may be accurately determined.

Figure 20B:
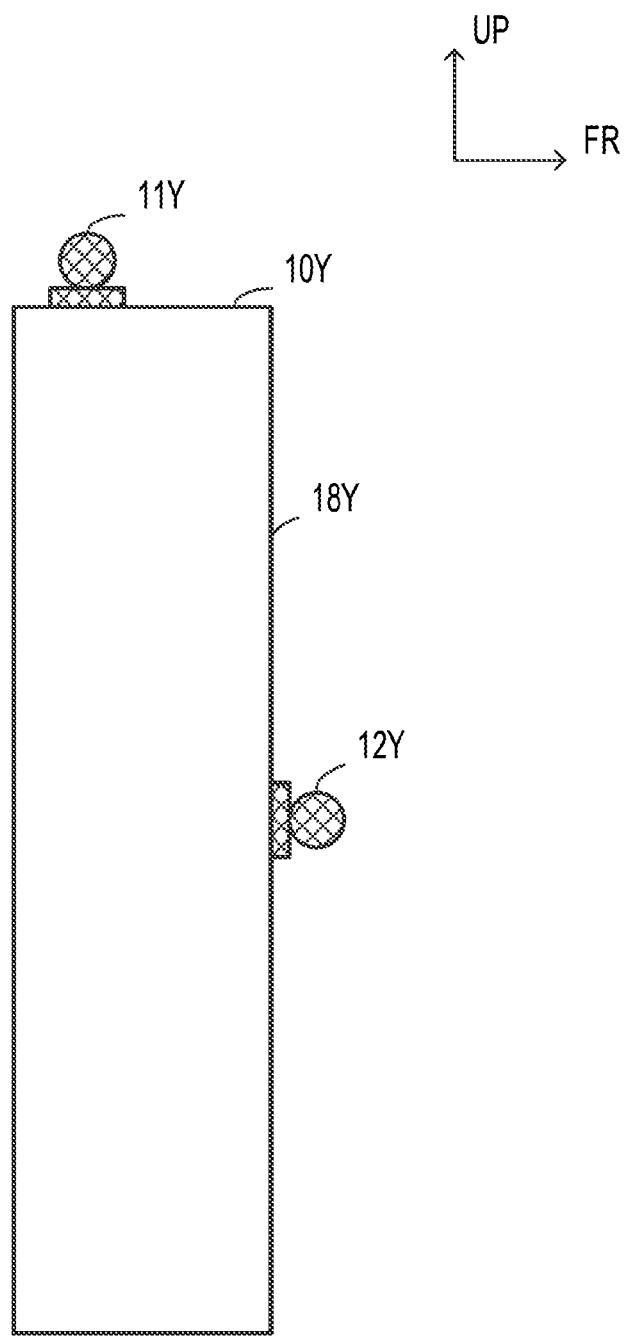
FIG. 20B is a conceptual diagram illustrating an example of a device for determining a sound source direction using an omnidirectional microphone according to a related art.

FIG. 20B exemplifies a device for determining a sound source direction 10Y of the related art, in which a first microphone 11Y is installed on an upper surface of a case 18Y and a second microphone 12Y is installed on a front surface, as in the first embodiment, and of which a width in a front-rear direction is about 1 cm, and the front surface is as large as a business card. The first microphone 11Y and the second microphone 12Y are omnidirectional microphones. A sound pressure difference of the device for determining a sound source direction 10Y in the related art and a sound pressure difference of the device for determining a sound source direction 10 of the first embodiment are exemplified in FIG. 21. When the sound source exists at the upper side of the device for determining a sound source direction, a sound pressure difference between a sound pressure of a sound acquired by the first microphone and a sound pressure of a sound acquired by the second microphone is 2.9 dB in the related art and 7.2 dB in the first embodiment.

When the sound source exists in the front side of the device for determining a sound source direction, a sound pressure difference between a sound pressure of a sound acquired by the first microphone and a sound pressure of a sound acquired by the second microphone is −2.9 dB in the related art and −4.2 dB in the first embodiment. That is, when the sound source exists at the upper side of the device for determining a sound source direction, the sound pressure difference calculated in the first embodiment is larger by 4.3 dB than that of the related art, and when the sound source exists in the front side of the device for determining a sound source direction, the sound pressure difference calculated in the first embodiment is smaller by 1.3 dB than that of the related art.

Accordingly, since the possibility of obtaining an incorrect determination result by the determinations of operations 104 and 106 of FIG. 11 is reduced in the present embodiment, so that according to the present embodiment, it is possible to improve accuracy of the determination of the sound source direction by using the omnidirectional microphone.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A device for determining a sound source direction, the device comprising:
    a case in which a first sound path, which has a first opening opened in a first surface at a first end of the first sound path and in which a sound is propagated from the first opening, and a second sound path, which has a second opening opened in a second surface crossing the first surface at a first end of the second sound path and in which a sound is propagated from the second opening, are provided;
    a first omnidirectional microphone provided at a second end of the first sound path;
    a second omnidirectional microphone provided at a second end of the second sound path;
    a memory; and
    a processor coupled to the memory and the processor configured to:
    determine a direction in which a source of a reached sound exists, based on a sound pressure difference between a first sound pressure that is a sound pressure of a first frequency component of a first part of the reached sound acquired by the first omnidirectional microphone and a second sound pressure that is a sound pressure of the first frequency component of a second part of the reached sound acquired by the second omnidirectional microphone, and a phase difference between a first phase that is a phase of a second frequency component of the first part of the reached sound and a second phase that is a phase of the second frequency component of the second part of the reached sound, wherein the first frequency component ranges from 3000 Hz to 8 kHz.

2. The device according to claim 1, wherein the first surface is orthogonal to the second surface, an area of the first surface is equal to or smaller than a first predetermined value, an area of the second surface is larger than the first predetermined value, the first sound path includes a first diffraction portion, which diffracts the sound in the first opening and a second diffraction portion, which diffracts the sound and is a bent portion, in the middle of the first sound path, and the second sound path includes a third diffraction portion, which diffracts the sound in the second opening.

3. The device according to claim 1, wherein the first surface is orthogonal to the second surface, an area of the first surface is equal to or smaller than a first predetermined value, an area of the second surface is larger than the first predetermined value, the first sound path includes a first diffraction portion, which diffracts the sound in the first opening and a second diffraction portion, which diffracts the sound and is a bent portion, in the middle of the first sound path, and the second sound path includes a third diffraction portion, which diffracts the sound in the second opening and a fourth diffraction portion, which diffracts the sound and is a bent portion, in the middle of the second sound path.

4. The device according to claim 1, wherein the first surface is orthogonal to the second surface, areas of the first surface and the second surface are larger than a first predetermined value, the first sound path includes a first diffraction portion, which diffracts the sound in the first opening, and the second sound path includes a second diffraction portion, which diffracts the sound in the second opening.

5. The device according to claim 1, wherein the sound pressure difference is an average value of sound pressure differences obtained by subtracting a logarithm of power of the second sound pressure from a logarithm of power of the first sound pressure,
    wherein the phase difference is an average value of phase differences of a target frequency band, and
    wherein the processor determines that the source of the reached sound exists at a position opposite to the first surface in at least one case between a case where an average value of the sound pressure differences is larger than a first threshold value, which is a plus value, and a case where an average value of the sound pressure differences is larger than a third threshold value, which is a plus value.

6. The device according to claim 5, wherein the processor determines that the source of the reached sound exists at a position opposite to the second surface in at least one case between a case where the average value of the sound pressure differences is smaller than a negative second threshold value, and a case where the average value of the sound pressure differences is smaller than a negative fourth threshold value.

7. The device according to claim 5, wherein a phase that is an average value of the phase differences of the target frequency band is expressed by Equation (10) below, $$a\_phrase = (\Sigma_{j=ss}^{ee} phase[j] \cdot C\_n[j])/(ee+1-ss) \qquad (10)$$

herein, $phase[j]=atan(phase\_im[j]/phase\_re[j])$, $phase\_re[j]=re1[j] \times re2[j]+im1[j] \times im[j]$, $phase\_im[j]=im1[j] \times re2[j]-re1[j] \times im2[j]$, $C\_n[j]=A[j]/\lambda\_c$, j is a frequency band number, re1[j] is an actual part of spectrum of the first sound pressure in a jth frequency band, re2[j] is an actual part of spectrum of the second sound pressure in the jth frequency band, im1[j] is an imaginary part of spectrum of the first sound pressure in the jth frequency band, im2[j] is an imaginary part of spectrum of the second sound pressure in the jth frequency band, $\lambda[j]$ is a wavelength of a sound of the jth frequency band, $\lambda\_c$ is a wavelength of a sound at a reference frequency, ee is an upper-limit of the target frequency band, and ss is a lower-limit of the target frequency band.

8. The device according to claim 1, wherein the sound pressure difference is a sound pressure difference average value, which is an average value of a plurality of frames of the sound pressure difference for each frame obtained by subtracting a logarithm of power of the second sound pressure from a logarithm of power of the first sound pressure, wherein the phase difference is a phase difference average value, which is an average value of a plurality of frames of the phase difference in a target frequency band for each frame, wherein the processor determines that the source of the reached sound exists at a position opposite to the first surface in at least one case of the case where the sound pressure difference average value is larger than a fifth threshold value and the phase difference average value is larger than a sixth threshold value, wherein the fifth threshold value is an average value of the sound pressure difference average value when the source of the reached sound exists at a position opposite to the first surface and the sound pressure difference average value when the source of the reached sound exists at a position opposite to the second surface, and wherein the sixth threshold value is an average value of the phase difference average value when the source of the reached sound exists at a position opposite to the first surface and the phase difference average value when the source of the reached sound exists at a position opposite to the second surface.

9. The device according to claim 8, wherein, in at least one of a case where the sound pressure difference average value is equal to or smaller than the fifth threshold value and a case where the phase difference average value is equal to or smaller than the sixth threshold value, the processor determines that the source of the reached sound exists at a position opposite to the second surface.

10. The device according to claim 8, wherein an average value of the sound pressure difference average value when the source of the reached sound exists at the position opposite to the first surface and the sound pressure difference average value when the source of the reached sound exists at the position opposite to the second surface is an average value of a first average value, which is an average value of a first speech section of the sound pressure difference, and a second average value, which is an average value of a second speech section of the sound pressure difference, wherein a difference between the first average value and the second average value exceeds a second predetermined value, wherein an average value of the phase difference average value when the source of the reached sound exists at the position opposite to the first surface and the phase difference average value when the source of the reached sound exists at the position opposite to the second surface is an average value of a third average value, which is an average value of a third speech section of the phase difference and a fourth average value, which is an average value of a fourth speech section of the phase difference, and wherein a difference between the third average value and the fourth average value exceeds a third predetermined value.

11. The device according to claim 8, wherein, when a signal-to-noise ratio of a signal corresponding to the sound is smaller than a fourth predetermined value, the fifth threshold value and the sixth threshold value are reduced by a fifth predetermined value.

12. The device according to claim 1, wherein, when the processor determines that the source of the reached sound exists at the position opposite to the first surface, the signal corresponding to the sound is translated into a first language, and wherein, when the processor determines that the source of the reached sound exists at the position opposite to the second surface, the signal corresponding to the sound is translated into a second language.

13. A method for determining a sound source direction of a device for determining the sound source direction that includes:

a case in which a first sound path, which has a first opening opened in a first surface at a first end of the first sound path and in which a sound is propagated from the first opening, and a second sound path, which has a second opening opened in a second surface crossing the first surface at a first end of the second sound path and in which a sound is propagated from the second opening, are provided, a first omnidirectional microphone provided at a second end of the first sound path, a second omnidirectional microphone provided at a second end of the second sound path, a memory, and a processor coupled to the memory, the method by the processor comprising:

determining a direction in which a source of a reached sound exists, based on a sound pressure difference between a first sound pressure that is a sound pressure of a first frequency component of a first part of the reached sound acquired by the first omnidirectional microphone and a second sound pressure that is a sound pressure of the first frequency component of a second part of the reached sound acquired by the second omnidirectional microphone, and a phase difference between a first phase that is a phase of a second frequency component of the first part of the reached sound and a second phase that is a phase of the second frequency component of the second part of the reached sound, wherein the first frequency component component ranges from 3000 Hz to 8 kHz.

14. The method according to claim 13, wherein the sound pressure difference is an average value of sound pressure differences obtained by subtracting a logarithm of power of the second sound pressure from a logarithm of power of the first sound pressure, wherein the phase difference is an average value of phase differences of a target frequency band, and wherein the processor determines that the source of the reached sound exists at a position opposite to the first surface in at least one case between a case where an average value of the sound pressure differences is larger than a first threshold value, which is a plus value, and a case where an average value of the sound pressure differences is larger than a third threshold value, which is a plus value.

15. The method according to claim 13, wherein the sound pressure difference is a sound pressure difference average value, which is an average value of a plurality of frames of the sound pressure difference for each frame obtained by subtracting a logarithm of power of the second sound pressure from a logarithm of power of the first sound pressure, wherein the phase difference is a phase difference average value, which is an average value of a plurality of frames of the phase difference in a target frequency band for each frame, wherein the processor determines that the source of the reached sound exists at a position opposite to the first surface in at least one case of the case where the sound pressure difference average value is larger than a fifth threshold value and the phase difference average value is larger than a sixth threshold value, wherein the fifth threshold value is an average value of the sound pressure difference average value when the source of the reached sound exists at a position opposite to the first surface and the sound pressure difference average value when the source of the reached sound exists at a position opposite to the second surface, and wherein the sixth threshold value is an average value of the phase difference average value when the source of the reached sound exists at a position opposite to the first surface and the phase difference average value when the source of the reached sound exists at a position opposite to the second surface.

16. A computer-readable non-transitory recording medium storing a program that causes a computer to execute a procedure of a device for determining a sound source direction that includes:

a case in which a first sound path, which has a first opening opened in a first surface at a first end of the first sound path and in which a sound is propagated from the first opening, and a second sound path, which has a second opening opened in a second surface crossing the first surface at a first end of the second sound path and in which a sound is propagated from the second opening, are provided, a first omnidirectional microphone provided at a second end of the first sound path, a second omnidirectional microphone provided at a second end of the second sound path, a memory, and a processor coupled to the memory, the procedure comprising:

determining, by the processor, a direction in which a source of a reached sound exists, based on a sound pressure difference between a first sound pressure that is a sound pressure of a first frequency component of a first part of the reached sound acquired by the first omnidirectional microphone and a second sound pressure that is a sound pressure of the first frequency component of a second part of the reached sound acquired by the second omnidirectional microphone, and a phase difference between a first phase that is a phase of a second frequency component of the first part of the reached sound and a second phase that is a phase of the second frequency component of the second part of the reached sound, wherein the first frequency component ranges from 3000 Hz to 8 kHz.

17. The computer-readable non-transitory recording medium according to claim 16, wherein the sound pressure difference is an average value of sound pressure differences obtained by subtracting a logarithm of power of the second sound pressure from a logarithm of power of the first sound pressure, wherein the phase difference is an average value of phase differences of a target frequency band, and wherein the procedure determines that the source of the reached sound exists at a position opposite to the first surface in at least one case between a case where an average value of the sound pressure differences is larger than a first threshold value, which is a plus value, and a case where an average value of the sound pressure differences is larger than a third threshold value, which is a plus value.

18. The computer-readable non-transitory recording medium according to claim 16, wherein the sound pressure difference is a sound pressure difference average value, which is an average value of a plurality of frames of the sound pressure difference for each frame obtained by subtracting a logarithm of power of the second sound pressure from a logarithm of power of the first sound pressure, wherein the phase difference is a phase difference average value, which is an average value of a plurality of frames of the phase difference in a target frequency band for each frame, wherein the procedure determines that the source of the reached sound exists at a position opposite to the first surface in at least one case of the case where the sound pressure difference average value is larger than a fifth threshold value and the phase difference average value is larger than a sixth threshold value, wherein the fifth threshold value is an average value of the sound pressure difference average value when the source of the reached sound exists at a position opposite to the first surface and the sound pressure difference average value when the source of the reached sound exists at a position opposite to the second surface, and wherein the sixth threshold value is an average value of the phase difference average value when the source of the reached sound exists at a position opposite to the first surface and the phase difference average value when the source of the reached sound exists at a position opposite to the second surface.

* * * * *